United States Patent
Tanaka et al.

(10) Patent No.: US 9,648,316 B2
(45) Date of Patent: May 9, 2017

(54) IMAGE PROCESSING DEVICE AND METHOD

(71) Applicant: SONY CORPORATION, Minato-ku (JP)

(72) Inventors: Junichi Tanaka, Kanagawa (JP); Yoshitaka Morigami, Tokyo (JP)

(73) Assignee: SONY CORPORATION, Tokyo (JP)

(*) Notice: Subject to any disclaimer, the term of this patent is extended or adjusted under 35 U.S.C. 154(b) by 212 days.

(21) Appl. No.: 14/375,304

(22) PCT Filed: Feb. 28, 2013

(86) PCT No.: PCT/JP2013/055543
§ 371 (c)(1),
(2) Date: Jul. 29, 2014

(87) PCT Pub. No.: WO2013/129618
PCT Pub. Date: Sep. 6, 2013

(65) Prior Publication Data
US 2014/0369407 A1 Dec. 18, 2014

(30) Foreign Application Priority Data
Feb. 29, 2012 (JP) ................................ 2012-044009

(51) Int. Cl.
*H04N 19/96* (2014.01)
*H04N 19/59* (2014.01)
(Continued)

(52) U.S. Cl.
CPC ..... *H04N 19/00096* (2013.01); *H04N 19/126* (2014.11); *H04N 19/463* (2014.11);
(Continued)

(58) Field of Classification Search
CPC ........... H04N 19/00096; H04N 19/126; H04N 19/463; H04N 19/59; H04N 19/70; H04N 19/61
(Continued)

(56) References Cited

U.S. PATENT DOCUMENTS

2009/0238476 A1* 9/2009 Wu ........................ H04N 19/86
382/233
2013/0251032 A1 9/2013 Tanaka
(Continued)

FOREIGN PATENT DOCUMENTS

EP 2 806 640 A1 11/2014
JP WO2013/129203 A1 9/2013
(Continued)

OTHER PUBLICATIONS

Bross et al. (Benjamin Bross et al.: "High Efficiency Video Coding (HEVC) text specification draft 6", Joint Collaborative Team on Video Coding (JCT-VC) of ITU-T SGI 6 WP3 and ISO/IEC JTC1/SC29/WG11 7th Meeting, Feb. 10, 2012 (Feb. 10, 2012), XP030111769, Geneva, CH.*
(Continued)

*Primary Examiner* — William C Vaughn, Jr.
*Assistant Examiner* — Jae N Noh
(74) *Attorney, Agent, or Firm* — Oblon, McClelland, Maier & Neustadt, L.L.P.

(57) ABSTRACT

An image processing device and method that enable suppression of a reduction in coding efficiency. The image processing device encodes an image to generate encoded data, and set, as syntax of the generated encoded data, syntax whose semantics is set so that a default quantization matrix having the same size as a block size that is a unit of processing in which quantization is performed is referred to when in a copy mode in which a quantization matrix is
(Continued)

copied, quantization matrix reference data identifying a reference destination of the quantization matrix matches quantization matrix identification data identifying the quantization matrix. The device and method can be applied to an image processing device.

18 Claims, 58 Drawing Sheets

(51) Int. Cl.
    *H04N 19/70*     (2014.01)
    *H04N 19/61*     (2014.01)
    *H04N 19/126*     (2014.01)
    *H04N 19/463*     (2014.01)

(52) U.S. Cl.
    CPC .............. *H04N 19/59* (2014.11); *H04N 19/70* (2014.11); *H04N 19/61* (2014.11)

(58) Field of Classification Search
    USPC .................................................... 375/240.03
    See application file for complete search history.

(56) References Cited

U.S. PATENT DOCUMENTS

| | | | |
|---|---|---|---|
| 2013/0322525 A1 | 12/2013 | Tanaka | |
| 2014/0050267 A1* | 2/2014 | Sakurai | H04N 19/00812 |
| | | | 375/240.18 |
| 2015/0334396 A1* | 11/2015 | Lim | H04N 19/70 |
| | | | 375/240.03 |

FOREIGN PATENT DOCUMENTS

| | | |
|---|---|---|
| JP | WO2013/129616 A1 | 9/2013 |
| WO | WO 2013/129203 | 9/2013 |
| WO | WO 2013/129616 A1 | 9/2013 |

OTHER PUBLICATIONS

Extended European Search Report issued Nov. 2, 2015 in Patent Application No. 13754401.1.

Japanese Office Action issued Nov. 5, 2015 in Patent Application No. 2014-502389.
Japanese Office Action issued Nov. 5, 2015 in Patent Application No. 2014-502390.
Japanese Office Action issued Nov. 12, 2015 in Patent Application No. 2014-502388.
Japanese Office Action issued Nov. 12, 2015 in Patent Application No. 201 Apr. 5021 52.
Yoshitaka Morigami et al., "Improvement of Scaling List", Joint Collaborative Team on Video Coding (JCT-VC) of ITU-T SG 16 WP 3 and ISO/IEC JTC 1/SC 29/WG 11, 9th Meeting: Geneva, CH, Document: JCTVC-I0059, XP030111822, Apr. 27-May 7, 2012, 6 pages.
Yoshitaka Morigami et al., "CE4 subtest 2.1: Enhancements of HEVC Quantization Matrix", Joint Collaborative Team on Video Coding (JCT-VC) of ITU-T SG16 WP3 and ISO/IEC JTC1/SC29AVG11, 8th Meeting: San Jose, CA, Document: JCTVC-H0230, XP030111257, Feb. 1-10, 2012, 7 pages.
Minhua Zhou et al: "Compact Representation of Quantization Matrices for HEVC", Joint Collaborative Team on Video Coding (JCT-VC) of ITU-T SG16 WP3 and ISO/IEC JTC1/SC29AVG11, 4th Meeting: Daegu, Korea, Document: JCTVC-D024, WG11 No. m18763, XP030008065, Jan. 20-28, 2011, 9 pages.
Minhua Zhou et al., "Non-CE04: Carriage of Large Block Size Quantization Matrices with Up-sampling", Joint Collaborative Team on Video Coding (JCT-VC) of ITU-T SG16 WP3 and ISO/IEC JTC1/SC29/WG11, 7th Meeting: Geneva, CH, Document: JCTVC-G094, M21642,Nov. 19-30, 2011, 6 pages.
Benjamin Bross et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, 7th Meeting: Geneva, CH, Document: JCTVC-H1003_d0, Nov. 21-30, 2011,6 pages.
U.S. Appl. No. 14/375,288, filed Jul. 29, 2014, Tanaka, et al.
U.S. Appl. No. 14/359,765, filed May 21, 2014, Tanaka, et al.
International Search Report issued May 28, 2013 in PCT/JP2013/055543.
Junichi Tanaka, "Quantization Matrix for HEVC", Joint Collaborative Team on Video Coding (JCT-VC) of ITU-T SG16 WP3 and ISO/IEC JTC1/SC29/WG11, 5$^{th}$ Meeting, Document: JCTVC-E073, (Mar. 16-23, 2011), 24 pages.

* cited by examiner

FIG. 1

| DC= | 12 | | | | | | | |
|---|---|---|---|---|---|---|---|---|
| AC= | 12 | 14 | 16 | 18 | 20 | 22 | 24 | 26 |
| | 14 | 16 | 18 | 20 | 22 | 24 | 26 | 28 |
| | 16 | 18 | 20 | 22 | 24 | 26 | 28 | 30 |
| | 18 | 20 | 22 | 24 | 26 | 28 | 30 | 32 |
| | 20 | 22 | 24 | 26 | 28 | 30 | 32 | 34 |
| | 22 | 24 | 26 | 28 | 30 | 32 | 34 | 36 |
| | 24 | 26 | 28 | 30 | 32 | 34 | 36 | 38 |
| | 26 | 28 | 30 | 32 | 34 | 36 | 38 | 40 |

FIG. 6 signed exponential golomb coding

| Code | symbol | length |
|------|--------|--------|
| 0 | 1 | 1 |
| 1 | 010 | 3 |
| −1 | 011 | 3 |
| 2 | 00100 | 5 |
| −2 | 00101 | 5 |
| 3 | 00110 | 5 |
| −3 | 00111 | 5 |
| 4 | 0001000 | 7 |
| −4 | 0001001 | 7 |
| 5 | 0001010 | 7 |
| −5 | 0001011 | 7 |
| 6 | 0001100 | 7 |
| −6 | 0001101 | 7 |
| 7 | 0001110 | 7 |
| −7 | 0001111 | 7 |
| 8 | 000010000 | 9 |
| −8 | 000010001 | 9 |
| ... | ... | ... |

| | Descriptor |
|---|---|
| scaling_list( ScalingList, sizeID, MatrixID ) { | |
| nextcoef = 8 | |
| coefNum = Min( 64, ( 1 << ( 4 + ( sizeId << 1 ) ) ) ) | |
| for( i=0; i < coefNum, i++) { | |
|   scaling_list_delta_coef | se(v) |
|   nextcoef = ( nextcoef + scaling_list_delta_coef + 256 ) % 256 | |
|   ScalingList[ sizeId ][ matrixId ][ i ] = nextcoef | |
| } | |
| if( sizeId > 1 ) | |
|   scaling_list_dc_coef_mius8[sizeId-2][matrixId] | se(v) |
| } | |

B

| | |
|---|---|
| nextCoef = 8 | |
| coefNum = Min( 64, ( 1 << ( 4 + ( sizeId << 1 ) ) ) ) | |
| if( sizeId > 1 ) { | |
|   scaling_list_dc_coef_minus8[ sizeId-2 ][ matrixId ] | se(v) |
|   nextCoef = | |
|     scaling_list_dc_coef_minus8[ sizeId-2 ][ matrixId ] + 8 | |
| } | |
| for( i = 0; i < coefNum; i++) { | |
|   scaling_list_delta_coef | se(v) |
|   nextCoef = ( nextCoef + scaling_list_delta_coef + 256 ) % 256 | |
|   ScalingList[ sizeId ][ matrixId ][ i ] = nextCoef | |
| } | |

FIG. 8

| | Descriptor |
|---|---|
| scaling_list( scalingList, sizeID, matrixID ) { | |
|   nextCoef = 8 | u(1) |
|   coefNum = Min( 64, ( 1 << ( 4 + ( sizeID << 1 ) ) ) ) | |
|   UseDefaultScalingMatrix = 0 | |
|   if( sizeID > 1 ) { | |
|     scaling_list_dc_coef_minus8[ sizeID - 2 ][ matrixID ] | se(v) |
|     if( scaling_list_dc_coef_minus8[ sizeID - 2 ][ matrixID ] == -8 ) | |
|       UseDefaultScalingMatrix = 1 | |
|   } | |
|   if( UseDefaultScalingMatrixFlag == 0 ) { | |
|     stopNow = 0 | |
|     for( i=0; i < coefNum && !stopNow; i++ ) { | |
|       scaling_list_delta_coef | se(v) |
|       nextCoef = ( nextCoef + scaling_list_delta_coef + 256 ) % 256 | |
|       if( sizeID < 2 ) { | |
|         useDefaultScalingMatrixFlag = (i == 0 && nextCoef == 0) | |
|         if( useDefaultScalingMatrixFlag ) | |
|           stopNow = 1 | |
|       } | |
|       if( !stopNow ) | |
|         scalingList[ i ] = nextCoef | |
|     } | |
|   } | |
| } | |

FIG. 9

A scaling_list_pred_matrix_id_delta specifies the target reference matrix to copy the value of scaling list. When scaling_list_pred_mode_flag is equal to 0, scaling_list_pred_matrix_id_delta specifies which matrix should be used in the current matrix by the following:
RefMatrixID = MatrixID - ( 1 + scaling_list_pred_matrix_id_delta )

B

If scaling_list_pred_matrix_id_delta is equal to 0, the scaling list is inferred from the default scaling list ScalingList[ sizeId ][ matrixId ][ i ] as specified in Table 7-5 and Table 7-6 for i = 0..Min( 64, ( 1 << ( 4 + ( sizeId << 1 ) ) ) ).
    Otherwise, the scaling list is inferred from the reference scaling list as follows.
refMatrixId = matrixId - scaling_list_pred_matrix_id_delta[ sizeId ][ matrixId ]

```
scaling_list_param() {                                                          Descriptor
    scaling_list_present_flag                                                   u(1)
    if(scaling_list_present_flag)
        for(sizeID=0;sizeID<4;sizeID++)
            for(matrixID=0;matrixID<(sizeID==3)?2:6;matrixID++) {
                scaling_list_pred_mode_flag                                     u(1)
                if(!scaling_list_pred_mode_flag)
                    scaling_list_pred_matrix_id_delta                           ue(v)
                else
                    scaling_list(ScalingList[sizeID][matrixID],sizeID,matrixID)
            }
}
```

B

```
scaling_list(scalingList,sizeID,matrixID) {                                     Descriptor
    nextCoef=8
    coefNum=Min(64,(1<<(4+(sizeID<<1))))
    UseDefaultScalingMatrix=0
    if(sizeID>1) {
        scaling_list_dc_coef_minus8[sizeID-2][matrixID]                         se(v)
        if(scaling_list_dc_coef_minus8[sizeID-2][matrixID]==-8)
            UseDefaultScalingMatrix=1
    }
    if(UseDefaultScalingMatrix==0) {
        stopNow=0
        for(i=0;i<coefNum && !stopNow;i++) {
            scaling_list_delta_coef                                             se(v)
            nextCoef=(nextCoef+scaling_list_delta_coef+256)%256
            if(sizeID<2) {
                useDefaultScalingMatrixFlag=(i==0 && nextCoef==0)
                if(useDefaultScalingMatrixFlag)
                    stopNow=1
            }
            if(!stopNow)
                scalingList[i]=nextCoef
        }
    }
}
```

FIG. 11

| | Descriptor |
|---|---|
| scaling_list_data() { | |
|   for(sizeId=0;sizeId<4;sizeId++) | |
|     for(matrixId=0;matrixId<(sizeId==3)?2:6;matrixId++) { | |
|       scaling_list_pred_mode_flag[sizeId][matrixId] | u(1) |
|       if(!scaling_list_pred_mode_flag[sizeId][matrixId]) | |
|         scaling_list_pred_matrix_id_delta[sizeId][matrixId] | ue(1) |
|       else{ | |
|         nextCoef=8 | |
|         coefNum=Min(64, (1<<(4+(sizeID<<1)))) | |
|         if(sizeId>1){ | |
|           scaling_list_dc_coef_minus8[sizeId-2][matrixId] | se(v) |
|           nextCoef= | |
|             scaling_list_dc_coef_minus8[sizeId-2][matrixId]+8 | |
|         } | |
|         for (i=0;i<coefNum;i++) { | |
|           scaling_list_delta_coef | se(v) |
|           nextCoef=(nextCoef+scaling_list_delta_coef+256)%256 | |
|           ScalingList[sizeId][matrixId][i]=nextCoef | |
|         } | |
|       } | |
|     } | |
| } | |

FIG. 12

| scaling_list_param( ) { | Descriptor |
|---|---|
|   scaling_list_present_flag | u(1) |
|   if( scaling_list_present_flag ) | |
|     for( sizeID = 0; sizeID < 4; sizeID ++ ) | |
|       for( matrixID = 0; matrixID < (sizeID == 3) ? 2 : 6; matrixID ++ ) { | |
|         scaling_list_pred_mode_flag | u(1) |
|         if( !scaling_list_pred_mode_flag ) | |
|           scaling_list_pred_matrix_id_delta | ue(v) |
|         else | |
|           scaling_list( ScalingList[ sizeID ][ matrixID ], sizeID, matrixID ) | |
|       } | |
| } | |

A

| scaling_list( scalingList, sizeID, matrixID ) { | Descriptor |
|---|---|
|   nextCoef = 8 | u(1) |
|   coefNum = Min( 64, ( 1 << ( 4 + ( sizeID << 1 )))) | |
|   UseDefaultScalingMatrix = 0 | |
|   if( sizeID > 1 ) { | |
|     scaling_list_dc_coef_minus8[ sizeID−2 ][ matrixID ] | se(v) |
|     if( scaling_list_dc_coef_minus8[ sizeID−2 ][ matrixID ] == −8) | |
|       UseDefaultScalingMatrixFlag = 1 | |
|   } | |
|   if( UseDefaultScalingMatrixFlag == 0 ) { | |
|     for( i = 0; i < coefNum, i ++ ) { | |
|       scaling_list_delta_coef | se(v) |
|       nextCoef = ( nextCoef + scaling_list_delta_coef + 256 ) % 256 | |
|       if( sizeID < 2 ) { | |
|         useDefaultScalingMatrixFlag = ( i == 0 && nextCoef == 0 ) | |
|         if( useDefaultScalingMatrixFlag ) | |
|           break | |
|       } | |
|       scalingList[ i ] = nextCoef | |
|     } | |
|   } | |
| } | |

| | Descriptor |
|---|---|
| scaling_list( ScalingList, sizeID, MatrixID ) { | |
| nextcoef = 8 | |
| coefNum=min(1<<(4+(sizeID<<1)), 65) | |
| for( i = 0; i<coefNum, i++ ) { | |
| scaling_list_delta_coef | se(v) |
| nextcoef = ( nextcoef+scaling_list_delta_coef+256 ) % 256 | |
| if( sizeID>1 && i==0 ) | |
| scaling_list_dc_coef[ sizeID-2 ][ MatrixID ]=nextcoef | |
| else | |
| ScalingList[ i-(sizeID>1)? 1:0 ]=nextcoef | |
| } | |
| } | |

FIG. 30

| | Descriptor |
|---|---|
| scaling_list( ScalingList, sizeID, MatrixID ) { | |
|   nextcoef = 8 | |
|   coefNum = min(( 1 << ( 4 + ( sizeID << 1 ))), 64 ) | |
|   for( i = 0; i < coefNum, i++ ) { | |
|     scaling_list_delta_coef | se(v) |
|     nextcoef = ( nextcoef + scaling_list_delta_coef + 256 ) % 256 | |
|     ScalingList[ i ] = nextcoef | |
|   } | |
|   if( sizeID > 1 ) | |
|     scaling_list_dc_coef_delta[ sizeID−2 ][ MatrixID ] | se (v) |
| } | |

FIG. 35

| | Descriptor |
|---|---|
| scaling_list( ScalingList, sizeID, MatrixID ) { | |
|   nextcoef = 8 | |
|   coefNum = min( ( 1 << ( 4 + ( sizeID << 1 ) ) ), 64 ) | |
|   for( i = 0; i < coefNum; i++ ) { | |
|     scaling_list_delta_coef | se(v) |
|     nextcoef = ( nextcoef + scaling_list_delta_coef + 256 ) % 256 | |
|     ScalingList[ i ] = nextcoef | |
|   } | |
|   if( sizeID > 1 ) | |
|     scaling_list_dc_coef_delta[ sizeID−2 ][ MatrixID ] | ue(v) |
| } | |

FIG. 37

| | Descriptor |
|---|---|
| scaling_list_dc() { | |
| nextcoef = 8 | |
| for(sizeID = 2; sizeID < 4, sizeID ++) | |
| for(MatrixID = 0; MatrixID < (SizeID == 3)? 2 : 6; MatrixID ++){ | |
| scaling_list_delta_coef | se(v) |
| nextcoef = (nextcoef + scaling_list_delta_coef + 256) % 256 | |
| scaling_list_dc_coef[sizeID-2][MatrixID] = nextcoef | |
| } | |
| } | |

FIG. 43

| scaling_list_param( ) { | Descriptor |
|---|---|
|   scaling_list_present_flag | u(1) |
|   if( scaling_list_present_flag ) | |
|     for( sizeID = 0; sizeID < 4; sizeID ++ ) | |
|       for( matrixID = 0; matrixID < (sizeID == 3) ? 2 : 6; matrixID ++ ) { | |
|         scaling_list_pred_mode_flag | u(1) |
|         if( !scaling_list_pred_mode_flag ) | |
|           scaling_list_pred_matrix_id_delta | ue(v) |
|         else | |
|           scaling_list( ScalingList[sizeID][matrixID], sizeID, matrixID ) | |
|       } | |
| } | |

A

| scaling_list( scalingList, sizeID, matrixID ) { | Descriptor |
|---|---|
|   nextCoef = 8 | u(1) |
|   coefNum = Min( 64, ( 1 << ( 4 + ( sizeID << 1 ) ) ) ) | |
|   UseDefaultScalingMatrix = 0 | |
|   if( sizeID > 1 ) { | |
|     scaling_list_dc_coef_minus8[sizeID-2][matrixID] | se(v) |
|     if( scaling_list_dc_coef_minus8[sizeID-2][matrixID] == -8 ) | |
|       UseDefaultScalingMatrixFlag = 1 | |
|     nextCoef = scaling_list_dc_coef_minus8[sizeID-2][matrixID]+8 | |
|   } | |
|   if( UseDefaultScalingMatrixFlag == 0 ) { | |
|     for( i = 0; i < coefNum, i ++ ) { | |
|       scaling_list_delta_coef | se(v) |
|       nextCoef = ( nextCoef + scaling_list_delta_coef + 256 ) % 256 | |
|       if( sizeID < 2 ) { | |
|         useDefaultScalingMatrixFlag = ( i == 0 && nextCoef == 0 ) | |
|         if( useDefaultScalingMatrixFlag ) | |
|           break | |
|       } | |
|       scalingList[ i ] = nextCoef | |
|     } | |
|   } | |
| } | |

| scaling_list_param() { | Descriptor |
|---|---|
|   scaling_list_present_flag | u(1) |
|   if( scaling_list_present_flag ) | |
|     for( sizeID = 0; sizeID < 4; sizeID ++ ) | |
|       for( matrixID = 0; matrixID < (sizeID == 3)? 2:6; matrixID ++) { | |
|         scaling_list_pred_mode_flag | u(1) |
|         if(!scaling_list_pred_mode_flag) | |
|           scaling_list_pred_matrix_id_delta | ue(v) |
|         else | |
|           scaling_list(ScalingList[sizeID][matrixID], sizeID, matrixID) | |
|       } | |
| } | |

A

| scaling_list(scalingList, sizeID, matrixID) { | Descriptor |
|---|---|
|   nextCoef = 8 | u(1) |
|   coefNum = Min (64, (1 << (4 + (sizeID << 1)))) | |
|   if (sizeID > 1) { | |
|     scaling_list_dc_coef_minus8[sizeID-2][matrixID] | se(v) |
|   } | |
|   for (i = 0; i < coefNum, i++) { | |
|     scaling_list_delta_coef | se(v) |
|     nextCoef = (nextCoef + scaling_list_delta_coef + 256) % 256 | |
|     scalingList [i] = nextCoef | |
|   } | |
| } | |

B if scaling_list_pred_matrix_id_delta is equal to 0,
        UseDefaultScalingMatrixFlag = 1
other
        RefMatrixID = MatrixID − (scaling_list_pred_matrix_id_delta)

| scaling_list_param( ) { | Descriptor |
|---|---|
|   scaling_list_present_flag | u(1) |
|   if( scaling_list_present_flag ) | |
|     for( sizeID = 0; sizeID < 4; sizeID ++ ) | |
|       for( matrixID = 0; matrixID < ( sizeID == 3 ) ? 2 : 6; matrixID ++ ) { | |
|         scaling_list_pred_mode_flag | u(1) |
|         if( !scaling_list_pred_mode_flag ) | |
|           scaling_list_pred_matrix_id_delta | ue(v) |
|         else | |
|           scaling_list( ScalingList[ sizeID ][ matrixID ], sizeID, matrixID ) | |
|       } | |
| } | |

A

| scaling_list( scalingList, sizeID, matrixID ) { | Descriptor |
|---|---|
|   nextCoef = 8 | u(1) |
|   coefNum = Min( 64, ( 1 << ( 4 + ( sizeID << 1 ) ) ) ) | |
|   UseDefaultScalingMatrix = 0 | |
|   if( sizeID > 1 ) { | |
|     scaling_list_dc_coef_minus8[ sizeID−2 ][ matrixID ] | se(v) |
|     nextCoef = scaling_list_dc_coef_minus8[ sizeID−2 ][ matrixID ] + 8 | |
|   } | |
|   for( i = 0; i < coefNum; i++ ) { | |
|     scaling_list_delta_coef | se(v) |
|     nextCoef = ( nextCoef + scaling_list_delta_coef + 256 ) % 256 | |
|     scalingList[ i ] = nextCoef | |
|   } | |
| } | |

B if scaling_list_pred_matrix_id_delta is equal to 0,
        UseDefaultScalingMatrixFlag = 1
other
        RefMatrixID = MatrixID − ( scaling_list_pred_matrix_id_delta )

C

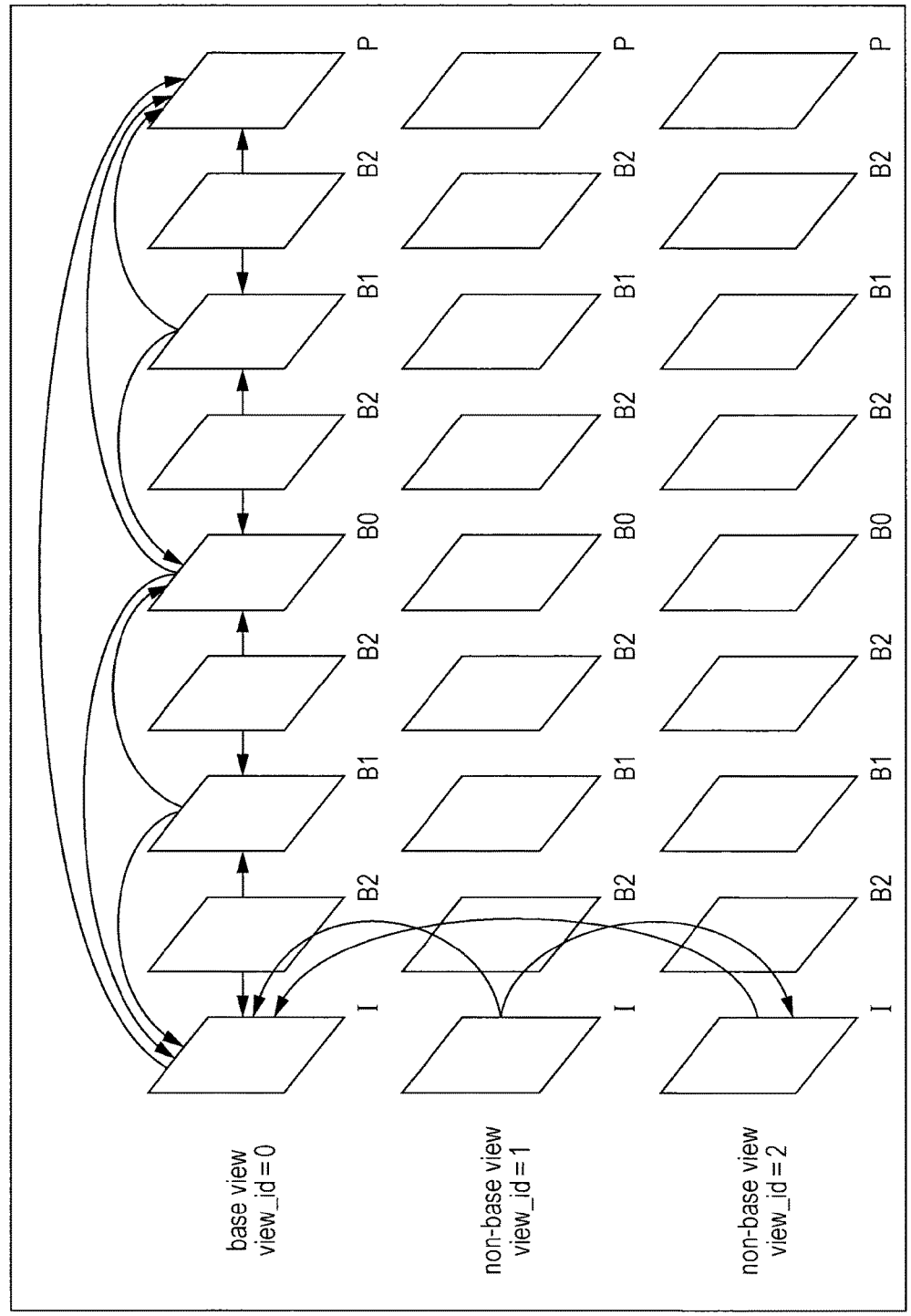

IMAGE PROCESSING DEVICE AND METHOD

TECHNICAL FIELD

The present disclosure relates to an image processing device and method.

BACKGROUND ART

In H.264/AVC (Advanced Video Coding), which is one of standard specifications of video coding schemes, the profiles of High Profile or higher allow quantization of image data with quantization step sizes that differ from one component of orthogonal transform coefficient to another. The quantization step size for each component of orthogonal transform coefficient may be set based on a reference step value and a quantization matrix (also referred to as a scaling list) defined by a size equivalent to the unit of an orthogonal transform.

A specified value of a quantization matrix is prepared for each prediction mode (intra-prediction mode, inter-prediction mode) and for each transform unit size (4×4, 8×8). Furthermore, users are allowed to specify a unique quantization matrix different from the specified values in a sequence parameter set or picture parameter set. In a case where no quantization matrices are used, quantization step sizes used for quantization have an equal value for all the components.

In HEVC (High Efficiency Video Coding), which is being standardized as a next-generation video coding scheme and which is a successor to H.264/AVC, the concept of coding units (CUs) corresponding to traditional macroblocks has been introduced (see, for example, NPL 1). The range of sizes of coding units is specified by a set of values which are powers of 2, called the largest coding unit (LCU) and the smallest coding unit (SCU), in a sequence parameter set. Furthermore, the specific coding unit size in the range specified by the LCU and the SCU is specified using split_flag.

In HEVC, one coding unit may be divided into one or more orthogonal transform units, or one or more transform units (TUs). An available transform unit size is any of 4×4, 8×8, 16×16, and 32×32.

Meanwhile, the DC component (also referred to as the direct current component) of a quantization matrix (scaling list) is transmitted as data different from the AC components (also referred to as the alternating current components) thereof for purposes such as the reduction in the amount of coding during transmission. Specifically, the DC component of a scaling list is transmitted as a DC coefficient (also referred to as a direct current coefficient) different from AC coefficients (also referred to as alternating current coefficients), which are the AC components of the scaling list.

In order to reduce the amount of coding of the DC coefficient during transmission, it has been suggested that a constant (for example, 8) is subtracted from the value of the DC coefficient and the resulting value (scaling_list_dc_coef_minus8) is encoded using signed exponential Golomb coding (see, for example, NPL 1).

CITATION LIST

Non Patent Literature

NPL 1: Benjamin Bross, Fraunhofer HHI, Woo-Jin Han, Gachon University, Jens-Rainer Ohm, RWTH Aachen, Gary J. Sullivan, Microsoft, Thomas Wiegand, Fraunhofer HHI/TU Berlin, JCTVC-H1003, "High Efficiency Video Coding (HEVC) text specification draft 6", Joint Collaborative Team on Video Coding (JCT-VC) of ITU-T SG16 WP3 and ISO/IEC JTC1/SC29/WG11 7th Meeting: Geneva, CH, 21-30 Nov., 2011

SUMMARY OF INVENTION

Technical Problem

Meanwhile, in the related art, information indicating the use of a default matrix is transmitted, resulting in a risk that coding efficiency may be significantly reduced.

The present disclosure has been made in view of the situation described above, and it is an object of the present disclosure to enable suppression of a reduction in coding efficiency.

Solution to Problem

An aspect of the present disclosure provides an image processing device including an encoding unit configured to encode an image to generate encoded data; and a setting unit configured to set, as syntax of the encoded data generated by the encoding unit, syntax whose semantics is set so that a default quantization matrix having the same size as a block size that is a unit of processing in which quantization is performed is referred to when in a copy mode in which a quantization matrix is copied, quantization matrix reference data identifying a reference destination of the quantization matrix matches quantization matrix identification data identifying the quantization matrix.

The setting unit can set, as syntax of the encoded data generated by the encoding unit, syntax whose semantics is set so that a default quantization matrix is referred to when a difference between the quantization matrix reference data and the quantization matrix identification data is equal to 0.

A coding unit that is a unit of processing in which an encoding process is performed and a transform unit that is a unit of processing in which a transform process is performed can have a layered structure, and the encoding unit can perform encoding using a unit having a layered structure.

The image processing device can further include a transmission unit configured to transmit a quantization matrix used to up-convert a quantization matrix whose size is limited to not greater than a transmission size that is a maximum size allowed in transmission to a size of a transform unit that is a unit of processing in which dequantization is performed.

The transmission size can be 8×8, and the size of the transform unit can be a 16×16 size.

The transmission size can be 8×8, and the size of the transform unit can be a 32×32 size.

An aspect of the present disclosure further provides an image processing method including encoding an image to generate encoded data; and setting, as syntax of the generated encoded data, syntax whose semantics is set so that a default quantization matrix having the same size as a block size that is a unit of processing in which quantization is performed is referred to when in a copy mode in which a quantization matrix is copied, quantization matrix reference data identifying a reference destination of the quantization matrix matches quantization matrix identification data identifying the quantization matrix.

In an aspect of the present disclosure, an image is encoded to generate encoded data; and syntax whose semantics is set so that a default quantization matrix having the same size as a block size that is a unit of processing in which quantization is performed is referred to when in a copy mode in which a quantization matrix is copied, quantization matrix reference data identifying a reference destination of the quantization matrix matches quantization matrix identification data identifying the quantization matrix is set as syntax of the generated encoded data.

Advantageous Effects of Invention

According to the present disclosure, it is possible to process an image. In particular, it is possible to suppress a reduction in coding efficiency.

BRIEF DESCRIPTION OF DRAWINGS

FIG. 1 is a diagram illustrating an example of a scaling list.

FIG. 6 is a diagram illustrating an example of exponential Golomb codes.

FIG. 7 includes diagrams illustrating an example of the syntax for a scaling list.

FIG. 8 is a diagram illustrating an example of the syntax for a default matrix.

FIG. 9 includes diagrams illustrating examples of the semantics of a default matrix.

FIG. 10 is a diagram illustrating an example of the syntax for a scaling list.

FIG. 11 is a diagram illustrating an example of the syntax for a scaling list using the present technology.

FIG. 12 includes diagrams illustrating an example of the syntax of a scaling list in the related art.

FIG. 13 is a diagram illustrating an example of the syntax of a scaling list.

FIG. 30 is a diagram illustrating another example of the syntax of a scaling list.

FIG. 35 is a diagram illustrating still another example of the syntax of a scaling list.

FIG. 37 is a diagram illustrating still another example of the syntax of a scaling list.

FIG. 43 includes diagrams illustrating still another example of the syntax of a scaling list.

FIG. 44 includes diagrams illustrating still another example of the syntax of a scaling list.

FIG. 45 includes diagrams illustrating still another example of the syntax of a scaling list.

FIG. 46 is a diagram illustrating an example of a multi-view image encoding scheme.

DESCRIPTION OF EMBODIMENTS

Figure 2:
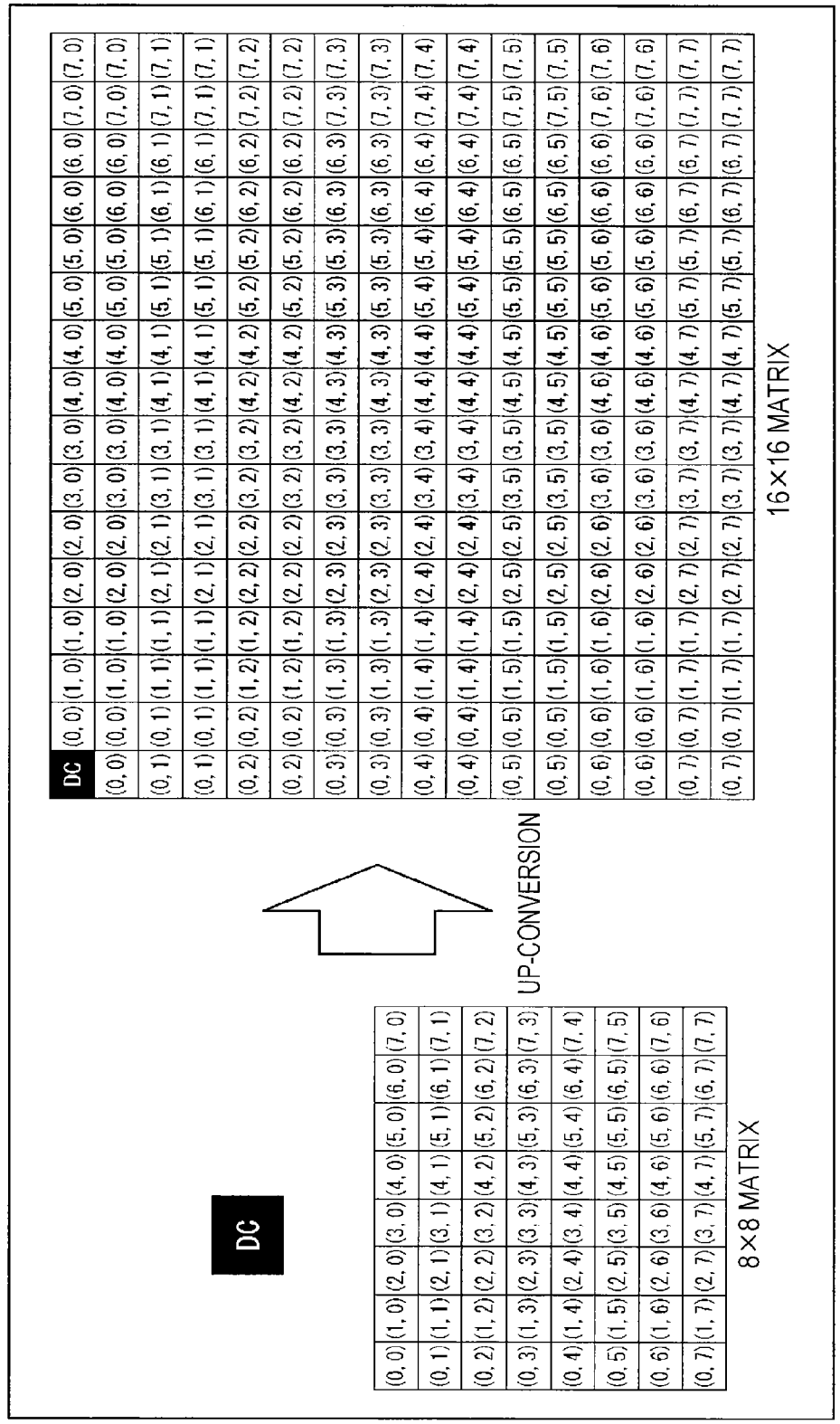
FIG. 2 is a diagram illustrating an example of up-conversion.

Modes for carrying out the present disclosure (hereinafter referred to as embodiments) will be described hereinafter. In this regards, the description will be made in the following order.

1. First embodiment (exemplary application of present technology)
2. Second embodiment (image encoding device, image decoding device: first method)
3. Third embodiment (image encoding device, image decoding device: second method)
4. Fourth embodiment (image encoding device, image decoding device: third method)
5. Fifth embodiment (image encoding device, image decoding device: fourth method)
6. Sixth embodiment (image encoding device, image decoding device: other methods)
7. Seventh embodiment (multi-view image encoding device, multi-view image decoding device)
8. Eighth embodiment (layered image encoding device, layered image decoding device)
9. Ninth embodiment (computer)
10. Example applications
11. Example applications of scalable coding <1. First Embodiment>

In this embodiment, a description will be given of an exemplary application of the present technology, which will be described in detail in the second and following embodiments thereof.

<1-1. Exemplary Application of Present Technology>

First, an exemplary example in which the present technology is applicable will be described. The present technology is a technology related to the encoding and decoding of a scaling list used in quantization and dequantization processes performed when image data is encoded and decoded.

The encoding and decoding of image data may involve quantization and dequantization of coefficient data. Such quantization and dequantization are performed in units of a block having a predetermined size, and a scaling list (or quantization matrix) having a size corresponding to the block size is used. For example, in HEVC (High Efficiency Video Coding), quantization (or dequantization) is performed with sizes such as 4×4, 8×8, 16×16, and 32×32. In HEVC, quantization matrices having 4×4 and 8×8 sizes may be prepared.

FIG. 1 illustrates an example of an 8×8 scaling list. As illustrated in FIG. 1, a scaling list includes a DC coefficient and AC coefficients. The DC coefficient composed of one value is the (0, 0) coefficient of a quantization matrix, and corresponds to the DC coefficient of a discrete cosine transform (DCT). The AC coefficients are coefficients of the quantization matrix other than the (0, 0) coefficient, and correspond to coefficients of the DCT other than the DC coefficient. Note that, as illustrated in FIG. 1, the AC coefficients are represented by a matrix. That is, the AC coefficients also include the (0, 0) coefficient (hereinafter also referred to as the AC coefficient (0, 0)), and the (0, 0) coefficient, which is located at the beginning of the quantization matrix, is replaced with the DC coefficient when used for quantization/dequantization. Hence, the DC coefficient is also referred to as a replacement coefficient. In the example illustrated in FIG. 1, AC coefficients form an 8×8 matrix.

In HEVC, furthermore, an up-converted version (upward conversion) of an 8×8 quantization matrix is used for 16×16 or 32×32 quantization (or dequantization).

FIG. 2 illustrates an example of the up-conversion of an 8×8 scaling list to a 16×16 scaling list. As illustrated in FIG. 2, a scaling list is up-converted using, for example, a nearest neighbor interpolation process. The details of the nearest neighbor interpolation process will be described below with reference to, for example, FIG. 25. As illustrated in FIG. 2, up-conversion is performed on the AC coefficients of the scaling list. Then, the (0, 0) coefficient among the up-converted AC coefficients is replaced with the DC coefficient.

Two types of 8×8 scaling lists are prepared, namely, that used for up-conversion to 16×16 ("8×8 for 16×16") and that used for up-conversion to 32×32 ("8×8 for 32×32").

Figure 3:
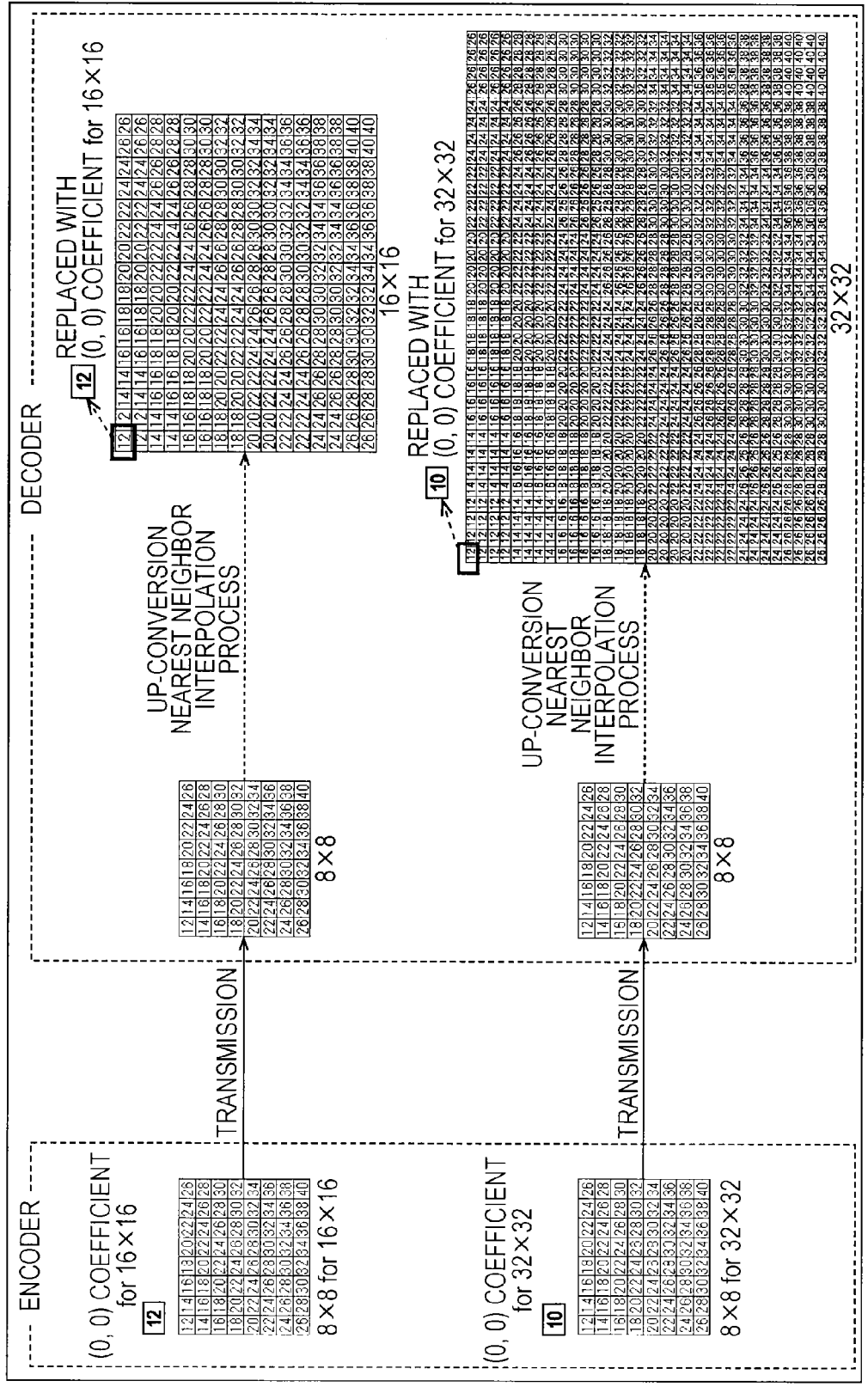
FIG. 3 is a diagram illustrating an example of how a scaling list is used in a decoder.

The scaling list used for quantization during encoding (using an encoder) is also used for dequantization during decoding (using a decoder). That is, the scaling list is transmitted from the encoding side (the encoder) to the decoding side (the decoder). FIG. 3 illustrates an example of the transmission of scaling lists.

As in the example illustrated in FIG. 3, the two types of 8×8 scaling lists, namely, that used for up-conversion to a 16×16 size and that used for up-conversion to a 32×32 size, as described above, are transmitted. Although not illustrated in the drawings, a 4×4 scaling list is also transmitted.

The AC coefficients of the 8×8 scaling list used for up-conversion to a 16×16 size, which has been transmitted in the manner described above, are up-converted to the 16×16 size at the decoding side (the decoder) using the nearest neighbor interpolation process described above, and are used for the dequantization of a block having a 16×16 size after the (0, 0) coefficient is replaced with the DC coefficient.

Similarly, the AC coefficients of the 8×8 scaling list used for up-conversion to a 32×32 size, which has been transmitted in the manner described above, are also up-converted to the 32×32 size at the decoding side (the decoder) using the nearest neighbor interpolation process described above, and are used for the dequantization of a block having a 32×32 size after the (0, 0) coefficient is replaced with the DC coefficient.

<1-2. Encoding of Scaling List>

Figure 4:
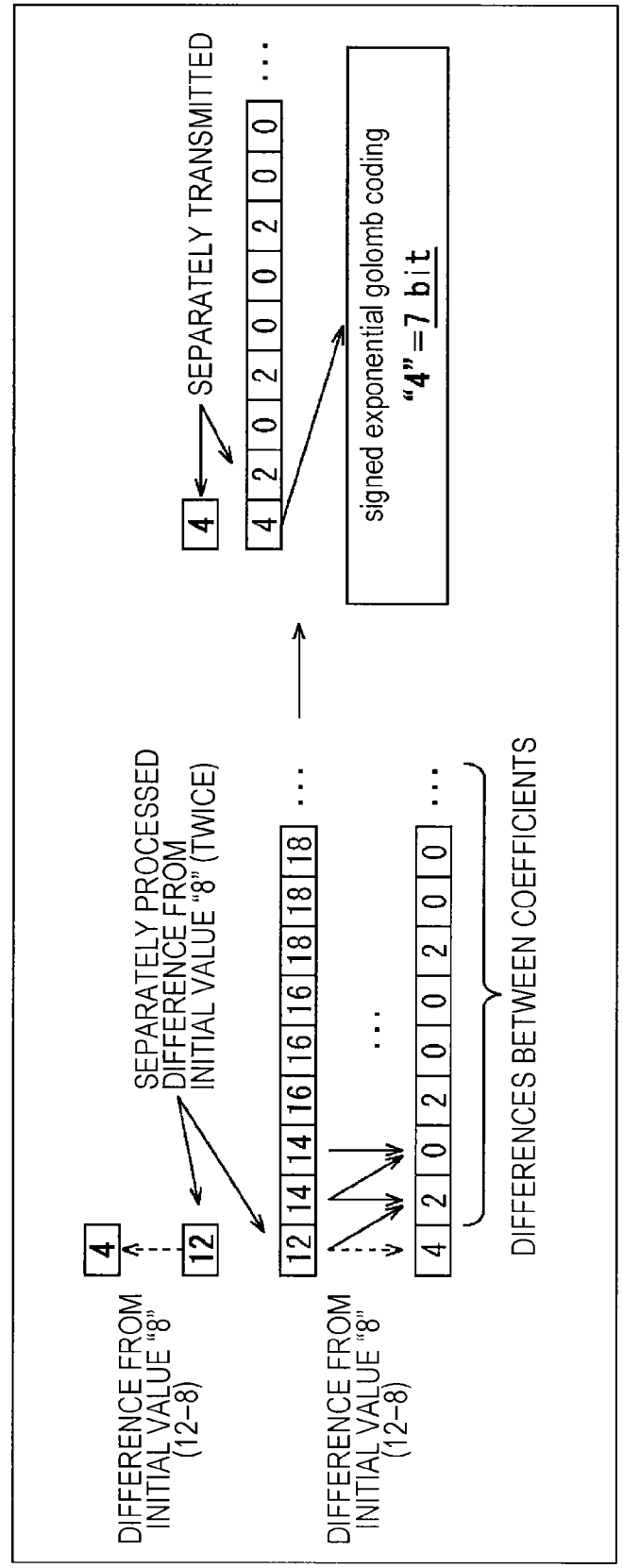
FIG. 4 is a diagram illustrating an example of the encoding of a scaling list.

The transmission of scaling lists in the manner described above will increase the amount of coding accordingly. Thus, in order to suppress a reduction in coding efficiency, the scaling lists are encoded using a certain method to reduce the amount of coding of the scaling lists. FIG. 4 illustrates an example of the encoding of a scaling list. Specifically, an 8×8 scaling list is transmitted as follows.

In the case of up-conversion of an 8×8 matrix to a 16×16 matrix:

(1) A difference between the (0, 0) coefficient (that is, the AC coefficient (0, 0)) of the 8×8 matrix and a predetermined initial value "8" is taken.

(2) Differences between coefficients (that is, AC coefficients) (adjacent coefficients in a sequence of coefficients one-dimensionally arranged in scan order) of the 8×8 matrix are taken.

(3) A difference between the (0, 0) coefficient (that is, the DC coefficient) of the 16×16 matrix and a predetermined initial value "8" is taken.

(4) The differences obtained in (1) and (2) and the difference obtained in (3) are transmitted separately.

In the case of up-conversion of an 8×8 matrix to a 32×32 matrix:

(1) A difference between the (0, 0) coefficient (that is, the AC coefficient (0, 0)) of the 8×8 matrix and a predetermined initial value "8" is taken.

(2) Differences between coefficients (that is, AC coefficients) (adjacent coefficients in a sequence of coefficients one-dimensionally arranged in scan order) of the 8×8 matrix are taken.

(3) A difference between the (0, 0) coefficient (that is, the DC coefficient) of the 32×32 matrix and a predetermined initial value "8" is taken.

(4) The differences obtained in (1) and (2) and the difference obtained in (3) are transmitted separately.

In the method described above, however, the differences are encoded using signed exponential Golomb coding and are transmitted in (4). As described above, the difference obtained in (1) is the difference between the AC coefficient (0, 0) and the initial value "8". Thus, there is a concern that the amount of coding may be increased if the value of the AC coefficient (0, 0) is not a value close to the initial value "8".

For example, in FIG. 4, the value of the AC coefficient (0, 0) is "12", and the value "4" is encoded using signed exponential Golomb coding and is transmitted as the difference obtained in (1). That is, 7 bits are required for the transmission of the difference obtained in (1) and coding efficiency may be reduced correspondingly. If the value of the difference obtained in (1) increases, coding efficiency may further be reduced. The same is true for the case of an 8×8 scaling list used for up-conversion to a 16×16 size and an 8×8 scaling list used for up-conversion to a 32×32 size.

Meanwhile, the energy of DCT coefficients is generally concentrated in the DC coefficient and neighboring low-order coefficients. Therefore, in general, a quantization matrix also has small values for the DC coefficient and neighboring coefficients. Furthermore, if values that are significantly different are used for individual frequencies, a quantization error may be subjectively noticeable. In order to suppress such visual deterioration in image quality, consecutive values are used for the DC coefficient and neighboring coefficients.

The (0, 1) coefficient, (1. 0) coefficient, and (1. 1) coefficient obtained after up-conversion correspond to the AC coefficient (0, 0) before up-conversion. Furthermore, the (0, 0) coefficient obtained after up-conversion corresponds to the DC coefficient.

Thus, in scaling lists, the value of the AC coefficient (0, 0) and the value of the DC coefficient are generally close to each other. For example, MPEG2, AVC, and HEVC default matrices take values having such a relationship. Also in the example illustrated in FIG. 4, the value of the DC coefficient is the same as the value of AC coefficient (0, 0), that is, "12". Thus, the value of the difference obtained in (3), that is, the difference between the DC coefficient and the initial value "8", is also "4".

That is, taking a difference between each of the DC coefficient and the AC coefficient (0, 0), whose values are close to each other, and the initial value may increase the difference value therebetween, and may also cause redundancy. It can be said that there will be a risk of further reducing coding efficiency.

Figure 5:
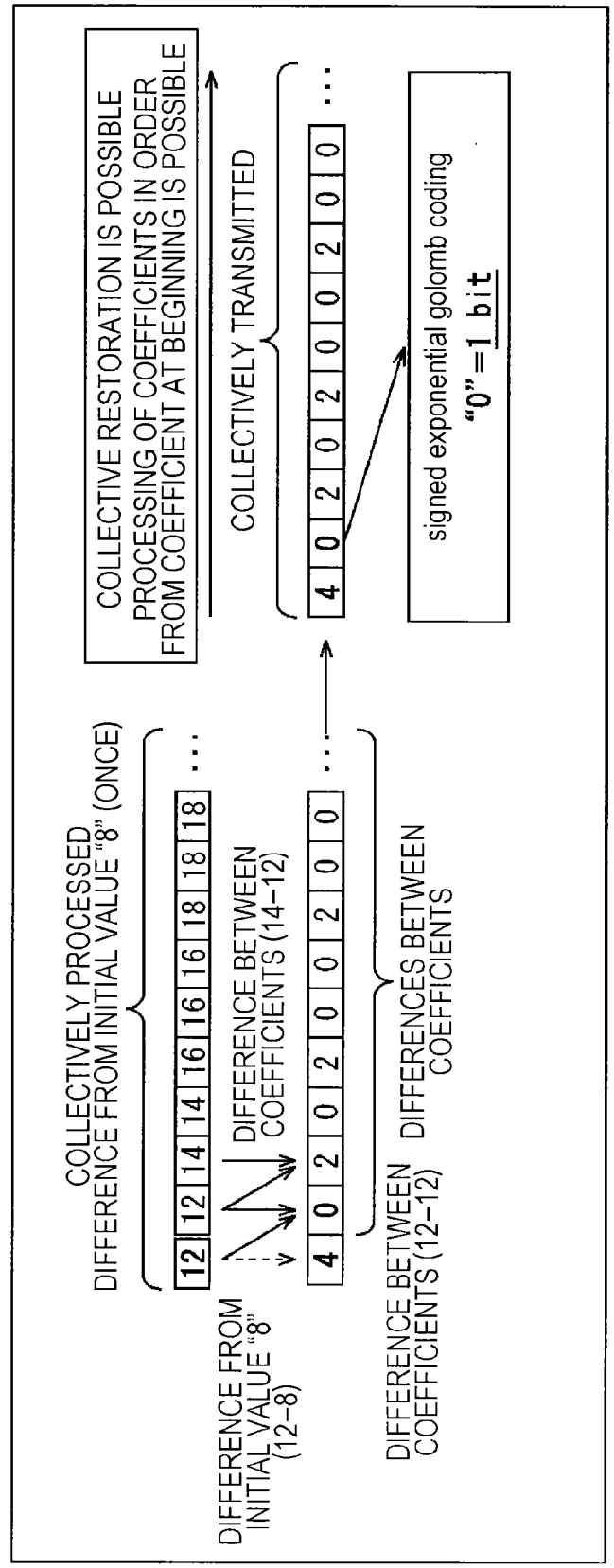
FIG. 5 is a diagram illustrating an example of the encoding of a scaling list using the present technology.

To address this, a scaling list is transmitted using the following method instead of using the method illustrated in FIG. 4. FIG. 5 illustrates an example of this method.

In the case of up-conversion of an 8×8 matrix to a 16×16 matrix:

(1) A difference between the (0, 0) coefficient (that is, the AC coefficient (0, 0)) of the 8×8 matrix and the (0, 0) coefficient (that is, the DC coefficient) of the 16×16 matrix is taken.

(2) Differences between coefficients (that is, AC coefficients) (adjacent coefficients in a sequence of coefficients one-dimensionally arranged in scan order) of the 8×8 matrix are taken.

(3) A difference between the (0, 0) coefficient (that is, the DC coefficient) of the 16×16 matrix and a predetermined initial value "8" is taken.

(4) The differences obtained in (1) to (3) are collectively transmitted.

In the case of up-conversion of an 8×8 matrix to a 32×32 matrix:

(1) A difference between the (0, 0) coefficient (that is, the AC coefficient (0, 0)) of the 8×8 matrix and the (0, 0) coefficient (that is, the DC coefficient) of the 32×32 matrix is taken.

(2) Differences between coefficients (that is, AC coefficients) (adjacent coefficients in a sequence of coefficients one-dimensionally arranged in scan order) of the 8×8 matrix are taken.

(3) A difference between the (0, 0) coefficient (that is, the DC coefficient) of the 32×32 matrix and a predetermined initial value "8" is taken.

(4) The differences obtained in (1) to (3) are collectively transmitted.

Similarly to the method illustrated in FIG. 4, in (4), the differences are encoded using exponential Golomb coding and are transmitted as exponential Golomb codes.

At the destination to which the differences are transmitted as exponential Golomb codes, when the exponential Golomb codes are received, the received exponential Golomb codes are decoded to obtain the individual differences, and the processes inverse to those in (1) to (3) described above are performed on the obtained differences to determine the individual coefficients (the DC coefficient and the AC coefficients).

<1-3. Exemplary Features of Present Technology>

Exemplary features of the present technology related to the transmission method described above will now be described.

<1-3-1. DPCM Between AC Coefficient (0, 0) and DC Coefficient>

Scaling lists are encoded using differential pulse-code modulation (DPCM) and are transmitted. In the example illustrated in FIG. 4, the AC coefficients and the DC coefficient are DPCM encoded individually, whereas, according to one of the features of the present technology, as in the example illustrated in FIG. 5, a difference (also referred to as a replacement difference coefficient) between the AC coefficient (0, 0) and the DC coefficient is determined and transmitted.

As described above, the AC coefficient (0, 0) and the DC coefficient generally take values that are close to each other. Thus, a difference between the AC coefficient (0, 0) and the DC coefficient may possibly be smaller than a difference between the AC coefficient (0, 0) and the initial value "8". That is, the transmission of a replacement difference coefficient that is a difference between the AC coefficient (0, 0)

and the DC coefficient using the present technology may be more likely to reduce the amount of coding.

For example, in the example illustrated in FIG. 5, the value of the difference obtained in (1) is "0".

FIG. 6 is a table illustrating an example of signed exponential Golomb coding. As indicated in the table illustrated in FIG. 6, the exponential Golomb code for the value "4" has a code length of 7 bits whereas the exponential Golomb code for the value "0" has a code length of 1 bit. That is, the method illustrated in FIG. 5 can reduce the amount of coding by 6 bits compared to the method illustrated in FIG. 4.

In general, a coding amount of approximately 100 bits to 200 bits is required for the transmission of a quantization matrix having an 8×8 size. Hence, 6 bits occupy approximately 6% of the total amount. A reduction in the amount of coding by 6% in High Level Syntax can be said to be a very large effect.

<1-3-2. Collective Transmission of DC Coefficient and AC Coefficients>

FIG. 7 illustrates an example of the syntax of a scaling list. The syntax for the example illustrated in FIG. 4 is illustrated in an example illustrated in part A of FIG. 7. Specifically, after the difference between the AC coefficient (0, 0) and the initial value "8" and the differences between the AC coefficients (scaling_list_delta_coef) are transmitted, the difference between the DC coefficient and the initial value "8" (scaling_list_dc_coef_minus8) is separately transmitted.

In contrast, one of the features of the present technology is that the difference between the DC coefficient and the AC coefficient (0, 0) and the differences between the AC coefficients are arranged in this order and are collectively transmitted. Specifically, as illustrated in FIG. 5, after the DC coefficient and the AC coefficients arranged in a predetermined scan order are one-dimensionally arranged and the difference between the DC coefficient and the initial value "8" is determined, the differences between adjacent coefficients in the sequence of coefficients are determined. Further, the resulting differences (differences between coefficients) are one-dimensionally arranged in the order of being obtained and are collectively transmitted.

The syntax in this case is illustrated in an example in part B of FIG. 7. Specifically, initially, the difference between the DC coefficient and the initial value "8" (scaling_list_dc_coef_minus8) is transmitted, and then the difference between the DC coefficient and the AC coefficient (0, 0) and the differences between the AC coefficients (scaling_list_delta_coef) are transmitted. That is, the DC coefficient and the AC coefficients are collectively encoded and transmitted.

In this manner, the collective transmission of the differences arranged in the order of being obtained allows the decoding side (the decoder) to which the differences are transmitted to decode the differences in the order of being transmitted and obtain the individual coefficients. That is, a DPCM encoded scaling list can be easily decoded. More specifically, the processing load can be reduced. In addition, the rearrangement of the differences is no longer necessary, resulting in a reduction in buffer capacity. Furthermore, the respective differences can be decoded in the order of being supplied, resulting in suppression of an increase in processing time.

<1-3-3. Transmission of Default Matrix>

FIG. 8 is a diagram illustrating an example of the syntax for the transmission of a default matrix. In the related art, as illustrated in FIG. 8, the initial coefficient (that is, the DC coefficient) is transmitted as "0" to transmit information indicating the use of a default matrix. That is, the value of the difference between the DC coefficient and the initial value "8" (scaling_list_dc_coef_minus8) is "−8". However, as illustrated in FIG. 6, the exponential Golomb code for the value "−8" has a code length of 9 bits. That is, there is a concern that coding efficiency may be significantly reduced. In general, it is desirable that the number of bits of High Level Syntax is as small as possible. In addition, as illustrated in FIG. 8, due to the increased complexity of the syntax, the processing load may be increased.

To address these issues, the initial coefficient is not set to "0" but the semantics of scaling_list_pred_matrix_id_delta is modified. More specifically, the semantics of scaling_list_pred_matrix_id_delta is modified from that illustrated in part A of FIG. 9 to that illustrated in part B of FIG. 9. That is, in the related art, as illustrated in part A of FIG. 9, the value equal to "0" indicates that the immediately preceding matrix (MatrixID−1) is referred to. Instead of this description, as illustrated in part B of FIG. 9, the value of scaling_list_pred_matrix_id_delta equal to "0" means that a default matrix is referred to.

Accordingly, the code length of an exponential Golomb code for the transmission of information indicating the use of a default matrix can be equal to 1 bit, and a reduction in coding efficiency can be suppressed. Furthermore, in the related art, syntax as illustrated in parts A and B of FIG. 10 is necessary for a scaling list. This syntax can be simplified as in an example illustrated in FIG. 11. That is, the processing load involved in the encoding and decoding of a scaling list can be reduced.

<1-4. Features of Syntax with Use of Present Technology>

Syntax will be more specifically described.

In the example of the related art illustrated in parts A and B of FIG. 10, the determination of default needs to be performed twice, namely, scaling_list_dc_coef_minus8 and scaling_list_delta_coef. In addition, for scaling_list_delta_coef, determination is made in the middle of the "for" loop, and the loop exits when useDefaultScalingMatrixFlag=1. Furthermore, an intermediate flag called "stopNow" is needed, and, because of this condition, a branch such as substituting nextCoef into the value of scalingList further exists. In this manner, the syntax of the related art involves complicated processing.

In the present technology, accordingly, as in the example illustrated in FIG. 11, the DC coefficient calculated from scaling_list_dc_coef_minus8 is substituted into nextCoef to set the initial value of scaling_list_delta_coef to the DC coefficient.

Furthermore, in semantics, the value of scaling_list_pred_matrix_id_delta, which is represented by "+1" in the related art, remains unchanged, and the value "0" is used as a special value.

That is to say, in the related art, when ScalingList[0][2] is to be decoded (matrixId=2), if scaling_list_pred_matrix_id_delta=0, then matrixId=2 is obtained from refMatrixId=matrixId−(1+scaling_list_pred_matrix_id_delta). Thus, refMatrixId=1 is obtained, and the value of ScalingList[0][1] is copied.

In contrast, in the present technology, refMatrixId=matrixId−scaling_list_pred_matrix_id_delta is set. When ScalingList[0][2] is to be decoded (matrixId=2), scaling_list_pred_matrix_id_delta=1 may be set if ScalingList[0][1] is to be copied (or if refMatrixId=1 is to be obtained).

Accordingly, as illustrated in FIG. 11, the number of rows of the syntax for a scaling list can be significantly reduced. In addition, two variables to be included as intermediate data, namely, UseDefaultScalingMatrix and stopNow, can be omitted. Furthermore, branch made in the "for" loop as illustrated in FIG. 10 can be no longer required. Therefore, the processing load involved in the encoding and decoding of a scaling list can be reduced.

<1-5. Processing Units Implementing Present Technology>

In a case where the present technology is applied to the transmission of a scaling list, a scaling list is encoded and decoded in the manner described above. Specifically, an image encoding device 10 described below with reference to FIG. 14 encodes a scaling list and transmits the encoded scaling list, and an image decoding device 300 described below with reference to FIG. 22 receives and decodes the encoded scaling list.

A scaling list is encoded by a matrix processing unit 150 (FIG. 15) in an orthogonal transform/quantization unit 14 (FIG. 14) of the image encoding device 10. More specifically, a scaling list is encoded by a DPCM unit 192 and an exp-G unit 193 (both are illustrated in FIG. 16) in an entropy encoding unit 164 (FIG. 16) in the matrix processing unit 150. That is, the DPCM unit 192 determines differences between coefficients (the DC coefficient and the AC coefficients) of the scaling list, and the exp-G unit 193 encodes the individual differences using exponential Golomb coding.

Figure 19:
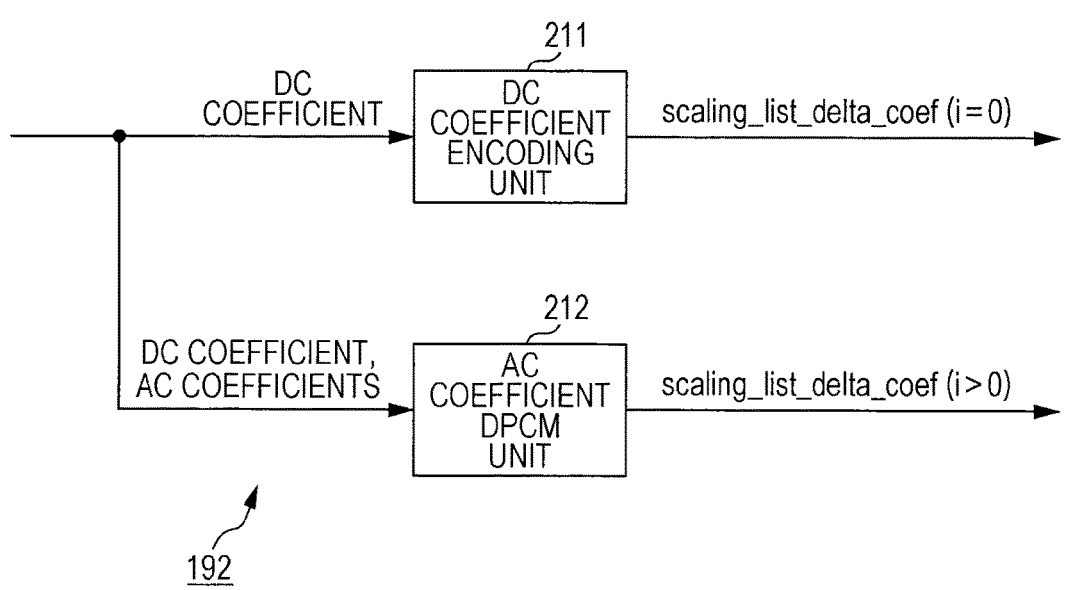
FIG. 19 is a block diagram illustrating an example of a main configuration of a DPCM unit.
Figure 21:
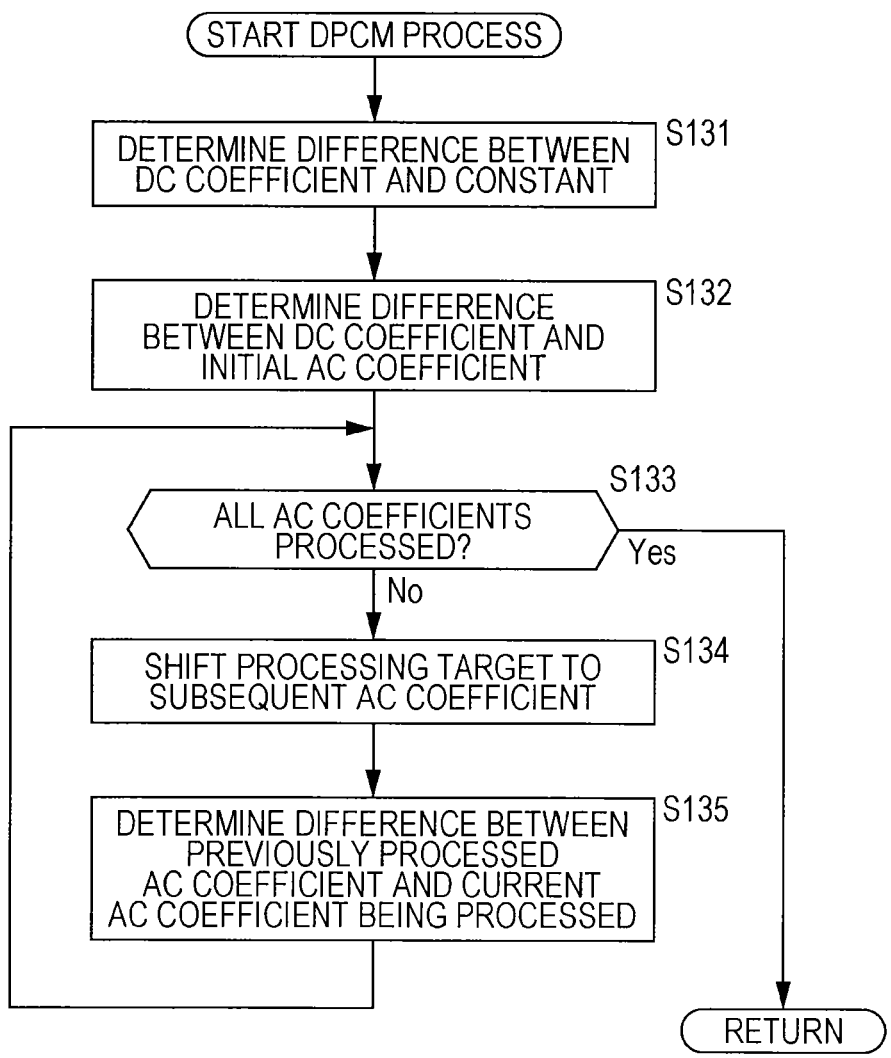
FIG. 21 is a flowchart illustrating an example of the flow of a DPCM process.

In order to encode a scaling list using the present technology as described above, the DPCM unit 192 may have an example configuration as illustrated in, for example, FIG. 19, and may perform a DPCM process as in an example illustrated in FIG. 21. Furthermore, semantics as in an example illustrated in part C of FIG. 44 or part C of FIG. 45 may be used.

In other words, only the DPCM unit 192 and the exp-G unit 193 may be required to achieve the encoding of a scaling list using the present technology, and other components having any configuration may be used as desired. A necessary configuration, such as a processing unit for up-converting a scaling list and a processing unit for performing quantization using a scaling list, may be provided in accordance with embodiments.

Furthermore, a scaling list is decoded by a matrix generation unit 410 (FIG. 23) in a dequantization/inverse orthogonal transform unit 313 (FIG. 22) of the image decoding device 300. More specifically, a scaling list is decoded by an exp-G unit 551 and an inverse DPCM unit 552 (FIG. 24) in an entropy decoding unit 533 (FIG. 24) in the matrix generation unit 410. That is, the exp-G unit 551 decodes the Golomb codes to obtain differences, and the inverse DPCM unit 552 determines individual coefficients (the DC coefficient and the AC coefficients) of the scaling list from the respective differences.

Figure 26:
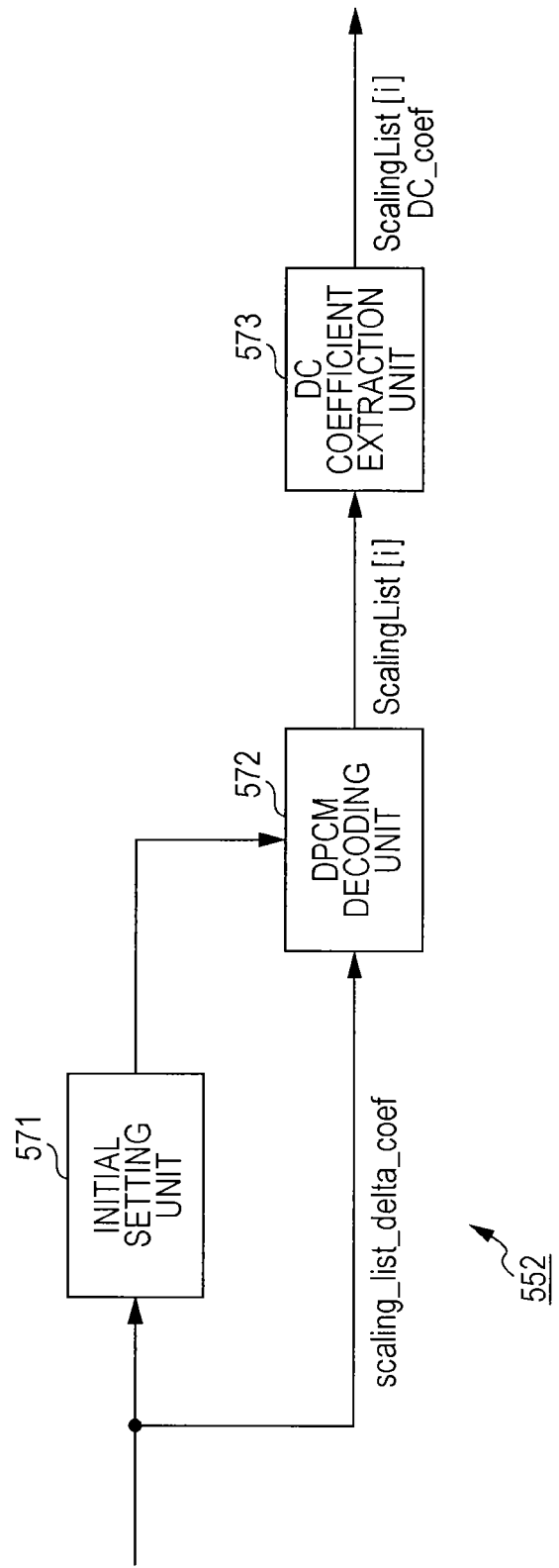
FIG. 26 is a block diagram illustrating an example of a main configuration of an inverse DPCM unit.
Figure 29:
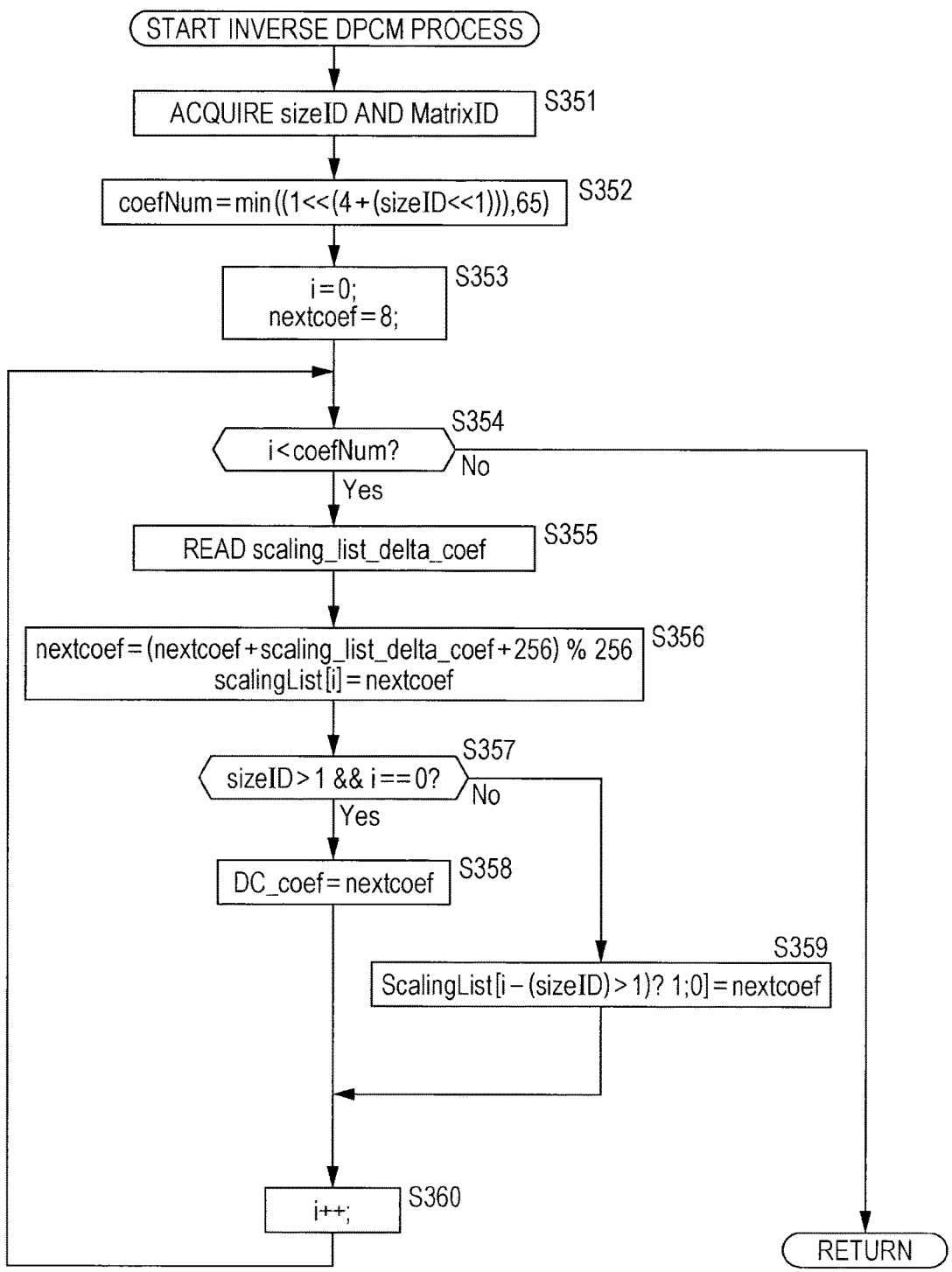
FIG. 29 is a flowchart illustrating an example of the flow of an inverse DPCM process.

In order to decode an encoded scaling list using the present technology as described above, the inverse DPCM unit 552 may have an example configuration as illustrated in, for example, FIG. 26, and may perform an inverse DPCM process as in an example illustrated in FIG. 29. Furthermore, semantics as in an example illustrated in part C of FIG. 44 or part C of FIG. 45 may be used.

In other words, only the exp-G unit 551 and the inverse DPCM unit 552 may be required to achieve the decoding of a scaling list using the present technology, and other components having any configuration may be used as desired. A necessary configuration, such as a processing unit for up-converting a scaling list and a processing unit for performing dequantization using a scaling list, may be provided in accordance with embodiments.

Individual embodiments to which the present technology is applied will be described hereinafter for more detailed description of the present technology.

<2. Second Embodiment>
<2-1. Syntax: First Method>
(1) Syntax of Related Art

First, FIG. 12 illustrates an example of the syntax of a quantization matrix (or scaling list) in the related art. In actual use, a difference matrix between a scaling list and a prediction matrix thereof, rather than the scaling list, is generally transmitted. Thus, in the following description of syntax and so forth, it is assumed that the description of a scaling list can also apply to a difference matrix.

Part A of FIG. 12 illustrates the syntax for scaling list data (scaling list data syntax), and part B of FIG. 12 illustrates the syntax of a scaling list (scaling list syntax).

(1-1) Scaling List Data Syntax

As illustrated in part A of FIG. 12, the syntax for scaling list data specifies that a flag (scaling_list_present_flag) indicating whether or not a scaling list is provided, a flag (scaling_list_pred_mode_flag) indicating whether or not the current mode is a copy mode, information (scaling_list_pred_matrix_id_delta) indicating which scaling list to refer to in the copy mode, and so forth are read.

(1-2) Scaling List Syntax

As illustrated in part B of FIG. 12, the syntax of a scaling list specifies that the DC coefficient from which a constant (for example, 8) is subtracted (scaling_list_dc_coef_minus8), a difference value (scaling_list_delta_coef) between AC coefficients, and so forth are read and that the DC coefficient and the AC coefficients are restored.

However, there is a concern that the pieces of syntax described above will not provide sufficient compression efficiency of the DC coefficient although it facilitates processes.

Accordingly, in order to obtain sufficient compression efficiency of a DC coefficient (also referred to as a direct current coefficient), which is the coefficient of the DC component (direct current component), a difference between the DC coefficient and another coefficient is determined, and the difference value is transmitted instead of the DC coefficient. That is, the difference value is information for calculating the DC coefficient, and, in other words, is substantially equivalent to the DC coefficient. However, the difference value is generally smaller than the DC coefficient. Therefore, the transmission of the difference value instead of the DC coefficient may result in a reduction in the amount of coding.

In the following description, for convenience of description, a scaling list (quantization matrix) has an 8×8 size. A specific example of the method for transmitting a difference between the DC coefficient and another coefficient, instead of the DC coefficient, described above will be described hereinafter.

(2) Syntax for First Method

For example, 65 coefficients may be transmitted using DPCM (Differential Pulse Code Modulation), where the DC coefficient is considered as the element located at the beginning of an 8×8 matrix (AC coefficients) (first method).

That is, first, a difference between a predetermined constant and the DC coefficient is calculated, and is used as the initial coefficient of DPCM data. Then, a difference between the DC coefficient and the initial AC coefficient is calculated, and is used as the second coefficient of the DPCM data. Then, a difference between the initial AC coefficient and the second AC coefficient is calculated, and is used as the third coefficient of the DPCM data. Subsequently, a difference from the immediately preceding AC coefficient is calculated, and is used as the fourth coefficient of the DPCM data, and the following coefficients of the DPCM data are determined in a manner similar to that described above. The coefficients of DPCM data generated in the manner described above are sequentially transmitted, starting from the initial coefficient.

Accordingly, compression ratio can be improved when the values of the (0, 0) coefficient (AC coefficient) of an 8×8 matrix and the DC coefficient are close to each other. By implementing the first method described above, an image encoding device can process the DC coefficient in a manner similar to that of AC coefficients (alternating current coefficients), which are the coefficients of the AC components (also referred to as the alternating current components). Note that, in order to implement the first method described above, an image decoding device to which the coefficients described above are transmitted needs to specially handle only the initial coefficient. Specifically, the image decoding device needs to extract the DC coefficient from among the AC coefficients.

FIG. 13 illustrates the syntax of a scaling list in the case described above. In the example illustrated in FIG. 13, 65 difference values (scaling_list_delta_coef) between coefficients are read, and, among coefficients (nextcoef) determined from the difference values, the coefficient (nextcoef) located at the beginning is used as the DC coefficient (scaling_list_dc_coef) while the other coefficients are used as the AC coefficients (ScalingList[i]).

An image encoding device that implements the syntax for the first method described above will be described hereinafter.

<2-2. Image Encoding Device>

Figure 14:
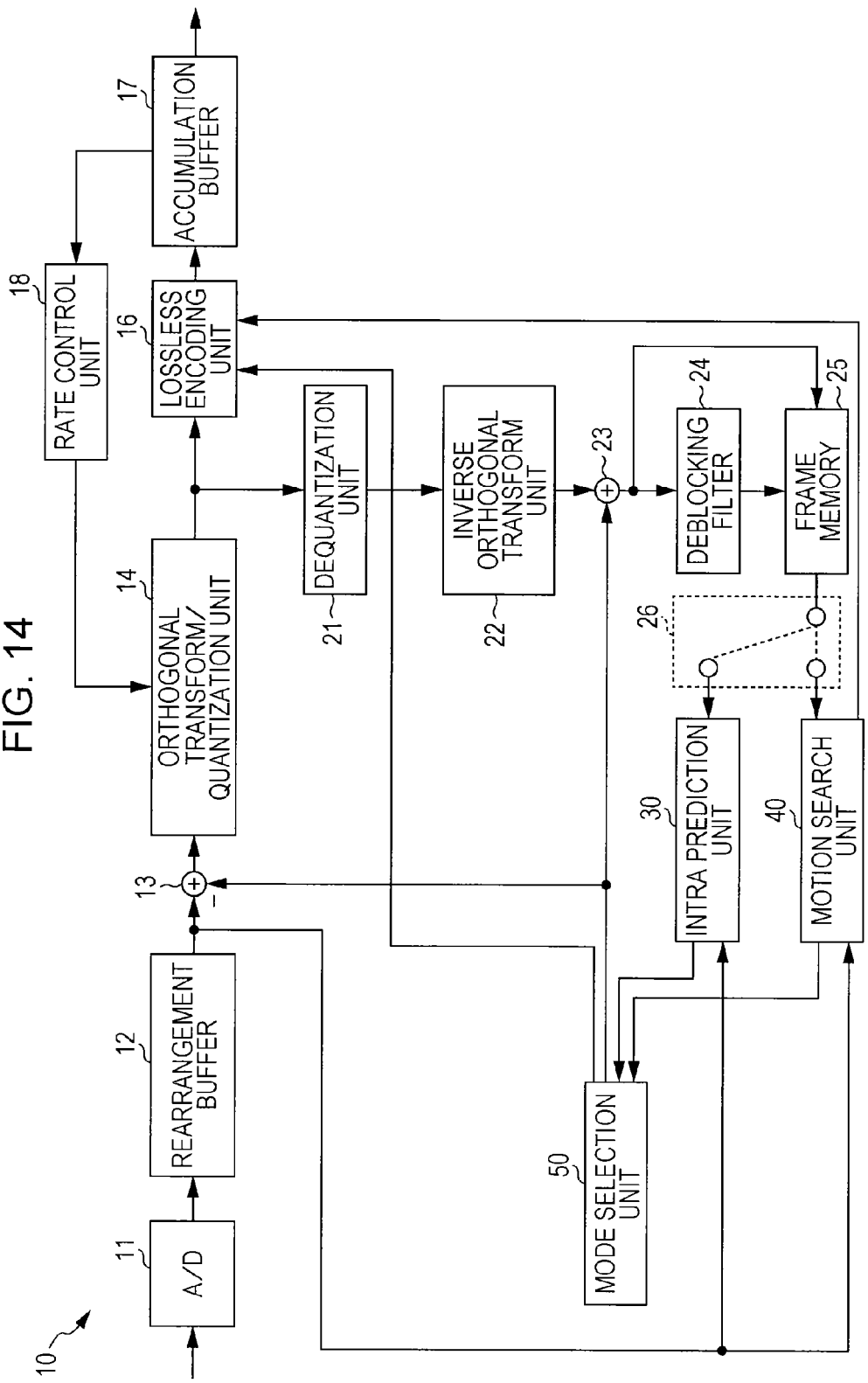
FIG. 14 is a block diagram illustrating an example of a main configuration of an image encoding device.

FIG. 14 is a block diagram illustrating an example configuration of an image encoding device 10 according to an embodiment of the present disclosure. The image encoding device 10 illustrated in FIG. 14 is an image processing device to which the present technology is applied and that is configured to encode input image data and output the encoded image data. Referring to FIG. 14, the image encoding device 10 includes an A/D (Analogue to Digital) conversion unit 11 (A/D), a rearrangement buffer 12, a subtraction unit 13, an orthogonal transform/quantization unit 14, a lossless encoding unit 16, an accumulation buffer 17, a rate control unit 18, a dequantization unit 21, an inverse orthogonal transform unit 22, an adder unit 23, a deblocking filter 24, a frame memory 25, a selector 26, an intra prediction unit 30, a motion search unit 40, and a mode selection unit 50.

The A/D conversion unit 11 converts an image signal input in analog form to image data in digital form, and outputs a digital image data sequence to the rearrangement buffer 12.

The rearrangement buffer 12 rearranges images included in the image data sequence input from the A/D conversion unit 11. After rearranging the images in accordance with a GOP (Group of Pictures) structure for use in an encoding process, the rearrangement buffer 12 outputs the image data in which the images have been rearranged to the subtraction unit 13, the intra prediction unit 30, and the motion search unit 40.

The subtraction unit 13 is supplied with the image data input from the rearrangement buffer 12 and prediction image data selected by the mode selection unit 50, which will be described below. The subtraction unit 13 calculates prediction error data that represents the difference between the image data input from the rearrangement buffer 12 and the prediction image data input from the mode selection unit 50, and outputs the calculated prediction error data to the orthogonal transform/quantization unit 14.

The orthogonal transform/quantization unit 14 performs an orthogonal transform and quantization on the prediction error data input from the subtraction unit 13, and outputs quantized transform coefficient data (hereinafter referred to as quantized data) to the lossless encoding unit 16 and the dequantization unit 21. The bit rate of the quantized data output from the orthogonal transform/quantization unit 14 is controlled in accordance with a rate control signal supplied from the rate control unit 18. A detailed configuration of the orthogonal transform/quantization unit 14 will further be described below.

The lossless encoding unit 16 is supplied with the quantized data input from the orthogonal transform/quantization unit 14, information for generating a scaling list (or quantization matrix) on the decoding side, and information concerning intra prediction or inter prediction which is selected by the mode selection unit 50. The information concerning intra prediction may include, for example, prediction mode information indicating an optimum intra-prediction mode for each block. Furthermore, the information concerning inter prediction may include, for example, prediction mode information for block-by-block prediction of motion vectors, differential motion vector information, reference image information, and so forth. Moreover, the information for generating a scaling list on the decoding side may include identification information indicating a maximum size of a scaling list to be transmitted (or a difference matrix between a scaling list (quantization matrix) and a prediction matrix thereof).

The lossless encoding unit 16 performs a lossless encoding process on the quantized data to generate an encoded stream. The lossless encoding performed by the lossless encoding unit 16 may be, for example, variable-length encoding, arithmetic encoding, or the like. Furthermore, the lossless encoding unit 16 multiplexes information for generating a scaling list into the header (for example, a sequence parameter set and a picture parameter set) of the encoded stream. The lossless encoding unit 16 further multiplexes the information concerning intra prediction or inter prediction described above into the header of the encoded stream. After that, the lossless encoding unit 16 outputs the generated encoded stream to the accumulation buffer 17.

The accumulation buffer 17 temporarily accumulates the encoded stream input from the lossless encoding unit 16, using a storage medium such as a semiconductor memory. After that, the accumulation buffer 17 outputs the accumulated encoded stream at a rate corresponding to the bandwidth of a transmission path (or an output line from the image encoding device 10).

The rate control unit 18 monitors the accumulation buffer 17 to check the availability of capacity. The rate control unit 18 generates a rate control signal in accordance with the available capacity of the accumulation buffer 17, and outputs the generated rate control signal to the orthogonal transform/quantization unit 14. For example, when the available capacity of the accumulation buffer 17 is low, the rate control unit 18 generates a rate control signal for reducing the bit rate of the quantized data. Alternatively, for example, when the available capacity of the accumulation buffer 17 is sufficiently high, the rate control unit 18 generates a rate control signal for increasing the bit rate of the quantized data.

The dequantization unit 21 performs a dequantization process on the quantized data input from the orthogonal transform/quantization unit 14. After that, the dequantization unit 21 outputs transform coefficient data acquired through the dequantization process to the inverse orthogonal transform unit 22.

The inverse orthogonal transform unit 22 performs an inverse orthogonal transform process on the transform coefficient data input from the dequantization unit 21 to restore prediction error data. After that, the inverse orthogonal transform unit 22 outputs the restored prediction error data to the adder unit 23.

The adder unit 23 adds together the restored prediction error data input from the inverse orthogonal transform unit 22 and the prediction image data input from the mode selection unit 50 to generate decoded image data. After that, the adder unit 23 outputs the generated decoded image data to the deblocking filter 24 and the frame memory 25.

The deblocking filter 24 performs a filtering process for reducing blocking artifacts caused by the encoding of an image. The deblocking filter 24 filters the decoded image data input from the adder unit 23 to remove (or at least reduce) blocking artifacts, and outputs the filtered decoded image data to the frame memory 25.

The frame memory 25 stores the decoded image data input from the adder unit 23 and the filtered decoded image data input from the deblocking filter 24, using a storage medium.

The selector 26 reads decoded image data to be filtered, which is used for intra prediction, from the frame memory 25, and supplies the read decoded image data to the intra prediction unit 30 as reference image data. The selector 26 further reads filtered decoded image data, which is used for inter prediction, from the frame memory 25, and supplies the read decoded image data to the motion search unit 40 as reference image data.

The intra prediction unit 30 performs an intra prediction process in each intra-prediction mode on the basis of the image data to be encoded, which is input from the rearrangement buffer 12, and the decoded image data supplied via the selector 26. For example, the intra prediction unit 30 evaluates a prediction result obtained in each intra-prediction mode using a predetermined cost function. Then, the intra prediction unit 30 selects an intra-prediction mode that minimizes the cost function value, that is, an intra-prediction mode that provides the highest compression ratio, as an optimum intra-prediction mode. Furthermore, the intra prediction unit 30 outputs prediction mode information indicating the optimum intra-prediction mode, prediction image data, and information concerning intra prediction, such as the cost function value, to the mode selection unit 50.

The motion search unit 40 performs an inter prediction process (or an inter-frame prediction process) on the basis of the image data to be encoded, which is input from the rearrangement buffer 12, and the decoded image data supplied via the selector 26. For example, the motion search unit 40 evaluates a prediction result obtained in each prediction mode using a predetermined cost function. Then, the motion search unit 40 selects a prediction mode that minimizes the cost function value, that is, a prediction mode that provides the highest compression ratio, as an optimum prediction mode. Furthermore, the motion search unit 40 generates prediction image data in accordance with the optimum prediction mode. The motion search unit 40 outputs information concerning inter prediction which includes prediction mode information indicating the selected optimum prediction mode, the prediction image data, and information concerning inter prediction, such as the cost function value, to the mode selection unit 50.

The mode selection unit 50 compares the cost function value for intra prediction, which is input from the intra prediction unit 30, with the cost function value for inter prediction, which is input from the motion search unit 40. Then, the mode selection unit 50 selects a prediction technique having the smaller one of the cost function values for intra prediction and inter prediction. If intra prediction is selected, the mode selection unit 50 outputs the information concerning intra prediction to the lossless encoding unit 16, and also outputs the prediction image data to the subtraction unit 13 and the adder unit 23. Alternatively, if inter prediction is selected, the mode selection unit 50 outputs the information concerning inter prediction described above to the lossless encoding unit 16, and also outputs the prediction image data to the subtraction unit 13 and the adder unit 23.

<2-3. Example Configuration of Orthogonal Transform/Quantization Unit>

Figure 15:
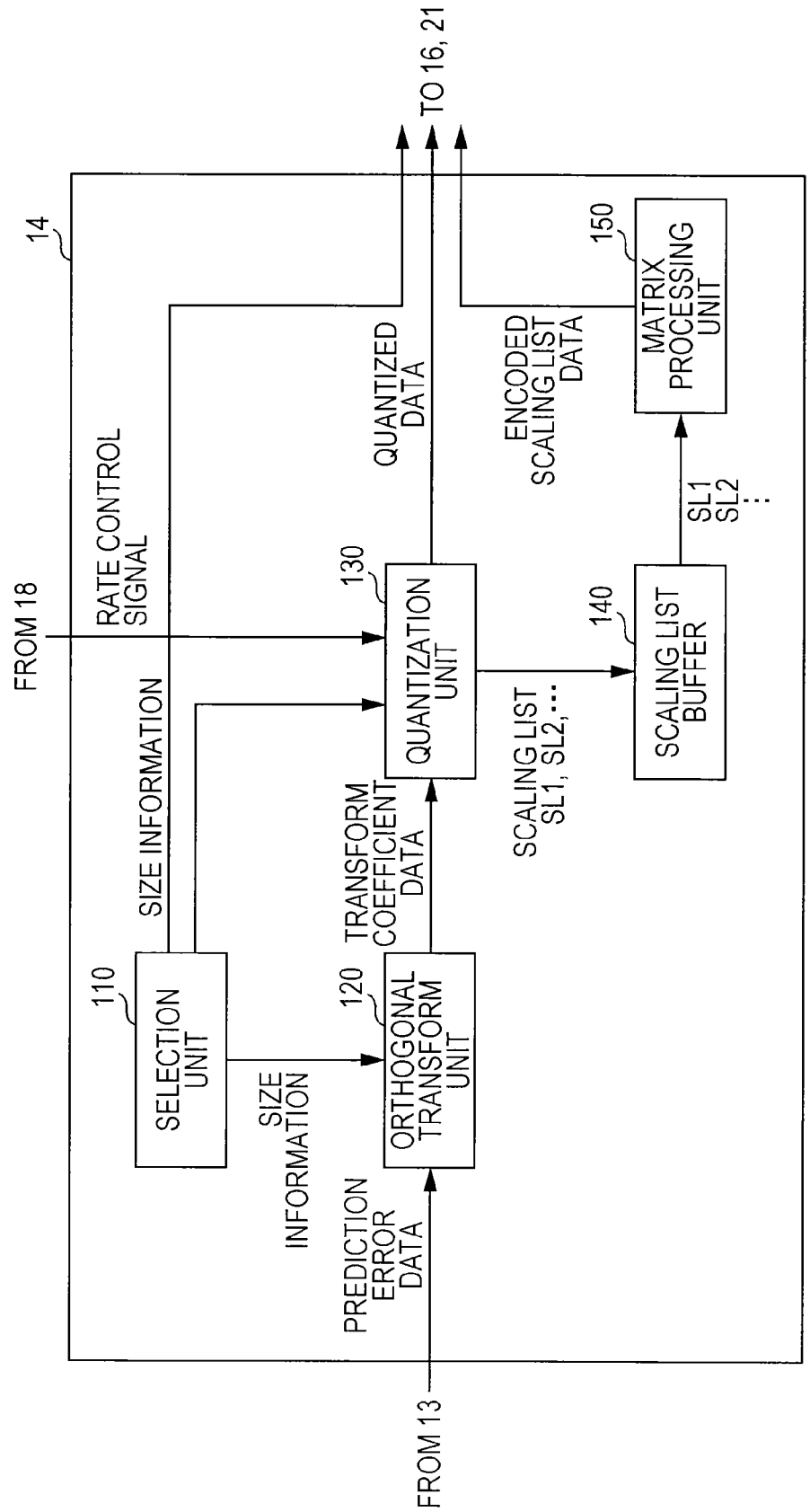
FIG. 15 is a block diagram illustrating an example of a main configuration of an orthogonal transform/quantization unit.
Figure 16:
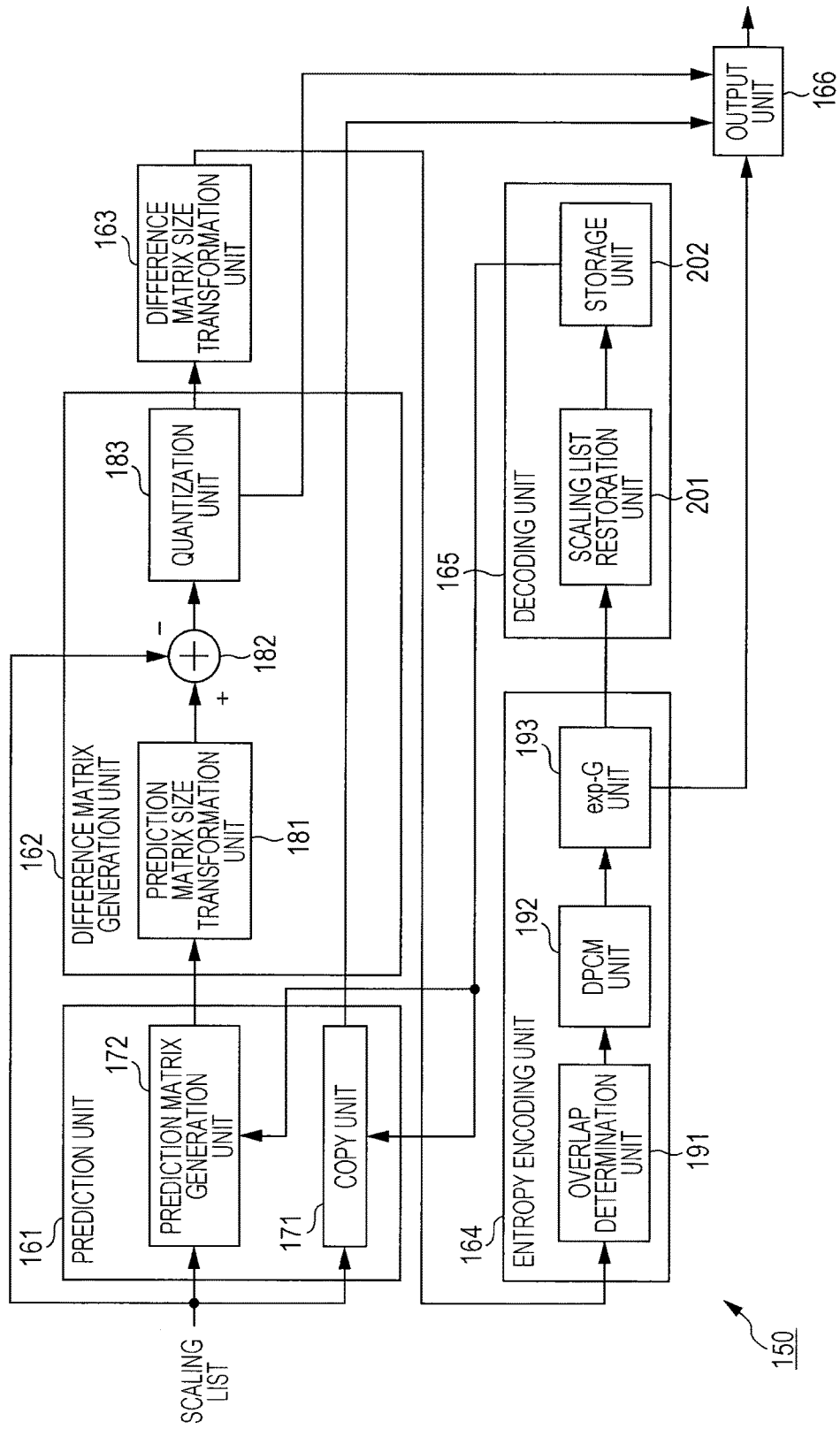
FIG. 16 is a block diagram illustrating an example of a main configuration of a matrix processing unit.

FIG. 15 is a block diagram illustrating an example of a detailed configuration of the orthogonal transform/quantization unit 14 of the image encoding device 10 illustrated in FIG. 14. Referring to FIG. 15, the orthogonal transform/quantization unit 14 includes a selection unit 110, an orthogonal transform unit 120, a quantization unit 130, a scaling list buffer 140, and a matrix processing unit 150.

(1) Selection Unit

The selection unit 110 selects a transform unit (TU) to be used for the orthogonal transform of image data to be encoded from among a plurality of transform units having different sizes. Examples of possible sizes of transform units selectable by the selection unit 110 include 4×4 and 8×8 for H.264/AVC (Advanced Video Coding), and include 4×4, 8×8, 16×16, and 32×32 for HEVC (High Efficiency Video Coding). The selection unit 110 may select a transform unit in accordance with, for example, the size or quality of an image to be encoded, the performance of the image encoding device 10, or the like. The selection of a transform unit by the selection unit 110 may be hand-tuned by a user who develops the image encoding device 10. After that, the selection unit 110 outputs information that specifies the size of the selected transform unit to the orthogonal transform unit 120, the quantization unit 130, the lossless encoding unit 16, and the dequantization unit 21.

(2) Orthogonal Transform Unit

The orthogonal transform unit 120 performs an orthogonal transform on the image data (that is, prediction error data) supplied from the subtraction unit 13, in units of the transform unit selected by the selection unit 110. The orthogonal transform performed by the orthogonal transform unit 120 may be, for example, discrete cosine transform (DCT), Karhunen-Loève transform, or the like. After that, the orthogonal transform unit 120 outputs transform coefficient data acquired through the orthogonal transform process to the quantization unit 130.

(3) Quantization Unit

The quantization unit 130 quantizes the transform coefficient data generated by the orthogonal transform unit 120, by using a scaling list corresponding to the transform unit selected by the selection unit 110. Furthermore, the quantization unit 130 switches the quantization step size in accordance with the rate control signal supplied from the rate control unit 18 to change the bit rate of the quantized data to be output.

Furthermore, the quantization unit 130 causes sets of scaling lists respectively corresponding to a plurality of transform units selectable by the selection unit 110 to be stored in the scaling list buffer 140. For example, as in HEVC, if there are four possible sizes of transform units, namely, 4×4, 8×8, 16×16, and 32×32, four sets of scaling lists respectively corresponding to the four sizes may be stored in the scaling list buffer 140. Note that if a specified scaling list is used for a given size, only a flag indicating that the specified scaling list is used (a scaling list defined by the user is not used) may be stored in the scaling list buffer 140 in association with the given size.

A set of scaling lists that may be used by the quantization unit 130 may be typically set for each sequence of the encoded stream. In addition, the quantization unit 130 may update a set of scaling lists that is set for each sequence on a picture-by-picture basis. Information for controlling the setting and update of a set of scaling lists may be inserted in, for example, a sequence parameter set and a picture parameter set.

(4) Scaling List Buffer

The scaling list buffer 140 temporarily stores a set of scaling lists respectively corresponding to a plurality of transform units selectable by the selection unit 110, using a storage medium such as a semiconductor memory. The set of scaling lists stored in the scaling list buffer 140 is referred to when the matrix processing unit 150 performs a process described below.

(5) Matrix Processing Unit

The matrix processing unit 150 encodes a scaling list to be used for encoding (quantization). After that, the encoded data of the scaling list (hereinafter referred to as encoded scaling list data) generated by the matrix processing unit 150 is output to the lossless encoding unit 16, and may be inserted into the header of the encoded stream.

<2-4. Detailed Example Configuration of Matrix Processing Unit>

FIG. 16 is a block diagram illustrating an example of a more detailed configuration of the matrix processing unit 150. Referring to FIG. 16, the matrix processing unit 150 includes a prediction unit 161, a difference matrix generation unit 162, a difference matrix size transformation unit 163, an entropy encoding unit 164, a decoding unit 165, and an output unit 166.

(1) Prediction Unit

The prediction unit 161 generates a prediction matrix. As illustrated in FIG. 16, the prediction unit 161 includes a copy unit 171 and a prediction matrix generation unit 172.

In a copy mode, the copy unit 171 copies a previously transmitted scaling list, and uses the copied quantization matrix as a prediction matrix (or predicts a scaling list of an orthogonal transform unit to be processed). More specifically, the copy unit 171 acquires the size and list ID (ListID) of a previously transmitted scaling list from a storage unit 202 in the decoding unit 165. The size is information indicating the size of the scaling list (ranging from, for example, 4×4 to 32×32). The list ID is information indicating the type of prediction error data to be quantized.

For example, the list ID includes identification information indicating that the prediction error data to be quantized is prediction error data (Intra Luma) of the luminance component which is generated using a prediction image subjected to intra prediction, prediction error data (Intra Cr) of the color difference component (Cr) which is generated using a prediction image subjected to intra prediction, prediction error data (Intra Cb) of the color difference component (Cb) which is generated using a prediction image subjected to intra prediction, or prediction error data (Inter Luma) of the luminance component which is generated using a prediction image subjected to inter prediction.

The copy unit 171 selects, as a scaling list to be copied, a previously transmitted scaling list of the same size as the scaling list (scaling list of an orthogonal transform unit to be processed) input to the matrix processing unit 150, and supplies the list ID of the scaling list to be copied to the output unit 166 to output the list ID to devices outside the matrix processing unit 150 (the lossless encoding unit 16 and the dequantization unit 21). That is, in this case, only the list ID is transmitted to the decoding side (or is included in encoded data) as information indicating a prediction matrix generated by copying the previously transmitted scaling list. Thus, the image encoding device 10 can suppress an increase in the amount of coding of a scaling list.

Furthermore, in a normal mode, the prediction matrix generation unit 172 acquires a previously transmitted scaling list from the storage unit 202 in the decoding unit 165, and generates a prediction matrix using the scaling list (or predicts a scaling list of an orthogonal transform unit to be processed). The prediction matrix generation unit 172 supplies the generated prediction matrix to the difference matrix generation unit 162.

(2) Difference Matrix Generation Unit

The difference matrix generation unit 162 generates a difference matrix (residual matrix) that is a difference between the prediction matrix supplied from the prediction unit 161 (the prediction matrix generation unit 172) and the scaling list input to the matrix processing unit 150. As illustrated in FIG. 16, the difference matrix generation unit 162 includes a prediction matrix size transformation unit 181, a computation unit 182, and a quantization unit 183.

The prediction matrix size transformation unit 181 transforms (hereinafter also referred to as converts) the size of the prediction matrix supplied from the prediction matrix generation unit 172 so that the size of the prediction matrix matches the size of the scaling list input to the matrix processing unit 150.

Figure 17:
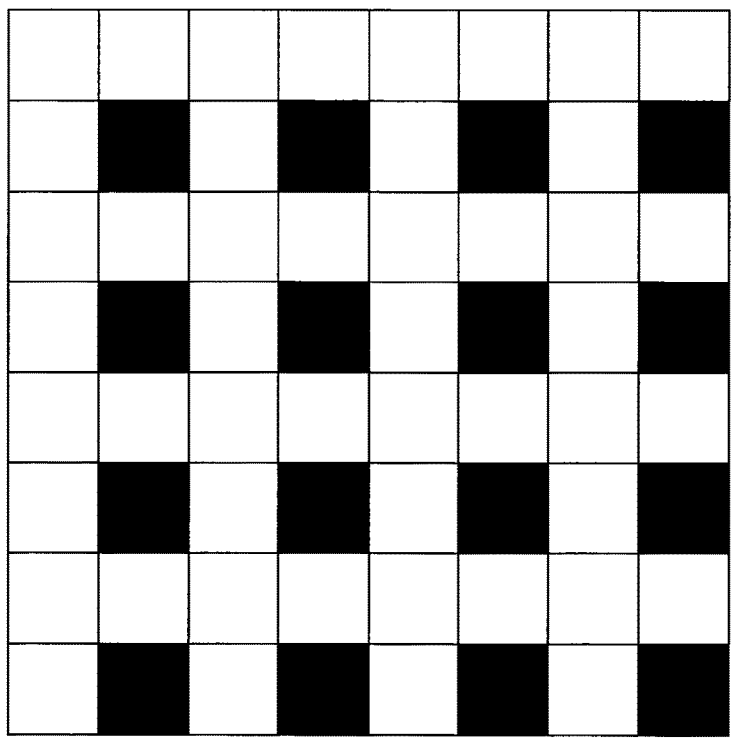
FIG. 17 is a diagram illustrating an example of down-sampling.

For example, if the size of the prediction matrix is larger than the size of the scaling list, the prediction matrix size transformation unit 181 downward converts (hereinafter also referred to as down-converts) the prediction matrix. More specifically, for example, when the prediction matrix has a 16×16 size and the scaling list has an 8×8 size, the prediction matrix size transformation unit 181 down-converts the prediction matrix to an 8×8 prediction matrix. Note that any method for down-conversion may be used. For example, the prediction matrix size transformation unit 181 may reduce the number of elements in the prediction matrix (hereinafter also referred to as downsampling) by using a filter (through computation). Alternatively, the prediction matrix size transformation unit 181 may also reduce the number of elements in the prediction matrix by, for example, as illustrated in FIG. 17, thinning out some of the elements (for example, only the even numbered elements (in FIG. 17, the elements in solid black) among the two-dimensional elements) without using a filter (hereinafter also referred to as subsampling).

Furthermore, for example, if the size of the prediction matrix is smaller than the size of the scaling list, the prediction matrix size transformation unit 181 upward converts (hereinafter also referred to as up-converts) the prediction matrix. More specifically, for example, when the prediction matrix has an 8×8 size and the scaling list has a 16×16 size, the prediction matrix size transformation unit 181 up-converts the prediction matrix to a 16×16 prediction matrix. Note that any method for up-conversion may be used. For example, the prediction matrix size transformation unit 181 may increase the number of elements in the prediction matrix (hereinafter also referred to as upsampling) by using a filter (through computation). Alternatively, the prediction matrix size transformation unit 181 may also increase the number of elements in the prediction matrix by, for example, copying the individual elements in the prediction matrix without using a filter (hereinafter also referred to as inverse subsampling).

The prediction matrix size transformation unit 181 supplies the prediction matrix whose size has been made to match that of the scaling list to the computation unit 182.

The computation unit 182 subtracts the scaling list input to the matrix processing unit 150 from the prediction matrix supplied from the prediction matrix size transformation unit 181, and generates a difference matrix (residual matrix). The computation unit 182 supplies the calculated difference matrix to the quantization unit 183.

The quantization unit 183 quantizes the difference matrix supplied from the computation unit 182. The quantization unit 183 supplies the quantized difference matrix to the difference matrix size transformation unit 163. The quantization unit 183 further supplies information used for quantization, such as quantization parameters, to the output unit 166 to output the information to devices outside the matrix processing unit 150 (the lossless encoding unit 16 and the dequantization unit 21). Note that the quantization unit 183 may be omitted (that is, the quantization of the difference matrix may not necessarily be performed).

(3) Difference Matrix Size Transformation Unit

The difference matrix size transformation unit 163 converts the size of the difference matrix (quantized data) supplied from the difference matrix generation unit 162 (the quantization unit 183) to a size less than or equal to a maximum size allowed in transmission (hereinafter also referred to as a transmission size), if necessary. The maximum size may have any optional value, and is, for example, 8×8.

The encoded data output from the image encoding device 10 is transmitted to an image decoding device corresponding to the image encoding device 10 via, for example, a transmission path or a storage medium, and is decoded by the image decoding device. The upper limit of the size (maximum size) of the difference matrix (quantized data) during such transmission, or in the encoded data output from the image encoding device 10, is set in the image encoding device 10.

If the size of the difference matrix is larger than the maximum size, the difference matrix size transformation unit 163 down-converts the difference matrix so that the size of the difference matrix becomes less than or equal to the maximum size.

Note that, similarly to the down-conversion of the prediction matrix described above, the difference matrix may be down-converted using any method. For example, downsampling may be performed using a filter or the like, or subsampling which involves thinning out elements may be performed.

Furthermore, the down-converted difference matrix may have any size smaller than the maximum size. However, in general, the larger the difference in size between before and after conversion is, the larger the error becomes. It is thus desirable that the difference matrix be down-converted to the maximum size.

The difference matrix size transformation unit 163 supplies the down-converted difference matrix to the entropy encoding unit 164. Note that if the size of the difference matrix is smaller than the maximum size, the down-conversion described above is not necessary, and therefore the difference matrix size transformation unit 163 supplies the difference matrix input thereto to the entropy encoding unit 164 as it is (that is, the down-conversion of the difference matrix is omitted).

(4) Entropy Encoding Unit

The entropy encoding unit 164 encodes the difference matrix (quantized data) supplied from the difference matrix size transformation unit 163 using a predetermined method. As illustrated in FIG. 16, the entropy encoding unit 164 includes an overlap determination unit (135-degree unit) 191, a DPCM (Differential Pulse Code Modulation) unit 192, and an exp-G unit 193.

Figure 18:
FIG. 18 is a diagram illustrating an example of the removal of an overlapping portion.

The overlap determination unit 191 determines symmetry of the difference matrix supplied from the difference matrix size transformation unit 163. If the residue (difference matrix) represents a 135-degree symmetric matrix, for example, as illustrated in FIG. 18, the overlap determination unit 191 removes the data (matrix elements) of the symmetric part that is overlapping data. If the residue does not represent a 135-degree symmetric matrix, the overlap determination unit 191 omits the removal of the data (matrix elements). The overlap determination unit 191 supplies the data of the difference matrix from which the symmetric part has been removed, if necessary, to the DPCM unit 192.

The DPCM unit 192 performs DPCM encoding of the data of the difference matrix from which the symmetric part has been removed, if necessary, which is supplied from the overlap determination unit 191, and generates DPCM data. The DPCM unit 192 supplies the generated DPCM data to the exp-G unit 193.

The exp-G unit 193 encodes the DPCM data supplied from the DPCM unit 192 using signed or unsigned exponential Golomb codes (hereinafter also referred to as exponential Golomb codes). The exp-G unit 193 supplies the encoding result to the decoding unit 165 and the output unit 166.

(5) Decoding Unit

The decoding unit 165 restores a scaling list from the data supplied from the exp-G unit 193. The decoding unit 165 supplies information concerning the restored scaling list to the prediction unit 161 as a previously transmitted scaling list.

As illustrated in FIG. 16, the decoding unit 165 includes a scaling list restoration unit 201 and the storage unit 202.

The scaling list restoration unit 201 decodes the exponential Golomb codes supplied from the entropy encoding unit 164 (the exp-G unit 193) to restore a scaling list to be input to the matrix processing unit 150. For example, the scaling list restoration unit 201 decodes the exponential Golomb codes using the method corresponding to the encoding method for the entropy encoding unit 164, and obtains a difference matrix by performing transformation opposite to size transformation performed by the difference matrix size transformation unit 163 and performing dequantization corresponding to quantization performed by the quantization unit 183. The scaling list restoration unit 201 further subtracts the obtained difference matrix from the prediction matrix to restore a scaling list.

The scaling list restoration unit 201 supplies the restored scaling list to the storage unit 202 for storage in association with the size and the list ID of the scaling list.

The storage unit 202 stores information concerning the scaling list supplied from the scaling list restoration unit 201. The information concerning the scaling list stored in the storage unit 202 is used to generate prediction matrices of other orthogonal transform units which are processed later in time. That is, the storage unit 202 supplies the stored information concerning the scaling list to the prediction unit 161 as information concerning a previously transmitted scaling list.

Note that, instead of storing the information concerning the scaling list restored in the way described above, the storage unit 202 may store the scaling list input to the matrix processing unit 150 in association with the size and the list ID of the input scaling list. In this case, the scaling list restoration unit 201 can be omitted.

(6) Output Unit

The output unit 166 outputs the supplied various types of information to devices outside the matrix processing unit 150. For example, in the copy mode, the output unit 166 supplies the list ID of the prediction matrix supplied from the copy unit 171 to the lossless encoding unit 16 and the dequantization unit 21. Furthermore, for example, in the normal mode, the output unit 166 supplies the exponential Golomb codes supplied from the exp-G unit 193 and the quantization parameters supplied from the quantization unit 183 to the lossless encoding unit 16 and the dequantization unit 21.

The output unit 166 further supplies identification information indicating a maximum size (transmission size) allowed in the transmission of a scaling list (or a difference matrix between a scaling list and a prediction matrix thereof) to the lossless encoding unit 16 as information for generating a scaling list on the decoding side. As described above, the lossless encoding unit 16 creates an encoded stream including the information for generating a scaling list, and supplies the encoded stream to the decoding side. The identification information indicating the transmission size may be specified in advance by level, profile, and the like. In this case, information concerning the transmission size is shared in advance between the apparatus on the encoding side and the apparatus on the decoding side. Thus, the transmission of the identification information described above can be omitted.

<2-5. Detailed Example Configuration of DPCM Unit>

FIG. 19 is a block diagram illustrating an example of a more detailed configuration of the DPCM unit 192. Referring to FIG. 19, the DPCM unit 192 includes a DC coefficient encoding unit 211 and an AC coefficient DPCM unit 212.

The DC coefficient encoding unit 211 acquires the DC coefficient from among the coefficients supplied from the overlap determination unit 191, subtracts the value of the DC coefficient from a predetermined initial value (for example, 8) to determine a difference value, and uses the difference value as the initial (i=0) difference value (scaling_list_delta_coef). The DC coefficient encoding unit 211 supplies the calculated difference value (scaling_list_delta_coef (i=0)) to the exp-G unit 193 as the initial coefficient of the scaling list corresponding to the region of interest being processed.

The AC coefficient DPCM unit 212 acquires an AC coefficient from among the coefficients supplied from the overlap determination unit 191, and subtracts the value of the AC coefficient from the immediately previously processed coefficient to determine a difference value (scaling_list_delta_coef (i>0)). The AC coefficient DPCM unit 212 supplies the determined difference value (scaling_list_delta_coef (i>0)) to the exp-G unit 193 as a coefficient of the scaling list corresponding to the region of interest being processed. Note that when i=1, the immediately preceding coefficient is represented by i=0. Thus, the "DC coefficient" is the immediately previously processed coefficient.

In this way, the DPCM unit 192 can transmit the DC coefficient as the element located at the beginning of the scaling list (AC coefficients). Accordingly, the coding efficiency of the scaling list can be improved.

<2-6. Flow of Quantization Matrix Encoding Process>

Next, an example of the flow of a quantization matrix encoding process executed by the matrix processing unit 150 illustrated in FIG. 16 will be described with reference to a flowchart illustrated in FIG. 20.

When the quantization matrix encoding process is started, in step S101, the prediction unit 161 acquires a scaling list (or quantization matrix) for a current region (also referred to as a region of interest) that is an orthogonal transform unit to be processed.

In step S102, the prediction unit 161 determines whether or not the current mode is the copy mode. If it is determined that the current mode is not the copy mode, the prediction unit 161 advances the process to step S103.

In step S103, the prediction matrix generation unit 172 acquires a previously transmitted scaling list from the storage unit 202, and generates a prediction matrix using the scaling list.

In step S104, the prediction matrix size transformation unit 181 determines whether or not the size of the prediction matrix generated in step S103 is different from that of the scaling list for the current region (region of interest) acquired in step S101. If it is determined that both sizes are different, the prediction matrix size transformation unit 181 advances the process to step S105.

In step S105, the prediction matrix size transformation unit 181 converts the size of the prediction matrix generated in step S103 to the size of the scaling list for the current region acquired in step S101.

When the processing of step S105 is completed, the prediction matrix size transformation unit 181 advances the process to step S106. If it is determined in step S104 that the size of the prediction matrix is the same as the size of the scaling list, the prediction matrix size transformation unit 181 advances the process to step S106 while skipping the processing of step S105 (or without performing the processing of step S105).

In step S106, the computation unit 182 subtracts the scaling list from the prediction matrix to calculate a difference matrix between the prediction matrix and the scaling list.

In step S107, the quantization unit 183 quantizes the difference matrix generated in step S106. Note that this processing may be omitted.

In step S108, the difference matrix size transformation unit 163 determines whether or not the size of the quantized difference matrix is larger than the transmission size (the maximum size allowed in transmission). If it is determined that the size of the quantized difference matrix is larger than the transmission size, the difference matrix size transformation unit 163 advances the process to step S109, and down-converts the difference matrix to the transmission size or less.

When the processing of step S109 is completed, the difference matrix size transformation unit 163 advances the process to step S110. Furthermore, if it is determined in step S108 that the size of the quantized difference matrix is less than or equal to the transmission size, the difference matrix size transformation unit 163 advances the process to step S110 while skipping the processing of step S109 (or without performing the processing of step S109).

In step S110, the overlap determination unit 191 determines whether or not the quantized difference matrix has 135-degree symmetry. If it is determined that the quantized difference matrix has 135-degree symmetry, the overlap determination unit 191 advances the process to step S111.

In step S111, the overlap determination unit 191 removes the overlapping portion (overlapping data) in the quantized difference matrix. After the overlapping data is removed, the overlap determination unit 191 advances the process to step S112.

Furthermore, if it is determined in step S110 that the quantized difference matrix does not have 135-degree symmetry, the overlap determination unit 191 advances the process to step S112 while skipping the processing of step S111 (or without performing the processing of step S111).

In step S112, the DPCM unit 192 performs DPCM encoding of the difference matrix from which the overlapping portion has been removed, if necessary.

In step S113, the exp-G unit 193 determines whether or not DPCM data generated in step S112 has a positive or negative sign. If it is determined that a sign is included, the exp-G unit 193 advances the process to step S114.

In step S114, the exp-G unit 193 encodes the DPCM data using signed exponential Golomb coding. The output unit 166 outputs generated exponential Golomb codes to the lossless encoding unit 16 and the dequantization unit 21. When the processing of step S114 is completed, the exp-G unit 193 advances the process to step S116.

Furthermore, if it is determined in step S113 that no sign is included, the exp-G unit 193 advances the process to step S115.

In step S115, the exp-G unit 193 encodes the DPCM data using unsigned exponential Golomb coding. The output unit 166 outputs generated exponential Golomb codes to the lossless encoding unit 16 and the dequantization unit 21. When the processing of step S115 is completed, the exp-G unit 193 advances the process to step S116.

Furthermore, if it is determined in step S102 that the current mode is the copy mode, the copy unit 171 copies a previously transmitted scaling list, and uses the copied scaling list as a prediction matrix. The output unit 166 outputs the list ID corresponding to the prediction matrix to the lossless encoding unit 16 and the dequantization unit 21 as information indicating the prediction matrix. Then, the copy unit 171 advances the process to step S116.

In step S116, the scaling list restoration unit 201 restores a scaling list. In step S117, the storage unit 202 stores the scaling list restored in step S116.

When the processing of step S117 is completed, the matrix processing unit 150 ends the quantization matrix encoding process.

<2-7. Flow of DPCM Process>

Next, an example of a flow of the DPCM process executed in step S112 in FIG. 20 will be described with reference to a flowchart illustrated in FIG. 21.

When the DPCM process is started, in step S131, the DC coefficient encoding unit 211 determines a difference between the DC coefficient and a constant. In step S132, the AC coefficient DPCM unit 212 determines a difference between the DC coefficient and the initial AC coefficient.

In step S133, the AC coefficient DPCM unit 212 determines whether or not all the AC coefficients have been processed. If it is determined that there is an unprocessed AC coefficient, the AC coefficient DPCM unit 212 advances the process to step S134.

In step S134, the AC coefficient DPCM unit 212 shifts the processing target to the subsequent AC coefficient. In step S135, the AC coefficient DPCM unit 212 determines a difference between the previously processed AC coefficient and the current AC coefficient being processed. When the processing of step S135 is completed, the AC coefficient DPCM unit 212 returns the process to step S133.

In this manner, as long as it is determined in step S133 that there is an unprocessed AC coefficient, the AC coefficient DPCM unit 212 repeatedly executes the processing of steps S133 to S135. If it is determined in step S133 that there is no unprocessed AC coefficient, the AC coefficient DPCM unit 212 ends the DPCM process, and returns the process to FIG. 20.

As described above, a difference between the DC coefficient and the AC coefficient located at the beginning among the AC coefficients is determined, and the difference instead of the DC coefficient is transmitted to an image decoding device. Thus, the image encoding device 10 can suppress an increase in the amount of coding of a scaling list.

Next, an example configuration of an image decoding device according to an embodiment of the present disclosure will be described.

<2-8. Image Decoding Device>

Figure 22:
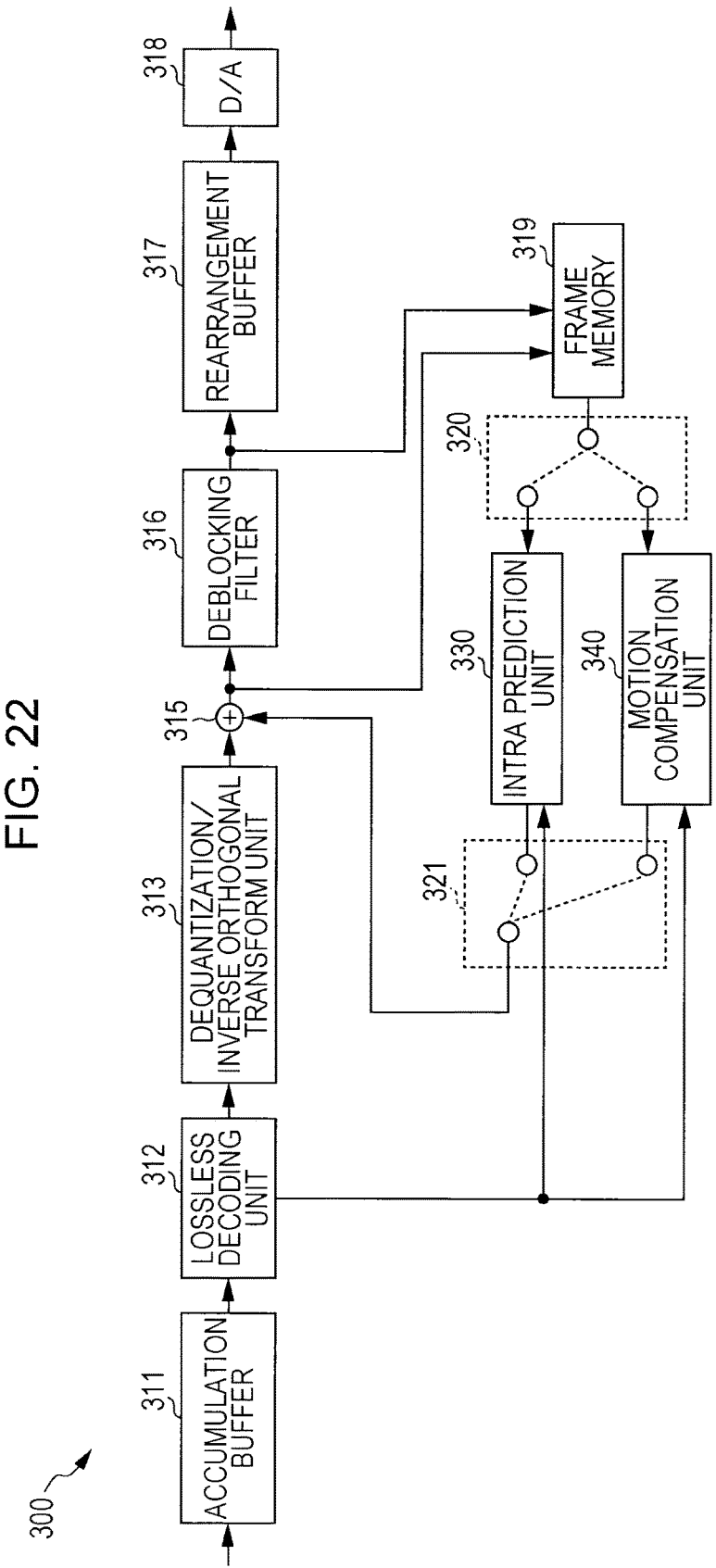
FIG. 22 is a block diagram illustrating an example of a main configuration of an image decoding device.

FIG. 22 is a block diagram illustrating an example configuration of an image decoding device 300 according to an embodiment of the present disclosure. The image decoding device 300 illustrated in FIG. 22 is an image processing device to which the present technology is applied and that is configured to decode encoded data generated by the image encoding device 10. Referring to FIG. 22, the image decoding device 300 includes an accumulation buffer 311, a lossless decoding unit 312, a dequantization/inverse orthogonal transform unit 313, an adder unit 315, a deblocking filter 316, a rearrangement buffer 317, a D/A (Digital to Analogue) conversion unit 318, a frame memory 319, selectors 320 and 321, an intra prediction unit 330, and a motion compensation unit 340.

The accumulation buffer 311 temporarily accumulates an encoded stream input via a transmission path, using a storage medium.

The lossless decoding unit 312 decodes the encoded stream input from the accumulation buffer 311 in accordance with the encoding scheme used for encoding. The lossless decoding unit 312 further decodes the information multiplexed in the header region of the encoded stream. The information multiplexed in the header region of the encoded stream may include, for example, the information for generating a scaling list described above, and information concerning intra prediction and information concerning inter prediction, which are contained in the block header. The lossless decoding unit 312 outputs the decoded quantized data and the information for generating a scaling list to the dequantization/inverse orthogonal transform unit 313. The lossless decoding unit 312 further outputs the information concerning intra prediction to the intra prediction unit 330. The lossless decoding unit 312 further outputs the information concerning inter prediction to the motion compensation unit 340.

The dequantization/inverse orthogonal transform unit 313 performs dequantization and an inverse orthogonal transform on the quantized data input from the lossless decoding unit 312 to generate prediction error data. After that, the dequantization/inverse orthogonal transform unit 313 outputs the generated prediction error data to the adder unit 315.

The adder unit 315 adds together the prediction error data input from the dequantization/inverse orthogonal transform unit 313 and prediction image data input from the selector 321 to generate decoded image data. After that, the adder unit 315 outputs the generated decoded image data to the deblocking filter 316 and the frame memory 319.

The deblocking filter 316 filters the decoded image data input from the adder unit 315 to remove blocking artifacts, and outputs the filtered decoded image data to the rearrangement buffer 317 and the frame memory 319.

The rearrangement buffer 317 rearranges images input from the deblocking filter 316 to generate a time-series image data sequence. After that, the rearrangement buffer 317 outputs the generated image data to the D/A conversion unit 318.

The D/A conversion unit 318 converts the image data in digital form which is input from the rearrangement buffer 317 to an image signal in analog form. After that, the D/A conversion unit 318 outputs the analog image signal to, for example, a display (not illustrated) connected to the image decoding device 300 to display an image.

The frame memory 319 stores the decoded image data to be filtered, which is input from the adder unit 315, and the filtered decoded image data input from the deblocking filter 316, using a storage medium.

The selector 320 switches the destination to which the image data supplied from the frame memory 319 is to be output between the intra prediction unit 330 and the motion compensation unit 340, for each block in the image, in accordance with mode information acquired by the lossless decoding unit 312. For example, if an intra-prediction mode is specified, the selector 320 outputs the decoded image data to be filtered, which is supplied from the frame memory 319, to the intra prediction unit 330 as reference image data. Furthermore, if an inter-prediction mode is specified, the selector 320 outputs the filtered decoded image data supplied from the frame memory 319 to the motion compensation unit 340 as reference image data.

The selector 321 switches the source from which prediction image data to be supplied to the adder unit 315 is to be output between the intra prediction unit 330 and the motion compensation unit 340, for each block in the image, in accordance with mode information acquired by the lossless decoding unit 312. For example, if the intra-prediction mode is specified, the selector 321 supplies the prediction image data output from the intra prediction unit 330 to the adder unit 315. If the inter-prediction mode is specified, the selector 321 supplies the prediction image data output from the motion compensation unit 340 to the adder unit 315.

The intra prediction unit 330 performs intra-screen prediction of a pixel value based on the information concerning intra prediction, which is input from the lossless decoding unit 312, and the reference image data supplied from the frame memory 319, and generates prediction image data. After that, the intra prediction unit 330 outputs the generated prediction image data to the selector 321.

The motion compensation unit 340 performs a motion compensation process based on the information concerning inter prediction, which is input from the lossless decoding unit 312, and the reference image data supplied from the frame memory 319, and generates prediction image data. After that, the motion compensation unit 340 outputs the generated prediction image data to the selector 321.

<2-9. Example Configuration of Dequantization/Inverse Orthogonal Transform Unit>

Figure 23:
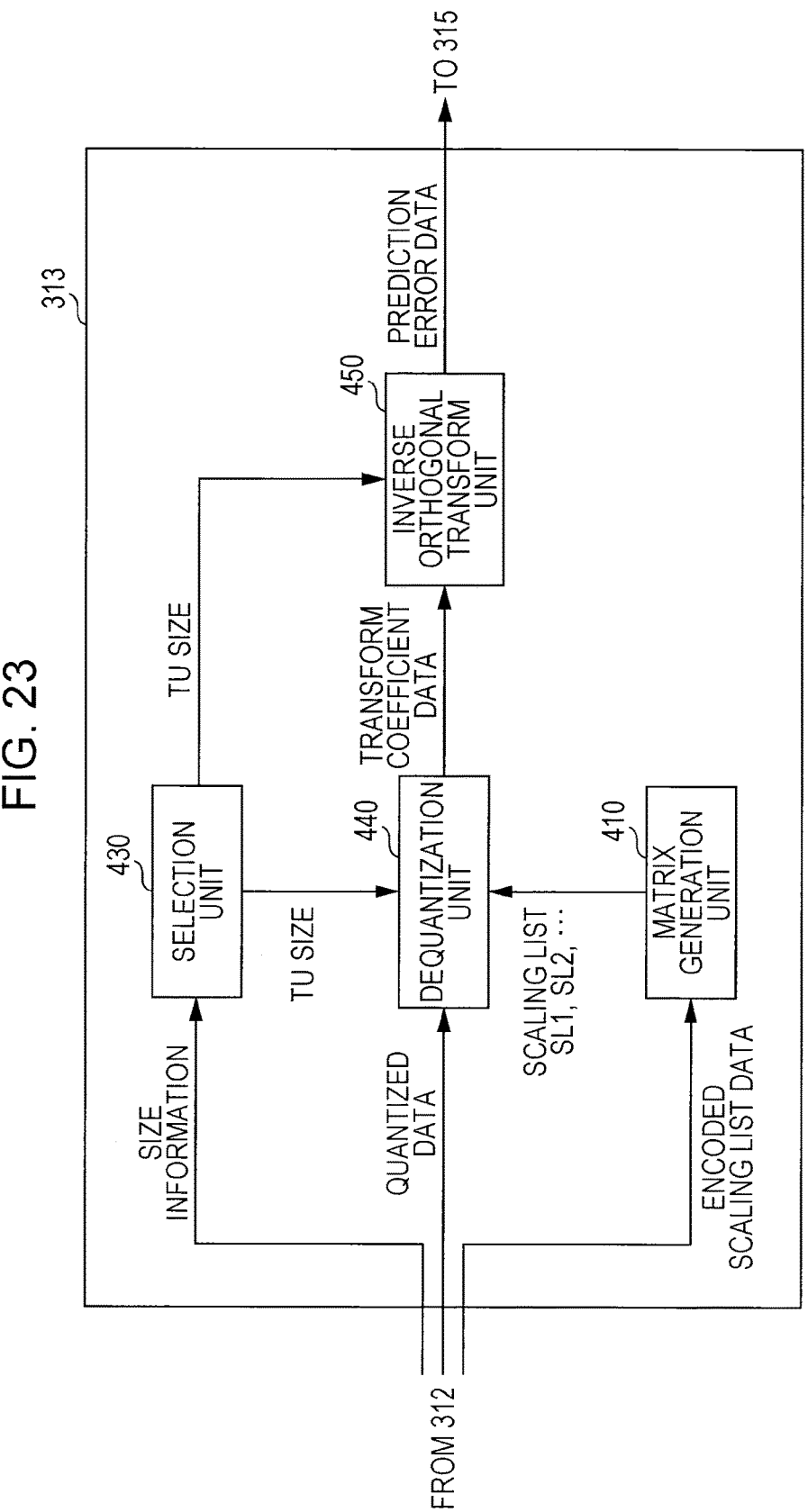
FIG. 23 is a block diagram illustrating an example of a main configuration of a dequantization/inverse orthogonal transform unit.

FIG. 23 is a block diagram illustrating an example of a main configuration of the dequantization/inverse orthogonal transform unit 313 of the image decoding device 300 illustrated in FIG. 22. Referring to FIG. 23, the dequantization/inverse orthogonal transform unit 313 includes a matrix generation unit 410, a selection unit 430, a dequantization unit 440, and an inverse orthogonal transform unit 450.

(1) Matrix Generation Unit

The matrix generation unit 410 decodes encoded scaling list data which is extracted from a bit stream and supplied by the lossless decoding unit 312, and generates a scaling list. The matrix generation unit 410 supplies the generated scaling list to the dequantization unit 440.

(2) Selection Unit

The selection unit 430 selects a transform unit (TU) to be used for the inverse orthogonal transform of image data to be decoded from among a plurality of transform units having different sizes. Examples of possible sizes of transform units selectable by the selection unit 430 include 4×4 and 8×8 for H.264/AVC, and include 4×4, 8×8, 16×16, and 32×32 for HEVC. The selection unit 430 may select a transform unit in accordance with, for example, the LCU, SCU, and split_flag contained in the header of the encoded stream. After that, the selection unit 430 outputs information specifying the size of the selected transform unit to the dequantization unit 440 and the inverse orthogonal transform unit 450.

(3) Dequantization Unit

The dequantization unit 440 dequantizes transform coefficient data quantized when the images are encoded, by using a scaling list of the transform unit selected by the selection unit 430. After that, the dequantization unit 440 outputs the dequantized transform coefficient data to the inverse orthogonal transform unit 450.

(4) Inverse Orthogonal Transform Unit

The inverse orthogonal transform unit 450 performs an inverse orthogonal transform on the transform coefficient data dequantized by the dequantization unit 440 in units of the selected transform unit in accordance with the orthogonal transform scheme used for encoding to generate prediction error data. After that, the inverse orthogonal transform unit 450 outputs the generated prediction error data to the adder unit 315.

<2-10. Detailed Example Configuration of Matrix Generation Unit>

Figure 24:
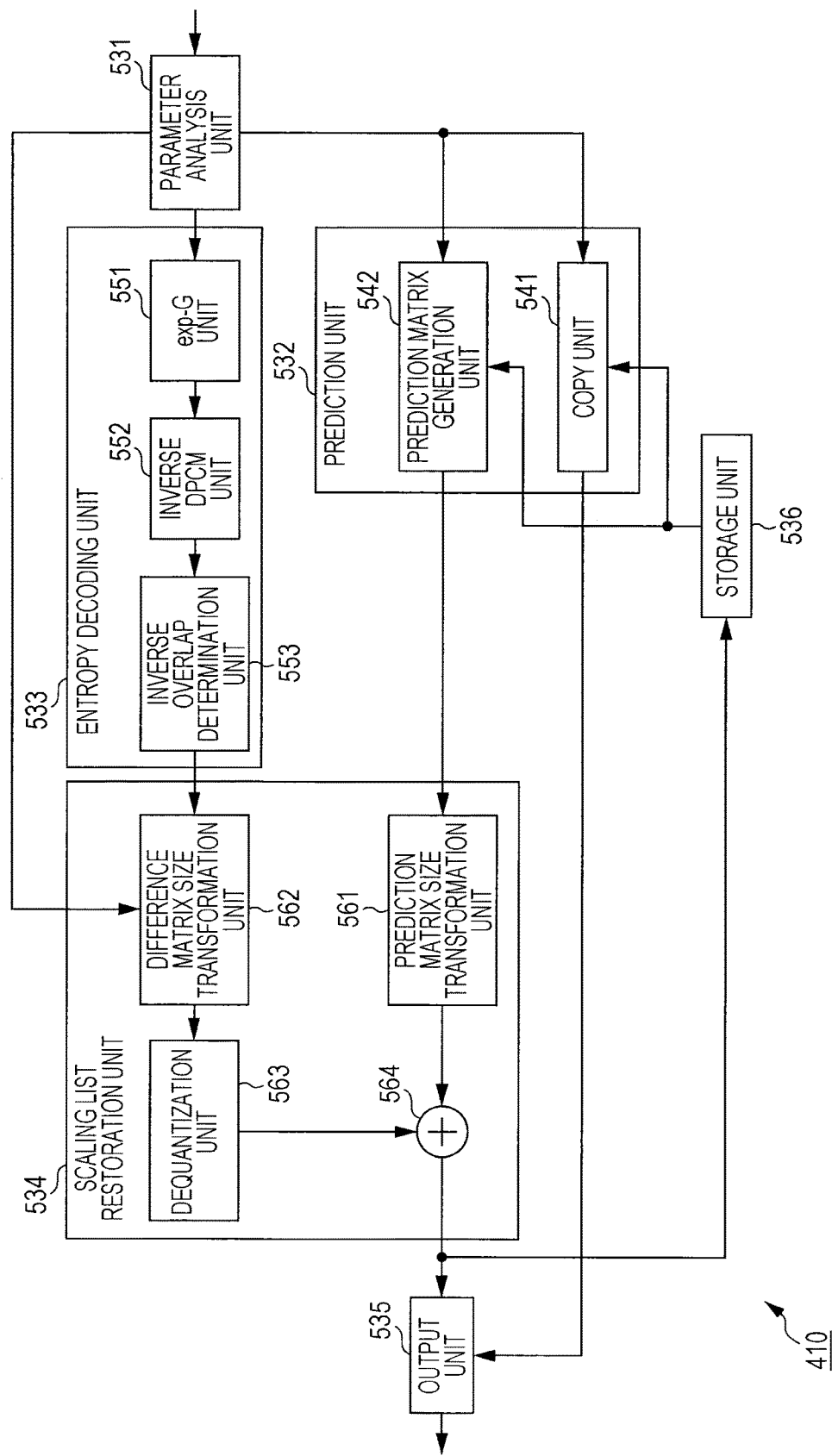
FIG. 24 is a block diagram illustrating an example of a main configuration of a matrix generation unit.

FIG. 24 is a block diagram illustrating an example of a detailed configuration of the matrix generation unit 410 illustrated in FIG. 23. Referring to FIG. 24, the matrix generation unit 410 includes a parameter analysis unit 531, a prediction unit 532, an entropy decoding unit 533, a scaling list restoration unit 534, an output unit 535, and a storage unit 536.

(1) Parameter Analysis Unit

The parameter analysis unit 531 analyzes the various flags and parameters concerning the scaling list, which are supplied from the lossless decoding unit 312. Furthermore, in accordance with the analysis results, the parameter analysis unit 531 supplies various kinds of information supplied from the lossless decoding unit 312, such as encoded data of the difference matrix, to the prediction unit 532 or the entropy decoding unit 533.

For example, if pred_mode is equal to 0, the parameter analysis unit 531 determines that the current mode is the copy mode, and supplies pred_matrix_id_delta to a copy unit 541. Furthermore, for example, if pred_mode is equal to 1, the parameter analysis unit 531 determines that the current mode is a full-scan mode (normal mode), and supplies pred_matrix_id_delta and pred_size_id_delta to a prediction matrix generation unit 542.

Furthermore, for example, if residual_flag is true, the parameter analysis unit 531 supplies the encoded data (exponential Golomb codes) of the scaling list supplied from the lossless decoding unit 312 to an exp-G unit 551 of the entropy decoding unit 533. The parameter analysis unit 531 further supplies residual_symmetry_flag to the exp-G unit 551.

Furthermore, the parameter analysis unit 531 supplies residual_down_sampling_flag to a difference matrix size transformation unit 562 of the scaling list restoration unit 534.

(2) Prediction Unit

The prediction unit 532 generates a prediction matrix in accordance with the control of the parameter analysis unit 531. As illustrated in FIG. 24, the prediction unit 532 includes the copy unit 541 and the prediction matrix generation unit 542.

In the copy mode, the copy unit 541 copies a previously transmitted scaling list, and uses the copied scaling list as a prediction matrix. More specifically, the copy unit 541 reads a previously transmitted scaling list corresponding to pred_matrix_id_delta and having the same size as the scaling list for the current region from the storage unit 536, uses the read scaling list as a prediction image, and supplies the prediction image to the output unit 535.

In the normal mode, the prediction matrix generation unit 542 generates (or predicts) a prediction matrix using a previously transmitted scaling list. More specifically, the prediction matrix generation unit 542 reads a previously transmitted scaling list corresponding to pred_matrix_id_delta and pred_size_id_delta from the storage unit 536, and generates a prediction matrix using the read scaling list. In other words, the prediction matrix generation unit 542 generates a prediction matrix similar to the prediction matrix generated by the prediction matrix generation unit 172 (FIG. 16) of the image encoding device 10. The prediction matrix generation unit 542 supplies the generated prediction matrix to a prediction matrix size transformation unit 561 of the scaling list restoration unit 534.

(3) Entropy Decoding Unit

The entropy decoding unit 533 restores a difference matrix from the exponential Golomb codes supplied from the parameter analysis unit 531. As illustrated in FIG. 24, the entropy decoding unit 533 includes the exp-G unit 551, an inverse DPCM unit 552, and an inverse overlap determination unit 553.

The exp-G unit 551 decodes the signed or unsigned exponential Golomb codes (hereinafter also referred to as exponential Golomb decoding) to restore DPCM data. The exp-G unit 551 supplies the restored DPCM data together with residual_symmetry_flag to the inverse DPCM unit 552.

The inverse DPCM unit 552 performs DPCM decoding of data from which the overlapping portion has been removed to generate residual data from the DPCM data. The inverse DPCM unit 552 supplies the generated residual data together with residual_symmetry_flag to the inverse overlap determination unit 553.

If residual_symmetry_flag is true, that is, if the residual data is a remaining portion of a 135-degree symmetric matrix from which the data (matrix elements) of the overlapping symmetric part has been removed, the inverse overlap determination unit 553 restores the data of the symmetric part. In other words, a difference matrix of a 135-degree symmetric matrix is restored. Note that if residual_symmetry_flag is not true, that is, if the residual data represents a matrix that is not a 135-degree symmetric matrix, the inverse overlap determination unit 553 uses the residual data as a difference matrix without restoring data of a symmetric part. The inverse overlap determination unit 553 supplies the difference matrix restored in the way described above to the scaling list restoration unit 534 (the difference matrix size transformation unit 562).

(4) Scaling List Restoration Unit

The scaling list restoration unit 534 restores a scaling list. As illustrated in FIG. 24, the scaling list restoration unit 534 includes the prediction matrix size transformation unit 561, the difference matrix size transformation unit 562, a dequantization unit 563, and a computation unit 564.

If the size of the prediction matrix supplied from the prediction unit 532 (the prediction matrix generation unit 542) is different from the size of the scaling list for the current region to be restored, the prediction matrix size transformation unit 561 converts the size of the prediction matrix.

For example, if the size of the prediction matrix is larger than the size of the scaling list, the prediction matrix size transformation unit 561 down-converts the prediction matrix. Furthermore, for example, if the size of the prediction matrix is smaller than the size of the scaling list, the prediction matrix size transformation unit 561 up-converts the prediction matrix. The same method as that for the prediction matrix size transformation unit 181 (FIG. 16) of the image encoding device 10 is selected as a conversion method.

The prediction matrix size transformation unit 561 supplies the prediction matrix whose size has been made to match that of the scaling list to the computation unit 564.

If residual_down_sampling_flag is true, that is, if the size of the transmitted difference matrix is smaller than the size of the current region to be dequantized, the difference matrix size transformation unit 562 up-converts the difference matrix to increase the size of the difference matrix to a size corresponding to the current region to be dequantized. Any method for up-conversion may be used. For example, a method corresponding to the down-conversion method performed by the difference matrix size transformation unit 163 (FIG. 16) of the image encoding device 10 may be used.

For example, if the difference matrix size transformation unit 163 has downsampled the difference matrix, the difference matrix size transformation unit 562 may upsample the difference matrix. Alternatively, if the difference matrix size transformation unit 163 has sub-sampled the difference matrix, the difference matrix size transformation unit 562 may perform inverse subsampling of the difference matrix.

Figure 25:
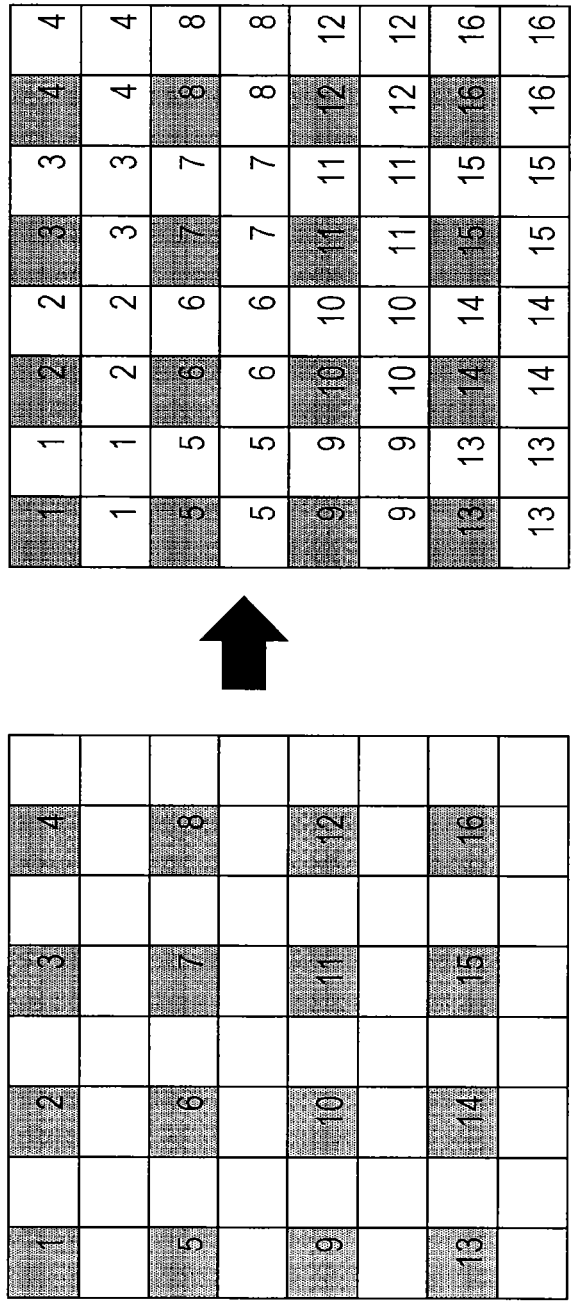
FIG. 25 is a diagram illustrating an example of a nearest neighbor interpolation process.

For example, the difference matrix size transformation unit 562 may perform a nearest neighbor interpolation process (nearest neighbor) as illustrated in FIG. 25 rather than general linear interpolation. The nearest neighbor interpolation process can reduce memory capacity.

Accordingly, even if a scaling list having a large size is not transmitted, data obtained after upsampling need not be stored for upsampling from a scaling list having a small size. In addition, an intermediate buffer or the like is not necessary when data involved in computation during upsampling is stored.

Note that if residual_down_sampling_flag is not true, that is, if the difference matrix is transmitted with the same size as that when used for the quantization process, the difference matrix size transformation unit 562 omits the up-conversion of the difference matrix (or may up-convert the difference matrix by a factor of 1).

The difference matrix size transformation unit 562 supplies the difference matrix up-converted in the manner described above, as necessary, to the dequantization unit 563.

The dequantization unit 563 dequantizes the supplied difference matrix (quantized data) using a method corresponding to that for quantization performed by the quantization unit 183 (FIG. 16) of the image encoding device 10, and supplies the dequantized difference matrix to the computation unit 564. Note that if the quantization unit 183 is omitted, that is, if the difference matrix supplied from the difference matrix size transformation unit 562 is not quantized data, the dequantization unit 563 can be omitted.

The computation unit 564 adds together the prediction matrix supplied from the prediction matrix size transformation unit 561 and the difference matrix supplied from the dequantization unit 563, and restores a scaling list for the current region. The computation unit 564 supplies the restored scaling list to the output unit 535 and the storage unit 536.

(5) Output Unit

The output unit 535 outputs the supplied information to a device outside the matrix generation unit 410. For example, in the copy mode, the output unit 535 supplies the prediction matrix supplied from the copy unit 541 to the dequantization unit 440 as a scaling list for the current region. Furthermore, for example, in the normal mode, the output unit 535 supplies the scaling list for the current region supplied from the scaling list restoration unit 534 (the computation unit 564) to the dequantization unit 440.

(6) Storage Unit

The storage unit 536 stores the scaling list supplied from the scaling list restoration unit 534 (the computation unit 564) together with the size and the list ID of the scaling list. The information concerning the scaling list stored in the storage unit 536 is used to generate prediction matrices of other orthogonal transform units which are processed later in time. In other words, the storage unit 536 supplies the stored information concerning the scaling list to the prediction unit 532 as information concerning a previously transmitted scaling list.

<2-11. Detailed Example Configuration of Inverse DPCM Unit>

FIG. 26 is a block diagram illustrating an example of a detailed configuration of the inverse DPCM unit 552 illustrated in FIG. 24. Referring to FIG. 26, the inverse DPCM unit 552 includes an initial setting unit 571, a DPCM decoding unit 572, and a DC coefficient extraction unit 573.

The initial setting unit 571 acquires sizeID and MatrixID, and sets various variables to initial values. The initial setting unit 571 supplies the acquired and set information to the DPCM decoding unit 572.

The DPCM decoding unit 572 determines individual coefficients (the DC coefficient and the AC coefficients) from the difference values (scaling_list_delta_coef) of the DC coefficient and the AC coefficients using the initial settings and the like supplied from the initial setting unit 571. The DPCM decoding unit 572 supplies the determined coefficients to the DC coefficient extraction unit 573 (ScalingList[i]).

The DC coefficient extraction unit 573 extracts the DC coefficient from among the coefficients (ScalingList[i]) supplied from the DPCM decoding unit 572. The DC coefficient is located at the beginning of the AC coefficients. That is, the initial coefficient (ScalingList[0]) among the coefficients supplied from the DPCM decoding unit 572 is the DC coefficient. The DC coefficient extraction unit 573 extracts the coefficient located at the beginning as the DC coefficient, and outputs the extracted coefficient to the inverse overlap determination unit 553 (DC_coef). The DC coefficient extraction unit 573 outputs the other coefficients (ScalingList[i] (i>0)) to the inverse overlap determination unit 553 as the AC coefficients.

Accordingly, the inverse DPCM unit 552 can perform correct DPCM decoding, and can obtain the DC coefficient and the AC coefficients. That is, the image decoding device 300 can suppress an increase in the amount of coding of a scaling list.

<2-12. Flow of Quantization Matrix Decoding Process>

An example of the flow of a quantization matrix decoding process executed by the matrix generation unit 410 having the configuration described above will be described with reference to a flowchart illustrated in FIG. 27.

When the quantization matrix decoding process is started, in step S301, the parameter analysis unit 531 reads quantized values (Qscale0 to Qscale3) of regions 0 to 3.

In step S302, the parameter analysis unit 531 reads pred_mode. In step S303, the parameter analysis unit 531 determines whether or not pred_mode is equal to 0. If it is determined that pred_mode is equal to 0, the parameter analysis unit 531 determines that the current mode is the copy mode, and advances the process to step S304.

In step S304, the parameter analysis unit 531 reads pred_matrix_id_delta. In step S305, the copy unit 541 copies a scaling list that has been transmitted, and uses the copied scaling list as a prediction matrix. In the copy mode, the prediction matrix is output as the scaling list for the current region. When the processing of step S305 is completed, the copy unit 541 ends the quantization matrix decoding process.

Furthermore, if it is determined in step S303 that pred_mode is not equal to 0, the parameter analysis unit 531 determines that the current mode is the full-scan mode (normal mode), and advances the process to step S306.

In step S306, the parameter analysis unit 531 reads pred_matrix_id_delta, pred_size_id_delta, and residual_flag. In step S307, the prediction matrix generation unit 542 generates a prediction matrix from a scaling list that has been transmitted.

In step S308, the parameter analysis unit 531 determines whether or not residual_flag is true. If it is determined that residual_flag is not true, no residual matrices exist, and the prediction matrix generated in step S307 is output as the scaling list for the current region. In this case, therefore, the parameter analysis unit 531 ends the quantization matrix decoding process.

Furthermore, if it is determined in step S308 that residual_flag is true, the parameter analysis unit 531 advances the process to step S309.

In step S309, the parameter analysis unit 531 reads residual_down_sampling_flag and residual_symmetry_flag.

In step S310, the exp-G unit 551 and the inverse DPCM unit 552 decode the exponential Golomb codes of the residual matrix, and generate residual data.

In step S311, the inverse overlap determination unit 553 determines whether or not residual_symmetry_flag is true. If it is determined that residual_symmetry_flag is true, the inverse overlap determination unit 553 advances the process to step S312, and restores the removed overlapping portion of the residual data (or performs an inverse symmetry process). When a difference matrix that is a 135-degree symmetric matrix is generated in the way described above, the inverse overlap determination unit 553 advances the process to step S313.

Furthermore, if it is determined in step S311 that residual_symmetry_flag is not true (or if the residual data is a difference matrix that is not a 135-degree symmetric matrix), the inverse overlap determination unit 553 advances the process to step S313 while skipping the processing of step S312 (or without performing an inverse symmetry process).

In step S313, the difference matrix size transformation unit 562 determines whether or not residual_down_sampling_flag is true. If it is determined that residual_down_sampling_flag is true, the difference matrix size transformation unit 562 advances the process to step S314, and up-converts the difference matrix to a size corresponding to the current region to be dequantized. After the difference matrix is up-converted, the difference matrix size transformation unit 562 advances the process to step S315.

Furthermore, if it is determined in step S313 that residual_down_sampling_flag is not true, the difference matrix size transformation unit 562 advances the process to step S315 while skipping the processing of step S314 (or without up-converting the difference matrix).

In step S315, the computation unit 564 adds the difference matrix to the prediction matrix to generate a scaling list for the current region. When the processing of step S315 is completed, the quantization matrix decoding process ends.

<2-13. Flow of Residual Signal Decoding Process>

Next, an example of the flow of the residual signal decoding process executed in step S310 in FIG. 27 will be described with reference to a flowchart illustrated in FIG. 28.

When the residual signal decoding process is started, in step S331, the exp-G unit 551 decodes the supplied exponential Golomb codes.

In step S332, the inverse DPCM unit 552 performs an inverse DPCM process on DPCM data obtained by the exp-G unit 551 through decoding.

Figure 27:
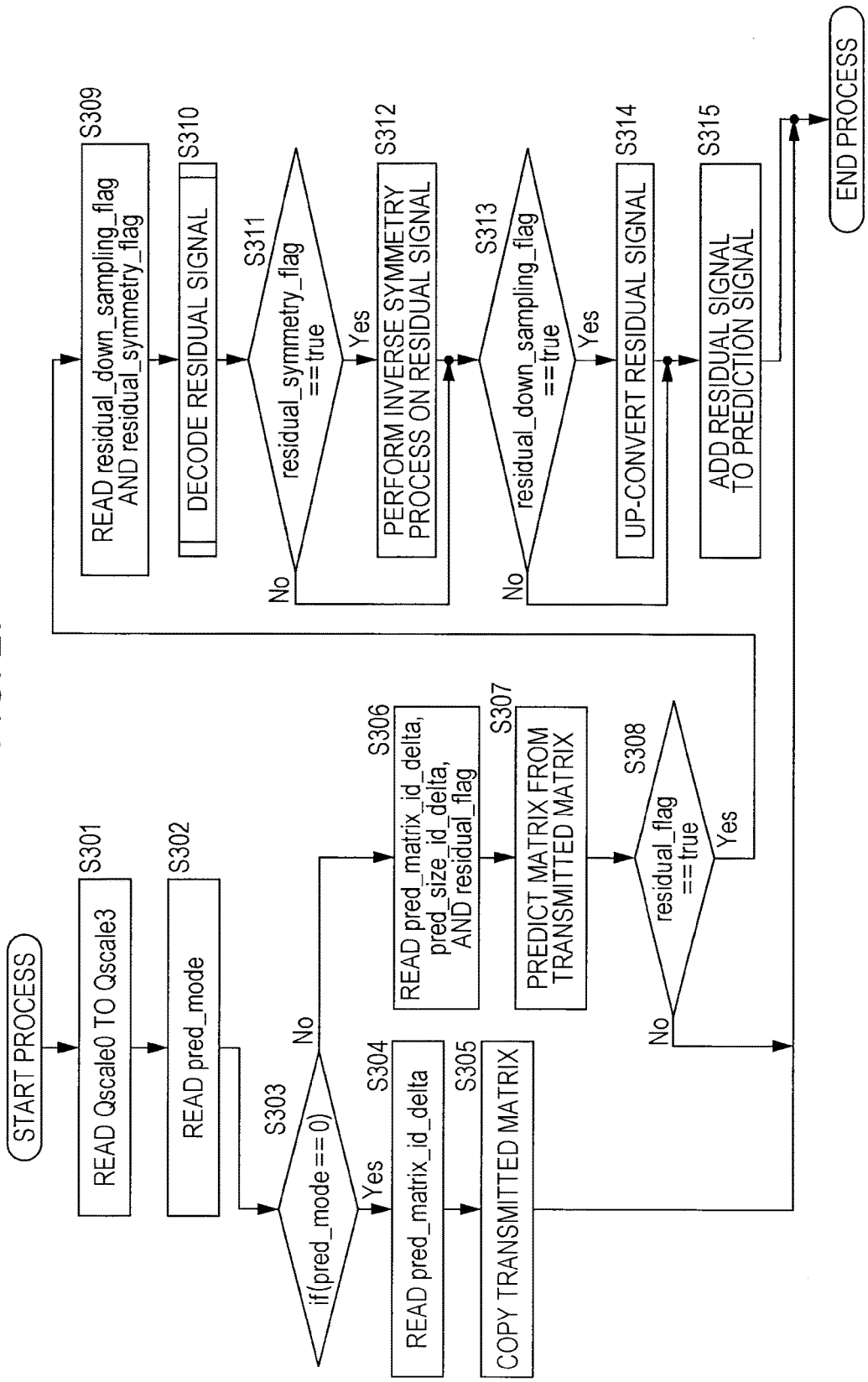
FIG. 27 is a flowchart illustrating an example of the flow of a matrix generation process.

When the inverse DPCM process is completed, the inverse DPCM unit 552 ends the residual signal decoding process, and returns the process to FIG. 27.

<2-14. Flow of Inverse DPCM Process>

Next, an example of the flow of the inverse DPCM process executed in step S332 in FIG. 28 will be described with reference to a flowchart illustrated in FIG. 29.

When the inverse DPCM process is started, in step S351, the initial setting unit 571 acquires sizeID and MatrixID.

In step S352, the initial setting unit 571 sets coefNum as follows.

coefNum=min((1<<(4+(sizeID<<1))),65)

In step S353, the initial setting unit 571 sets a variable i and a variable nextcoef as follows.

i=0 nextcoef=8

In step S354, the DPCM decoding unit 572 determines whether or not variable i<coefNum. If the variable i is smaller than coefNum, the initial setting unit 571 advances the process to step S355.

In step S355, the DPCM decoding unit 572 reads DPCM data of the coefficient (scaling_list_delta_coef).

In step S356, the DPCM decoding unit 572 determines nextcoef as below using the read DPCM data, and further determines scalingList[i].

nextcoef=(nextcoef+scaling_list_delta_coef+256)%256 scalingList[i]=nextcoef

In step S357, the DC coefficient extraction unit 573 determines whether or not sizeID is larger than 1 and whether or not the variable i is equal to 0 (that is, the coefficient located at the beginning). If it is determined that sizeID is larger than 1 and the variable i represents the coefficient located at the beginning, the DC coefficient extraction unit 573 advances the process to step S358, and uses the coefficient as the DC coefficient (DC_coef=nextcoef). When the processing of step S358 is completed, the DC coefficient extraction unit 573 advances the process to step S360.

Furthermore, if it is determined in step S357 that sizeID is less than or equal to 1 or that the variable i does not represent the coefficient located at the beginning, the DC coefficient extraction unit 573 advances the process to step S359, and shifts the variable i for each coefficient by one because the DC coefficient has been extracted. (ScalingList[(i−(sizeID)>1)?1;0]=nextcoef) If the processing of step S359 is completed, the DC coefficient extraction unit 573 advances the process to step S360.

In step S360, the DPCM decoding unit 572 increments the variable i to change the processing target to the subsequent coefficient, and then returns the process to step S354.

In step S354, the processing of steps S354 to S360 is repeatedly performed until it is determined that the variable i is greater than or equal to coefNum. If it is determined in step S354 that the variable i is greater than or equal to coefNum, the DPCM decoding unit 572 ends the inverse DPCM process, and returns the process to FIG. 28.

Accordingly, the difference between the DC coefficient and the AC coefficient located at the beginning of the AC coefficients may be correctly decoded. Therefore, the image decoding device 300 can suppress an increase in the amount of coding of a scaling list.

<3. Third Embodiment>

<3-1. Syntax:Second Method>

Another method for transmitting a difference between the DC coefficient and another coefficient, instead of the DC coefficient, may be to, for example, transmit a difference between the DC coefficient and the (0, 0) component of an 8×8 matrix as DPCM data different from the DPCM data of the 8×8 matrix (second method). For example, after DPCM transmission of an 8×8 matrix, the difference between the DC coefficient and the (0, 0) component of the 8×8 matrix may be transmitted.

Accordingly, similarly to the first method, the compression ratio can be more improved when the value of the (0, 0) coefficient (AC coefficient) of an 8×8 matrix and the value of the DC coefficient are close to each other.

FIG. 30 illustrates the syntax of a scaling list in the second method. In the example illustrated in FIG. 30, 64 difference values (scaling_list_delta_coef) between coefficients are read. Finally, the difference (scaling_list_dc_coef_delta) between the DC coefficient and the (0, 0) coefficient (AC coefficient) is read, and the DC coefficient is determined from the difference.

In the second method, accordingly, syntax for decoding AC coefficients can be similar to that of the related art illustrated in FIG. 12. That is, the syntax for the second method can be obtained by modifying the example of the related art by a small amount, and can be more feasible than that for the first method.

However, whereas the second method does not allow an image decoding device to obtain the DC coefficient until the image decoding device have received all the coefficients and have decompressed all the DPCM data, the first method allows an image decoding device to restore the DC coefficient at the time when the image decoding device receives the initial coefficient.

An image encoding device that implements the syntax for the second method described above will be described hereinafter.

<3-2. Detailed Example Configuration of DPCM Unit>

In the second method, the image encoding device 10 has a configuration basically similar to that in the first method described above. Specifically, the image encoding device 10 has a configuration as in the example illustrated in FIG. 14. Further, the orthogonal transform/quantization unit 14 has a configuration as in the example illustrated in FIG. 15. Further, the matrix processing unit 150 has a configuration as in the example illustrated in FIG. 16.

Figure 31:
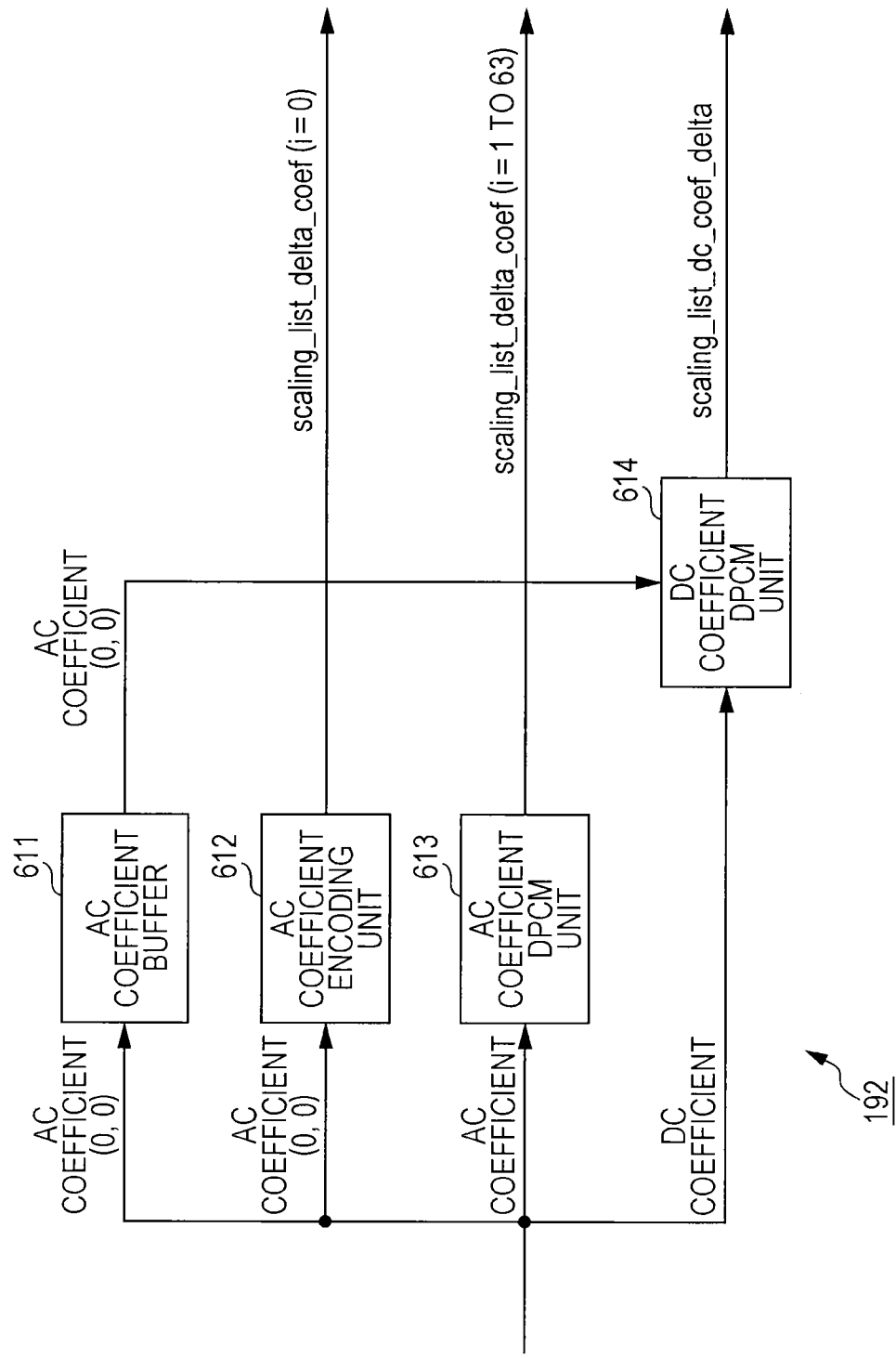
FIG. 31 is a block diagram illustrating another example configuration of the DPCM unit.

An example configuration of the DPCM unit 192 in the second example is illustrated in FIG. 31. As illustrated in FIG. 31, in the second example, the DPCM unit 192 includes an AC coefficient buffer 611, an AC coefficient encoding unit 612, an AC coefficient DPCM unit 613, and a DC coefficient DPCM unit 614.

The AC coefficient buffer 611 stores the initial AC coefficient (that is, the (0, 0) coefficient) supplied from the overlap determination unit 191. The AC coefficient buffer 611 supplies the stored initial AC coefficient (AC coefficient (0, 0)) to the DC coefficient DPCM unit 614 at a predetermined timing after all the AC coefficients have been subjected to a DPCM process, or in response to a request.

The AC coefficient encoding unit 612 acquires the initial AC coefficient (AC coefficient (0, 0)) supplied from the overlap determination unit 191, and subtracts the value of the initial AC coefficient from a constant (for example, 8). The AC coefficient encoding unit 612 supplies a subtraction result (difference) to the exp-G unit 193 as the initial coefficient (scaling_list_delta_coef (i=0)) of the DPCM data of the AC coefficients.

The AC coefficient DPCM unit 613 acquires the AC coefficients supplied from the overlap determination unit 191, determines, for each of the second and subsequent AC coefficients, the difference (DPCM) from the immediately preceding AC coefficient, and supplies the determined differences to the exp-G unit 193 as DPCM data (scaling_list_delta_coef (i=1 to 63)).

The DC coefficient DPCM unit 614 acquires the DC coefficient supplied from the overlap determination unit 191. The DC coefficient DPCM unit 614 further acquires the initial AC coefficient (AC coefficient (0, 0)) held in the AC coefficient buffer 611. The DC coefficient DPCM unit 614 subtracts the initial AC coefficient (AC coefficient (0, 0)) from the DC coefficient to determine the difference therebetween, and supplies the determined difference to the exp-G unit 193 as DPCM data of the DC coefficient (scaling_list_dc_coef_delta).

As described above, in the second method, a difference between the DC coefficient and another coefficient (the initial AC coefficient) is determined. Then, the difference is transmitted, as DPCM data of the DC coefficient (scaling_list_dc_coef_delta) different from DPCM data of the AC coefficients, after the transmission of DPCM data of the AC coefficients (scaling_list_delta_coef) that is a difference between the AC coefficients. Accordingly, similarly to the first method, the image encoding device 10 can improve the coding efficiency of a scaling list.

<3-3. Flow of DPCM Process>

Also in the second method, the image encoding device 10 executes a quantization matrix encoding process in a manner similar to that in the first method described with reference to the flowchart illustrated in FIG. 20.

An example of the flow of a DPCM process in the second method, which is executed in step S112 in FIG. 20, will be described with reference to a flowchart illustrated in FIG. 32.

When the DPCM process is started, in step S401, the AC coefficient buffer 611 holds the initial AC coefficient.

In step S402, the AC coefficient encoding unit 612 subtracts the initial AC coefficient from a predetermined constant (for example, 8) to determine the difference therebetween (initial DPCM data).

The processing of steps S403 to S405 is executed by the AC coefficient DPCM unit 613 in a manner similar to the processing of steps S133 to S135 in FIG. 21. That is, the processing of steps S403 to S405 is repeatedly executed to generate DPCM data of all the AC coefficients (the differences from the immediately preceding AC coefficients).

If it is determined in step S403 that all the AC coefficients have been processed (that is, if there is no unprocessed AC coefficient), the AC coefficient DPCM unit 613 advances the process to step S406.

In step S406, the DC coefficient DPCM unit 614 subtracts the initial AC coefficient held in step S401 from the DC coefficient to determine a difference therebetween (DPCM data for the DC coefficient).

Figure 20:
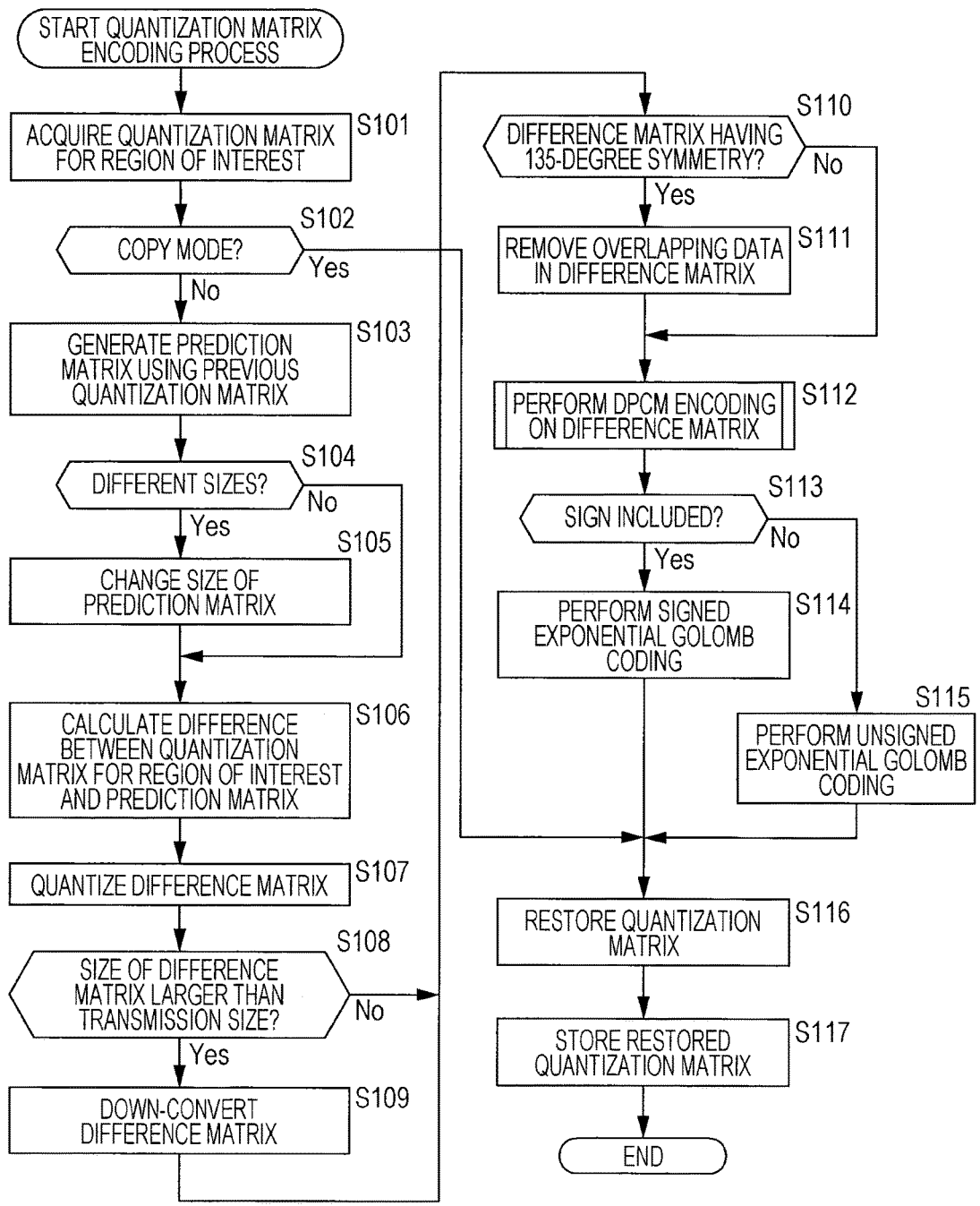
FIG. 20 is a flowchart illustrating an example of the flow of a quantization matrix encoding process.

When the processing of step S406 is completed, the DC coefficient DPCM unit 614 ends the DPCM process, and returns the process to FIG. 20.

Accordingly, a difference between the DC coefficient and another coefficient is also determined and transmitted to an image decoding device as DPCM data. Thus, the image encoding device 10 can suppress an increase in the amount of coding of a scaling list.

<3-4. Detailed Example Configuration of Inverse DPCM>Unit

In the second method, the image decoding device 300 has a configuration basically similar to that in the first method. Specifically, also in the second method, the image decoding device 300 has a configuration as in the example illustrated in FIG. 22. Furthermore, the dequantization/inverse orthogonal transform unit 313 has a configuration as in the example illustrated in FIG. 23. Moreover, the matrix generation unit 410 has a configuration as in the example illustrated in FIG. 24.

Figure 33:
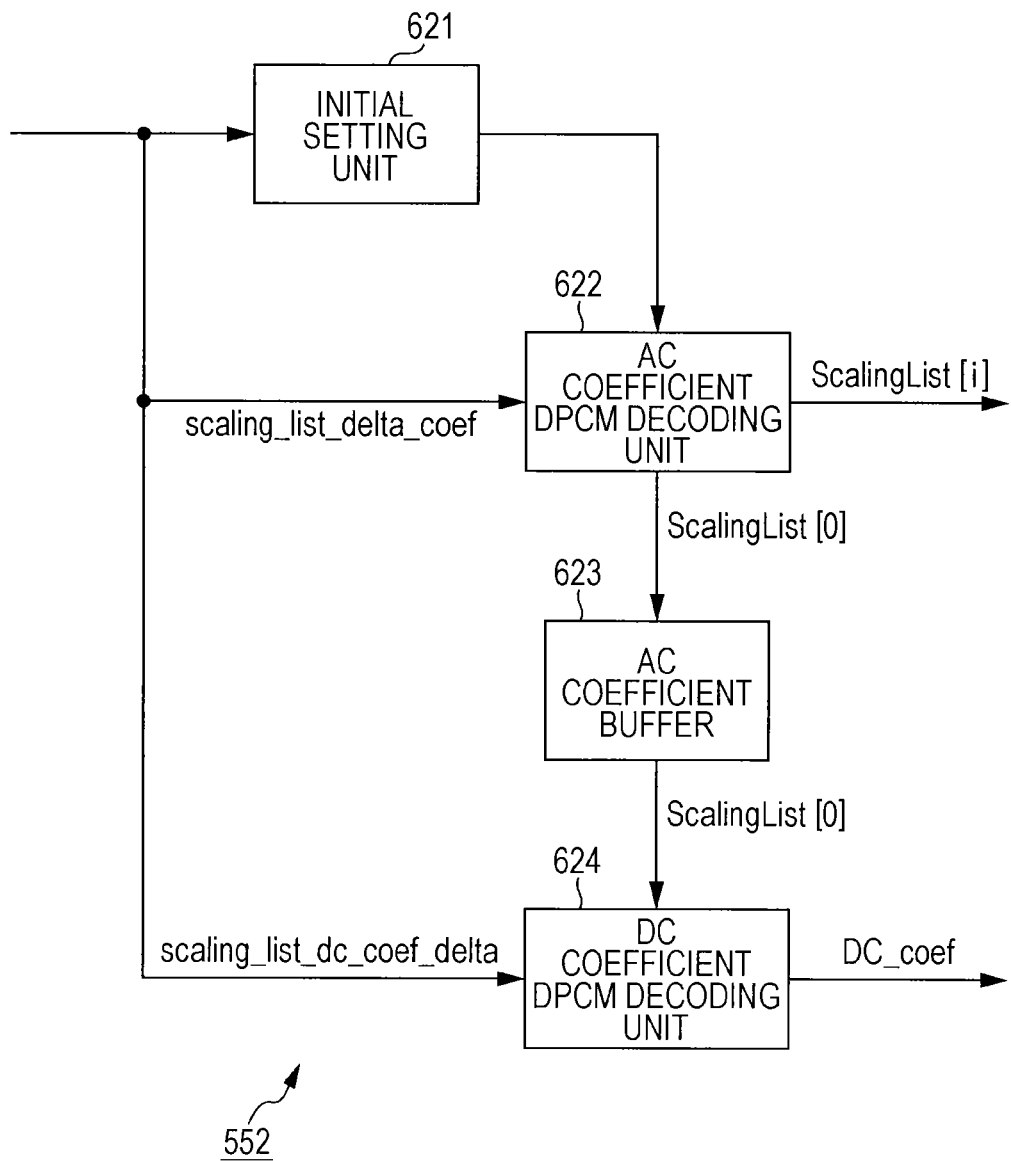
FIG. 33 is a block diagram illustrating another example configuration of the inverse DPCM unit.

FIG. 33 is a block diagram illustrating an example of a detailed configuration of the inverse DPCM unit 552 illustrated in FIG. 24 in the second method. Referring to FIG. 33, the inverse DPCM unit 552 includes an initial setting unit 621, an AC coefficient DPCM decoding unit 622, an AC coefficient buffer 623, and a DC coefficient DPCM decoding unit 624.

The initial setting unit 621 acquires sizeID and MatrixID, and sets various variables to initial values. The initial setting unit 621 supplies the acquired and set information to the AC coefficient DPCM decoding unit 622.

The AC coefficient DPCM decoding unit 622 acquires the DPCM data of the AC coefficients (scaling_list_delta_coef) supplied from the exp-G unit 551. The AC coefficient DPCM decoding unit 622 decodes the acquired DPCM data of the AC coefficients using the initial settings and the like supplied from the initial setting unit 621 to determine AC coefficients. The AC coefficient DPCM decoding unit 622 supplies the determined AC coefficients (ScalingList[i]) to the inverse overlap determination unit 553. The AC coefficient DPCM decoding unit 622 further supplies the initial AC coefficient (ScalingList[0], that is, the AC coefficient (0, 0)) among the determined AC coefficients to the AC coefficient buffer 623 for holding.

The AC coefficient buffer 623 stores the initial AC coefficient (ScalingList[0], that is, the AC coefficient (0, 0)) supplied from the AC coefficient DPCM decoding unit 622. The AC coefficient buffer 623 supplies the initial AC coefficient (ScalingList[0], that is, the AC coefficient (0, 0)) to the DC coefficient DPCM decoding unit 624 at a predetermined timing or in response to a request.

The DC coefficient DPCM decoding unit 624 acquires the DPCM data of the DC coefficient (scaling_list_dc_coef_delta) supplied from the exp-G unit 551. The DC coefficient DPCM decoding unit 624 further acquires the initial AC coefficient (ScalingList[0], that is, the AC coefficient (0, 0)) stored in the AC coefficient buffer 623. The DC coefficient DPCM decoding unit 624 decodes the DPCM data of the DC coefficient using the initial AC coefficient to determine the DC coefficient. The DC coefficient DPCM decoding unit 624 supplies the determined DC coefficient (DC_coef) to the inverse overlap determination unit 553.

Accordingly, the inverse DPCM unit 552 can perform correct DPCM decoding, and can obtain the DC coefficient and the AC coefficients. That is, the image decoding device 300 can suppress an increase in the amount of coding of a scaling list.

<3-5. Flow of Inverse DPCM Process>

Also in the second method, the image decoding device 300 executes a quantization matrix decoding process in a manner similar to that in the first method described above with reference to the flowchart illustrated in FIG. 27. Similarly, the image decoding device 300 executes a residual signal decoding process in a manner similar to that in the first method described above with reference to the flowchart illustrated in FIG. 28.

An example of the flow of the inverse DPCM process executed by the inverse DPCM unit 552 will be described with reference to a flowchart illustrated in FIG. 34.

When the inverse DPCM process is started, in step S421, the initial setting unit 621 acquires sizeID and MatrixID.

In step S422, the initial setting unit 621 sets coefNum as follows.

$$coefNum = \min((1 << (4 + (sizeID << 1))), 64)$$

In step S423, the initial setting unit 621 sets a variable i and a variable nextcoef as follows.

$$i = 0$$

$$nextcoef = 8$$

In step S424, the DPCM decoding unit 572 determines whether or not variable i<coefNum. If the variable i is smaller than coefNum, the initial setting unit 621 advances the process to step S425.

In step S425, the AC coefficient DPCM decoding unit 622 reads DPCM data of the AC coefficients (scaling_list_delta_coef).

In step S426, the AC coefficient DPCM decoding unit 622 determines nextcoef as below using the read DPCM data, and further determines scalingList[i].

$$nextcoef = (nextcoef + scaling\_list\_delta\_coef + 256)\%256$$

$$scalingList[i] = nextcoef$$

Note that the calculated initial AC coefficient (ScalingList[0], that is, the AC coefficient (0, 0)) is held in the AC coefficient buffer 623.

In step S427, the AC coefficient DPCM decoding unit 622 increments the variable i to change the target to be processed to the subsequent coefficient, and then returns the process to step S424.

In step S424, the processing of steps S424 to S427 is repeatedly performed until it is determined that the variable i is greater than or equal to coefNum. If it is determined in step S424 that the variable i is greater than or equal to coefNum, the AC coefficient DPCM decoding unit 622 advances the process to step S428.

In step S428, the DC coefficient DPCM decoding unit 624 determines whether or not sizeID is greater than 1. If it is determined that sizeID is greater than 1, the DC coefficient DPCM decoding unit 624 advances the process to step S429, and reads the DPCM data of the DC coefficient (scaling_list_dc_coef_delta).

In step S430, the DC coefficient DPCM decoding unit 624 acquires the initial AC coefficient (ScalingList[0], that is, the AC coefficient (0, 0)) held in the AC coefficient buffer 623, and decodes the DPCM data of the DC coefficient (DC_coef) using the initial AC coefficient as follows.

$$DC\_coef = scaling\_list\_dc\_coef\_delta + ScalingList[0]$$

Figure 28:
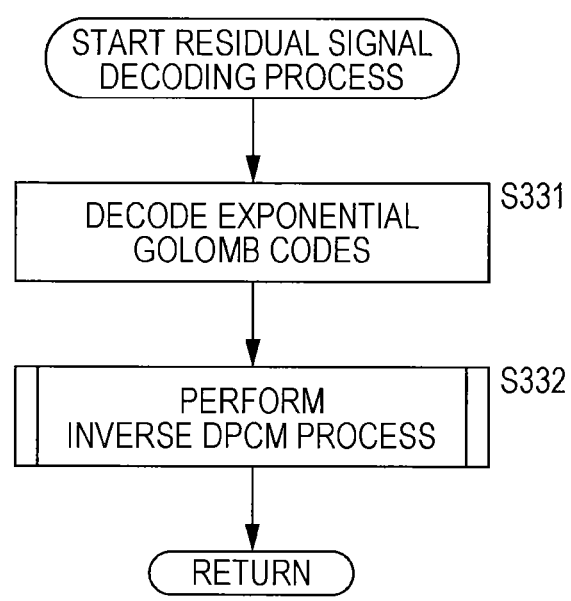
FIG. 28 is a flowchart illustrating an example of the flow of a residual signal decoding process.

When the DC coefficient (DC_coef) is obtained, the DC coefficient DPCM decoding unit 624 ends the inverse DPCM process, and returns the process to FIG. 28.

Furthermore, if it is determined in step S428 that sizeID is less than or equal to 1, the DC coefficient DPCM decoding unit 624 ends the inverse DPCM process, and returns the process to FIG. 28.

Accordingly, the difference between the DC coefficient and the AC coefficient located at the beginning of the AC coefficients can be correctly decoded. Therefore, the image decoding device 300 can suppress an increase in the amount of coding of a scaling list.

<4. Fourth Embodiment>
<4-1. Syntax: Third Method>

In the second method described above, the DC coefficient may also be limited to a value smaller than the initial AC coefficient (AC coefficient (0, 0)) (third method).

This ensures that the DPCM data of the DC coefficient, that is, a difference value obtained by subtracting the initial AC coefficient from the DC coefficient, can be a positive value. This DPCM data can thus be encoded using unsigned exponential Golomb codes. Therefore, the third method may prevent the DC coefficient from being larger than the initial AC coefficient, but can reduce the amount of coding compared to the first method and the second method.

FIG. 35 illustrates the syntax of a scaling list in the third method. As illustrated in FIG. 35, in this case, the DPCM data of the DC coefficient (scaling_list_dc_coef_delta) is limited to a positive value.

The syntax for the third method described above can be implemented by an image encoding device 10 similar to that in the second method. In the third method, however, the exp-G unit 193 can encode the DPCM data of the DC coefficient using unsigned exponential Golomb codes. Note that the image encoding device 10 can execute processes such as a quantization matrix encoding process and a DPCM process in a manner similar to that in the second method.

Furthermore, the syntax for the third method can be implemented by the image decoding device 300 in a manner similar to that in the second method. Moreover, the image decoding device 300 can execute a quantization matrix decoding process in a manner similar to that in the second method.

<4-2. Flow of Inverse DPCM Process>

Figure 36:
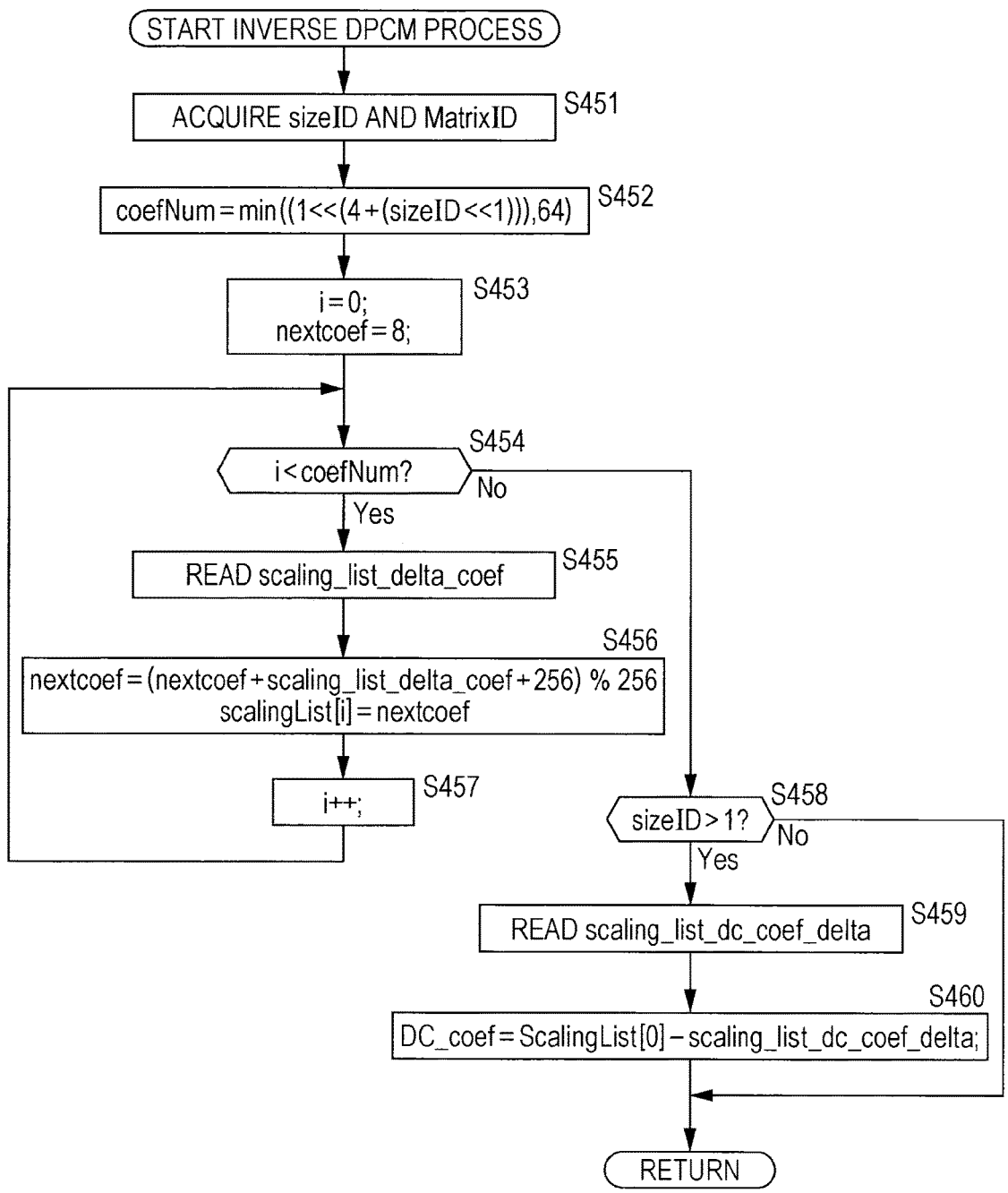
FIG. 36 is a flowchart illustrating still another example of the flow of the inverse DPCM process.

An example of the flow of an inverse DPCM process executed by the inverse DPCM unit 552 will be described with reference to a flowchart illustrated in FIG. 36.

Figure 34:
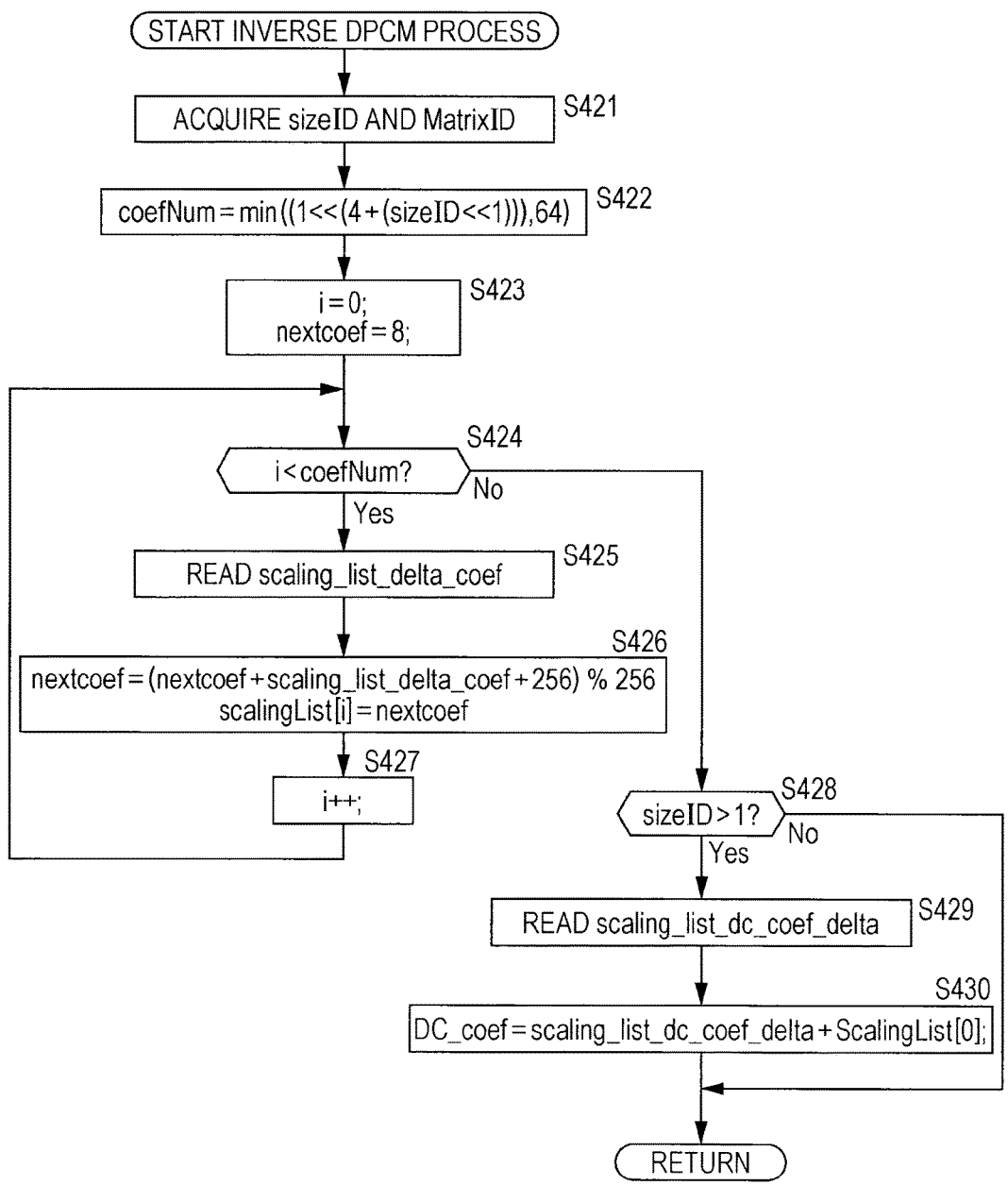
FIG. 34 is a flowchart illustrating another example of the flow of the inverse DPCM process.

The processing of steps S451 to S459 is performed in a manner similar to the processing of steps S421 to S429 in FIG. 34.

In step S460, the DC coefficient DPCM decoding unit 624 acquires the initial AC coefficient (ScalingList[0], that is, the AC coefficient (0, 0)) held in the AC coefficient buffer 623, and decodes the DPCM data of the DC coefficient (DC_coef) as below using the initial AC coefficient.

DC_coef=ScalingList[0]−scaling_list_dc_coef_delta

When the DC coefficient (DC_coef) is obtained, the DC coefficient DPCM decoding unit 624 ends the inverse DPCM process, and returns the process to FIG. 28.

Furthermore, if it is determined in step S458 that sizeID is less than or equal to 1, the DC coefficient DPCM decoding unit 624 ends the inverse DPCM process, and returns the process to FIG. 28.

Accordingly, the difference between the DC coefficient and the AC coefficient located at the beginning of the AC coefficients can be correctly decoded. Therefore, the image decoding device 300 can suppress an increase in the amount of coding of a scaling list.

<5. Fifth Embodiment>

<5-1. Syntax: Fourth Method>

Another method for transmitting a difference between the DC coefficient and another coefficient, instead of the DC coefficient, may be to, for example, collect only the DC coefficients of a plurality of scaling lists and to perform DPCM by taking differences between the DC coefficients separately from the AC coefficients of the individual scaling lists (fourth method). In this case, DPCM data of the DC coefficients is a collection of pieces of data for the plurality of scaling lists, and is transmitted as data different from DPCM data of the AC coefficients of the individual scaling lists.

Accordingly, the compression ratio can be more improved when, for example, there are correlations between the DC coefficients of the scaling lists (MatrixID).

FIG. 37 illustrates the syntax for the DC coefficient of a scaling list in the fourth method. In this case, since the DC coefficients are processed in cycles different from those for the AC coefficients of the individual scaling lists, as illustrated in the example illustrated in FIG. 37, processes for the AC coefficients and processes for the DC coefficients need to be independent from each other.

This ensures that more various methods for scaling list encoding and decoding processes can be achieved although the complexity of the DPCM process and the inverse DPCM process may be increased. For example, a process for copying only the AC coefficients and making the values of the DC coefficients different in the copy mode can be easily implemented.

The number of scaling lists in which the DC coefficients are collectively processed is arbitrary.

<5-2. Detailed Example Configuration of DPCM Unit>

In the fourth method, the image encoding device 10 has a configuration basically similar to that in the first method described above. Specifically, the image encoding device 10 has a configuration as in the example illustrated in FIG. 14. Furthermore, the orthogonal transform/quantization unit 14 has a configuration as in the example illustrated in FIG. 15. Moreover, the matrix processing unit 150 has a configuration as in the example illustrated in FIG. 16.

Figure 38:
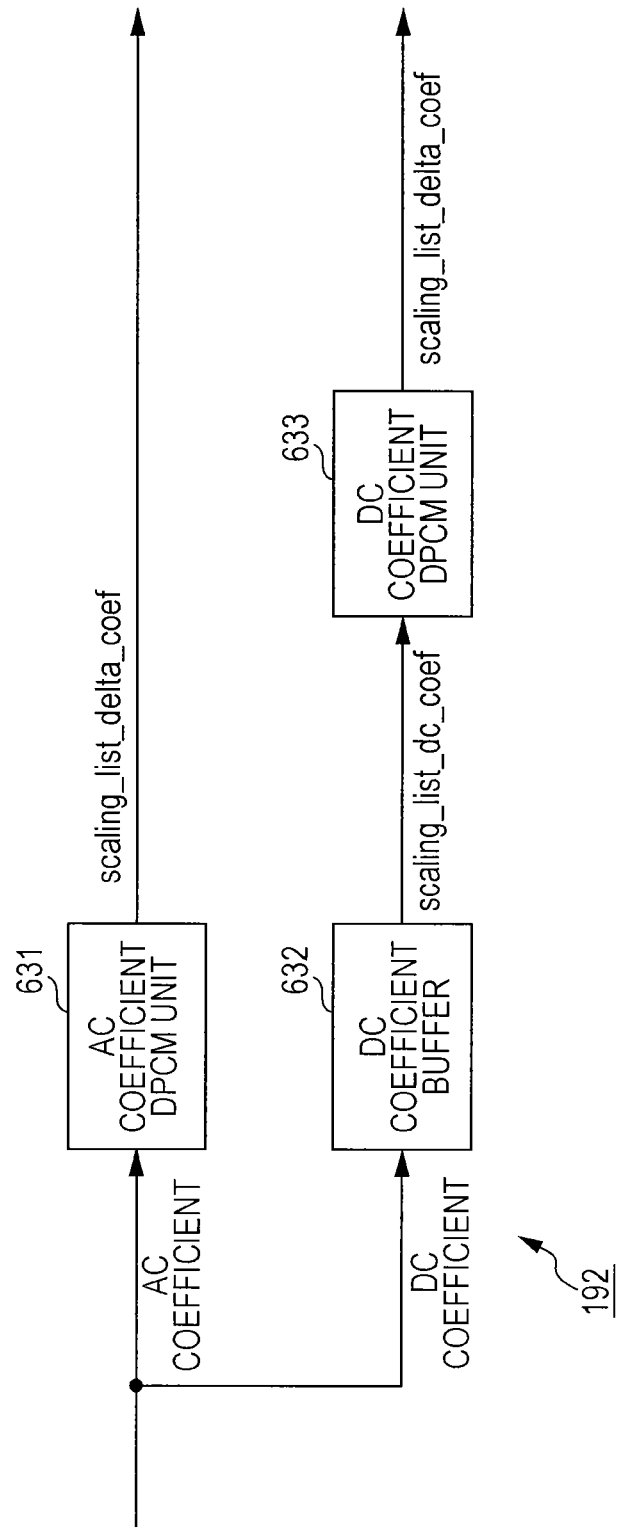
FIG. 38 is a block diagram illustrating still another example configuration of the DPCM unit.

An example configuration of the DPCM unit 192 in the fourth method is illustrated in FIG. 38. As illustrated in FIG. 38, in this case, the DPCM unit 192 includes an AC coefficient DPCM unit 631, a DC coefficient buffer 632, and a DC coefficient DPCM unit 633.

The AC coefficient DPCM unit 631 performs a DPCM process of the individual AC coefficients of each scaling list which are supplied from the overlap determination unit 191. Specifically, the AC coefficient DPCM unit 631 subtracts, for each scaling list, the initial AC coefficient from a predetermined constant (for example, 8), and subtracts the AC coefficient being processed (current AC coefficient) from the immediately preceding AC coefficient. The AC coefficient DPCM unit 631 supplies DPCM data (scaling_list_delta_coef) generated for each scaling list to the exp-G unit 193.

The DC coefficient buffer 632 stores the DC coefficients of the individual scaling lists supplied from the overlap determination unit 191. The DC coefficient buffer 632 supplies the stored DC coefficients to the DC coefficient DPCM unit 633 at a predetermined timing or in response to a request.

The DC coefficient DPCM unit 633 acquires the DC coefficients accumulated in the DC coefficient buffer 632. The DC coefficient DPCM unit 633 determines DPCM data of the acquired DC coefficients. Specifically, the DC coefficient DPCM unit 633 subtracts the initial DC coefficient from a predetermined constant (for example, 8), and subtracts the DC coefficient being processed (current DC coefficient) from the immediately preceding DC coefficient. The DC coefficient DPCM unit 633 supplies the generated DPCM data (scaling_list_delta_coef) to the exp-G unit 193.

Accordingly, the image encoding device 10 can improve the coding efficiency of a scaling list.

<5-3. Flow of DPCM Process>

Also in the fourth method, the image encoding device 10 executes a quantization matrix encoding process in a manner similar to that in the first method described above with reference to the flowchart illustrated in FIG. 20.

Figure 39:
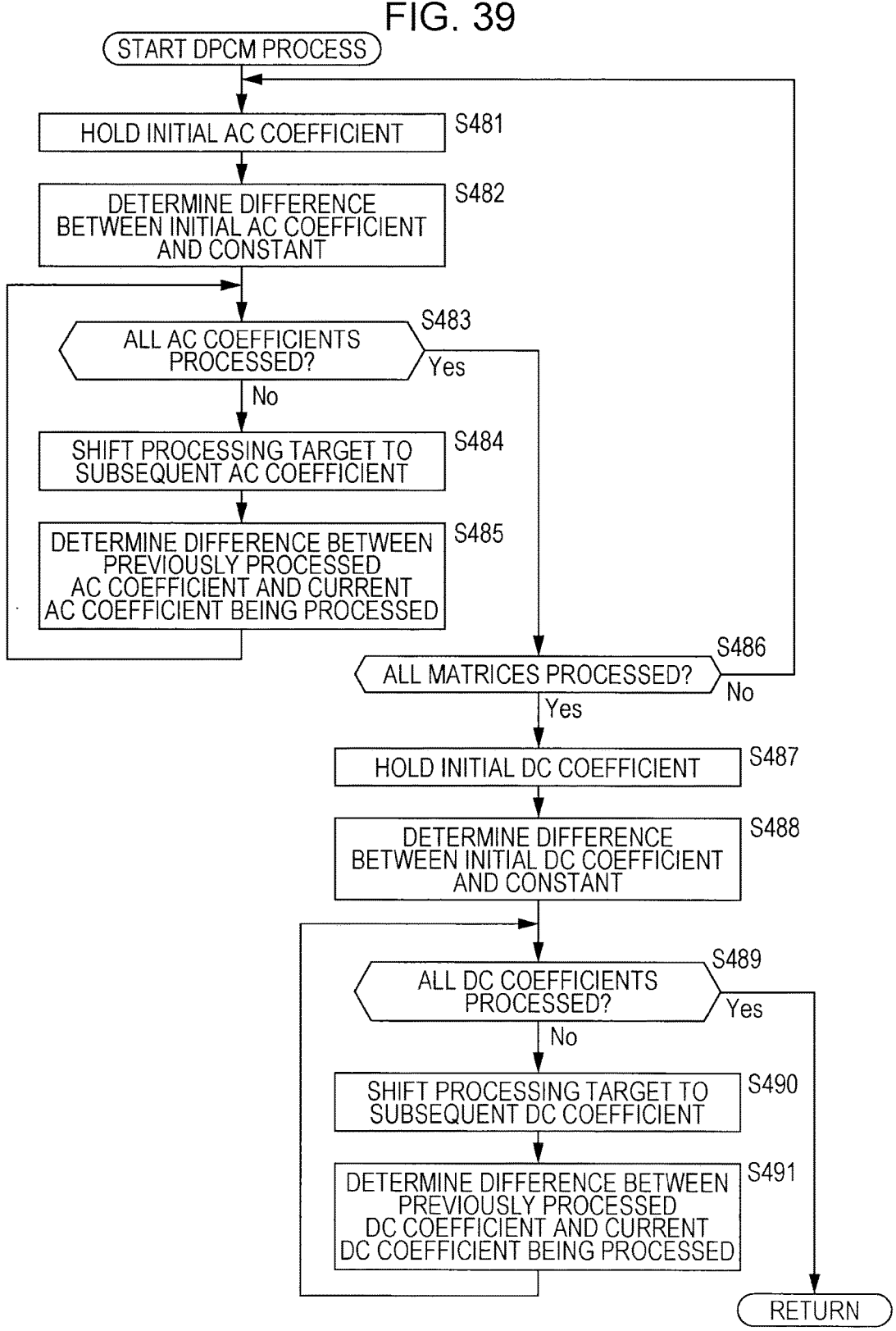
FIG. 39 is a flowchart illustrating still another example of the DPCM process.

An example of the flow of a DPCM process in the fourth method, which is executed in step S112 in FIG. 20, will be described with reference to a flowchart illustrated in FIG. 39.

Figure 32:
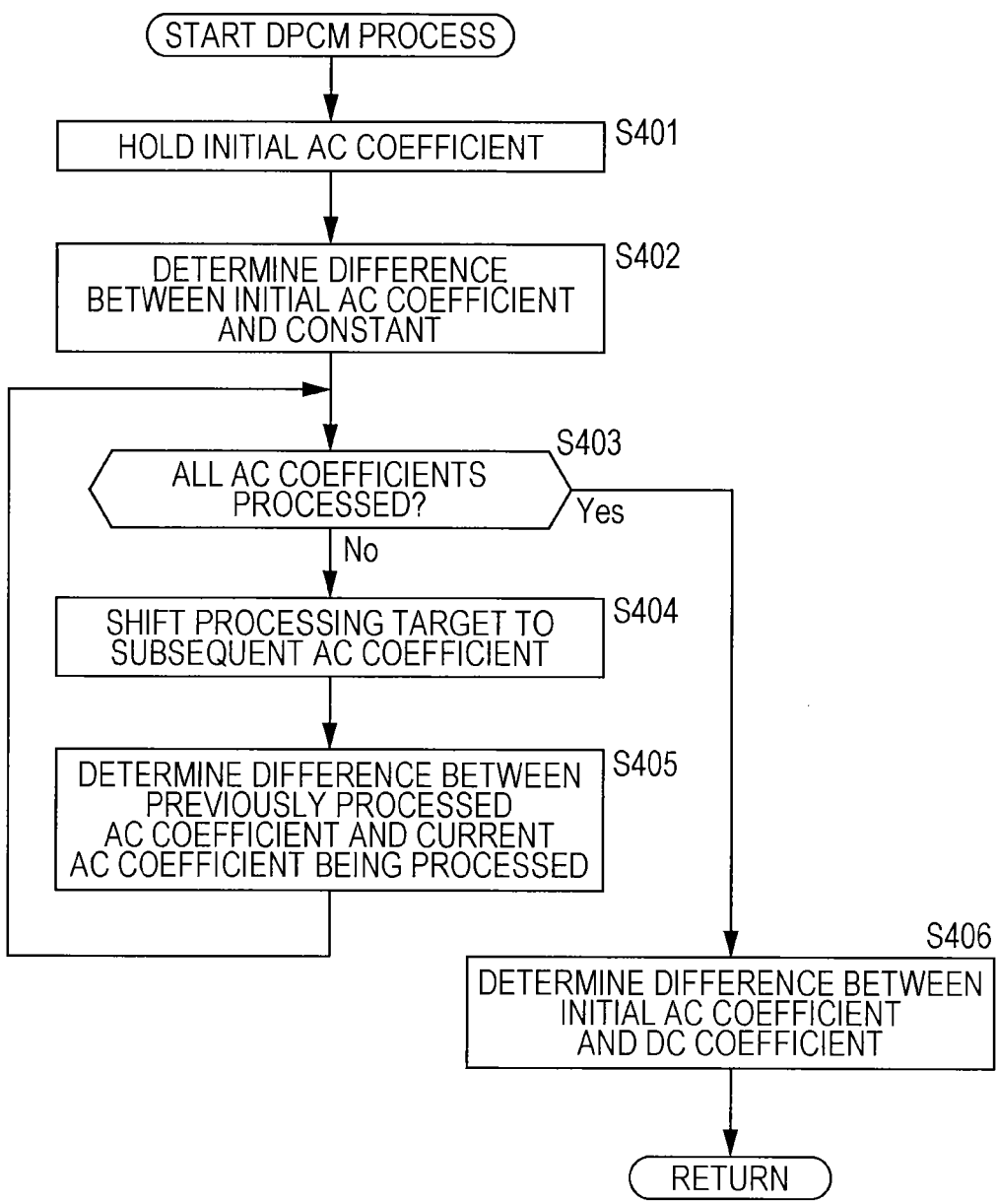
FIG. 32 is a flowchart illustrating another example of the flow of the DPCM process.

The processing of steps S481 to S485 is executed by the AC coefficient DPCM unit 631 in a manner similar to the processing of steps S401 to S405 (the processing in the second method) in FIG. 32.

If it is determined in step S483 that all the AC coefficients have been processed, the AC coefficient DPCM unit 631 advances the process to step S486.

In step S486, the AC coefficient DPCM unit 631 determines whether or not all the scaling lists (or difference matrices) in which the DC coefficients are collectively DPCM encoded have been processed. If it is determined that there is an unprocessed scaling list (or difference matrix), the AC coefficient DPCM unit 631 returns the process to step S481.

If it is determined in step S486 that all the scaling lists (or difference matrices) have been processed, the AC coefficient DPCM unit 631 advances the process to step S487.

The DC coefficient DPCM unit 633 executes the processing of steps S487 to S491 on the DC coefficients stored in the DC coefficient buffer 632 in a manner similar to the processing of steps S481 to S485.

If it is determined in step S489 that all the DC coefficients stored in the DC coefficient buffer 632 have been processed, the DC coefficient DPCM unit 633 ends the DPCM process, and returns the process to FIG. 20.

By executing a DPCM process in the manner described above, the image encoding device 10 can improve the coding efficiency of a scaling list.

<5-4. Detailed Example Configuration of Inverse DPCM>Unit

The image decoding device 300 in the fourth method has a configuration basically similar to that in the first method. Specifically, also in the fourth method, the image decoding device 300 has a configuration as in the example illustrated in FIG. 22. Further, the dequantization/inverse orthogonal transform unit 313 has a configuration as in the example illustrated in FIG. 23. Moreover, the matrix generation unit 410 has a configuration as in the example illustrated in FIG. 24.

Figure 40:
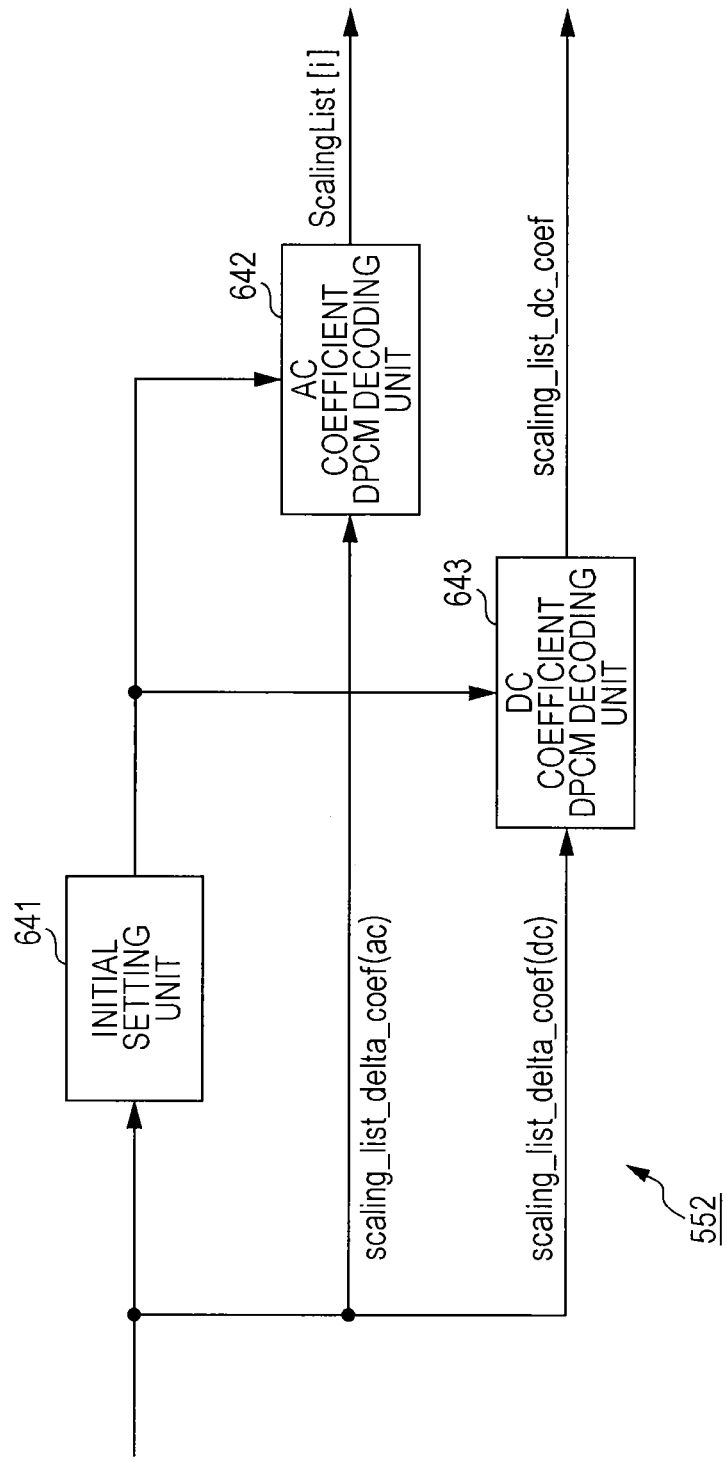
FIG. 40 is a block diagram illustrating still another example configuration of the inverse DPCM unit.

FIG. 40 is a block diagram illustrating an example of a detailed configuration of the inverse DPCM unit 552 illustrated in FIG. 24 in the fourth method. Referring to FIG. 40, the inverse DPCM unit 552 includes an initial setting unit 641, an AC coefficient DPCM decoding unit 642, and a DC coefficient DPCM decoding unit 643.

The initial setting unit 641 acquires sizeID and MatrixID, and sets various variables to initial values. The initial setting unit 641 supplies the acquired and set information to the AC coefficient DPCM decoding unit 642 and the DC coefficient DPCM decoding unit 643.

The AC coefficient DPCM decoding unit 642 acquires the DPCM data of the AC coefficients (scaling_list_delta_coef (ac)) supplied from the exp-G unit 551. The AC coefficient DPCM decoding unit 642 decodes the acquired DPCM data of the AC coefficients using the initial settings and the like supplied from the initial setting unit 641, and determines AC coefficients. The AC coefficient DPCM decoding unit 642 supplies the determined AC coefficients (ScalingList[i]) to the inverse overlap determination unit 553. The AC coefficient DPCM decoding unit 642 executes the process described above on a plurality of scaling lists.

The DC coefficient DPCM decoding unit 643 acquires the DPCM data of the DC coefficient (scaling_list_delta_coef (dc)) supplied from the exp-G unit 551. The DC coefficient DPCM decoding unit 643 decodes the acquired DPCM data of the DC coefficient using the initial settings and the like supplied from the initial setting unit 641, and determines DC coefficients of the individual scaling lists. The DC coefficient DPCM decoding unit 643 supplies the determined DC coefficients (scaling_list_dc_coef) to the inverse overlap determination unit 553.

Accordingly, the inverse DPCM unit 552 can perform correct DPCM decoding, and can obtain the DC coefficients and the AC coefficients. That is, the image decoding device 300 can suppress an increase in the amount of coding of scaling lists.

<5-5. Flow of Inverse DPCM Process>

Also in the fourth method, the image decoding device 300 executes a quantization matrix decoding process in a manner similar to that in the first method described above with reference to the flowchart illustrated in FIG. 27. Similarly, the image decoding device 300 executes a residual signal decoding process in a manner similar to that in the first method described above with reference to the flowchart illustrated in FIG. 28.

Figure 41:
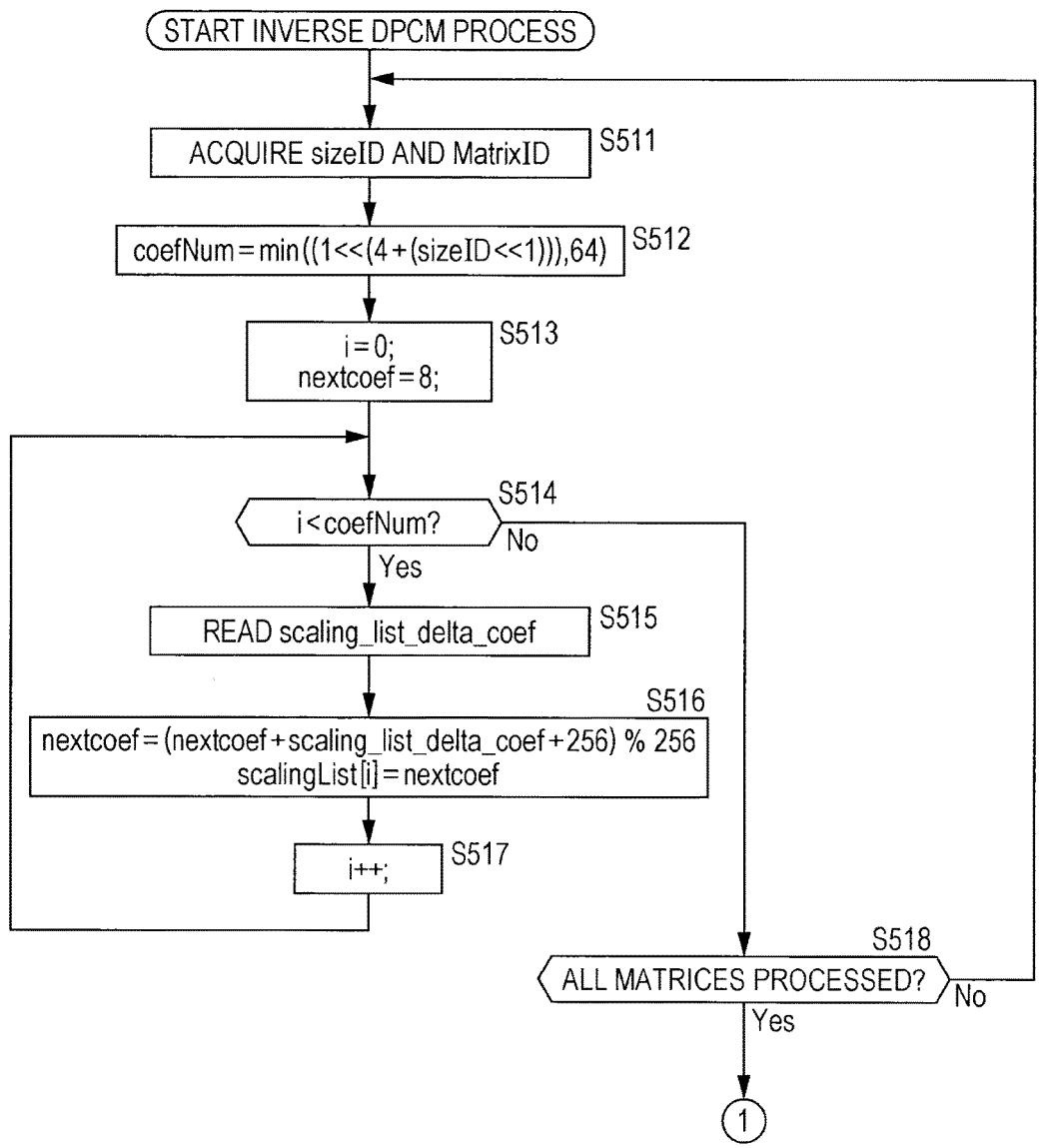
FIG. 41 is a flowchart illustrating still another example of the flow of the inverse DPCM process.

An example of the flow of an inverse DPCM process executed by the inverse DPCM unit 552 will be described with reference to a flowchart illustrated in FIGS. 41 and 42.

When the inverse DPCM process is started, the initial setting unit 641 and the AC coefficient DPCM decoding unit 642 execute the processing of steps S511 to S517 in a manner similar to that in the processing of steps S421 to S427 in FIG. 34.

If it is determined in step S514 that the variable i is greater than or equal to coefNum, the AC coefficient DPCM decoding unit 642 advances the process to step S518.

In step S518, the AC coefficient DPCM decoding unit 642 determines whether or not all the scaling lists (difference matrices) in which the DC coefficients are collectively subjected to a DPCM process have been processed. If it is determined that there is an unprocessed scaling list (difference matrix), the AC coefficient DPCM decoding unit 642 returns the process to step S511, and repeatedly performs the subsequent processing.

Figure 42:
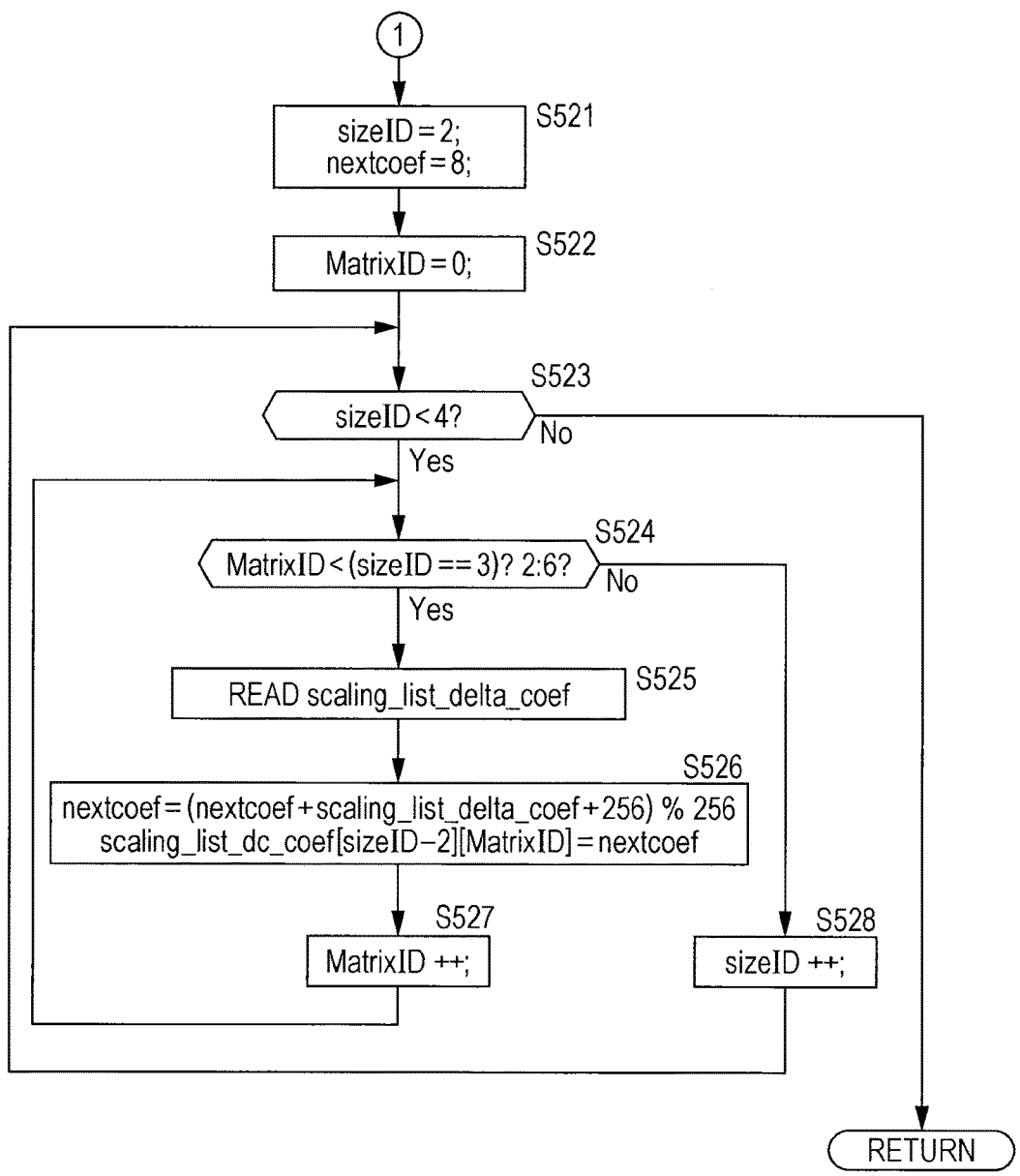
FIG. 42 is a flowchart continued from FIG. 41, illustrating still another example of the flow of the inverse DPCM process.

Furthermore, if it is determined that there is no unprocessed scaling list (difference matrix), the AC coefficient DPCM decoding unit 642 advances the process to FIG. 42.

In step S521 in FIG. 42, the initial setting unit 641 sets sizeID and a variable nextcoef as follows.

sizeID=2 nextcoef=8

Furthermore, in step S522, the initial setting unit 641 sets MatrixID as follows.

MatrixID=0

In step S523, the DC coefficient DPCM decoding unit 643 determines whether or not sizeID<4. If it is determined that sizeID is smaller than 4, the DC coefficient DPCM decoding unit 643 advances the process to step S524.

In step S524, the DC coefficient DPCM decoding unit 643 determines whether or not MatrixID<(sizeID==3)?2:6 is satisfied. If it is determined that MatrixID<(sizeID==3)?2:6 is satisfied, the DC coefficient DPCM decoding unit 643 advances the process to step S525.

In step S525, the DC coefficient DPCM decoding unit 643 reads the DPCM data of the DC coefficient (scaling_list_delta_coef).

In step S526, the DC coefficient DPCM decoding unit 643 determines nextcoef as below using the read DPCM data, and further determines scaling_dc_coef.

nextcoef=(nextcoef+scaling_list_delta_coef+256)%256 scaling_dc_coef[sizeID−2][MatrixID]=nextcoef

In step S527, the DC coefficient DPCM decoding unit 643 increments MatrixID to change the processing target to the subsequent DC coefficient (the subsequent scaling list or residual matrix), and then returns the process to step S524.

If it is determined in step S524 that MatrixID<(sizeID==3)?2:6 is not satisfied, the DC coefficient DPCM decoding unit 643 advances the process to step S528.

In step S528, the DC coefficient DPCM decoding unit 643 increments sizeID to change the processing target to the subsequent DC coefficient (the subsequent scaling list or residual matrix), and then returns the process to step S523.

If it is determined in step S523 that sizeID is greater than or equal to 4, the DC coefficient DPCM decoding unit 643 ends the inverse DPCM process, and returns the process to FIG. 28.

Accordingly, the differences between DC coefficients can be correctly decoded. Therefore, the image decoding device 300 can suppress an increase in the amount of coding of scaling lists.

<6. Sixth Embodiment>

<6-1. Other syntax: First Example>

FIG. 43 illustrates another example of the syntax for a scaling list. This drawing corresponds to FIG. 12. In the example illustrated in FIG. 12, the initial value of nextcoef is set to a predetermined constant (for example, 8). Alternatively, as illustrated in FIG. 43, the initial value of nextcoef may be overwritten with the DPCM data of the DC coefficient (scaling_list_dc_coef_minus8).

Accordingly, the amount of coding of the initial AC coefficients (AC coefficients (0, 0)) in a 16×16 scaling list and a 32×32 scaling list can be reduced.

<6-2. Other Syntax: Second Example>

FIG. 44 illustrates another example of the syntax for a scaling list. This drawing corresponds to FIG. 12.

In the example illustrated in FIG. 12, when the value of scaling_list_pred_matrix_id_delta, which is information that specifies the reference destination in the copy mode, is "0", the scaling list that precedes the current scaling list being processed by one scaling list is referred to, and when the value of scaling_list_pred_matrix_id_delta is "1", the scaling list that precedes the current scaling list being processed by two scaling lists is referred to.

In contrast, in the example illustrated in FIG. 44, as illustrated in part C of FIG. 44, when the value of scaling_list_pred_matrix_id_delta, which is information that specifies the reference destination in the copy mode, is "0", the default scaling list is referred to, and when the value of scaling_list_pred_matrix_id_delta is "1", the immediately preceding scaling list is referred to.

In this manner, modifying the semantics of scaling_list_pred_matrix_id_delta can simplify the syntax in a manner illustrated in part B of FIG. 44 and can reduce the load of the DPCM process and the inverse DPCM process.

<6-3. Other Syntax: Third Example>

FIG. 45 illustrates another example of the syntax for a scaling list. This drawing corresponds to FIG. 12.

In the example illustrated in FIG. 45, both of the example illustrated in FIG. 43 and the example illustrated in FIG. 44 described above are used.

In the example illustrated in FIG. 45, accordingly, the amount of coding of the initial AC coefficients (AC coefficients (0, 0)) in a 16×16 scaling list and a 32×32 scaling list can be reduced. In addition, syntax can be simplified and the load of the DPCM process and the inverse DPCM process can be reduced.

In the foregoing embodiments, the values of the predetermined constants are arbitrary. In addition, the sizes of the scaling lists are also arbitrary.

Furthermore, while the foregoing description has been given of a size transformation process for a scaling list, a prediction matrix, or a difference matrix between them, the size transformation process may be a process for actually generating a matrix whose size has been transformed, or may be a process for setting how to read each element in a matrix from a memory (read control of matrix data) without actually generating data of the matrix.

In the size transformation process described above, each element in a matrix whose size has been transformed is constituted by any of the elements in the matrix whose size has not yet been transformed. That is, a matrix whose size has been transformed may be generated by reading elements in a matrix whose size has not yet been transformed, which is stored in a memory, using a certain method such as reading some of the elements in the matrix or reading one element a plurality of times. In other words, a method for reading each element is defined (or read control of matrix data is performed) to substantially implement the size transformation described above. This method may remove a process such as writing matrix data whose size has been transformed to the memory. In addition, the reading of matrix data whose size has been transformed basically depends on how to perform nearest neighbor interpolation and the like, and therefore size transformation may be implemented by a comparatively low load process such as selecting an appropriate one of a plurality of options prepared in advance. Accordingly, the method described above may reduce the load of size transformation.

That is, the size transformation process described above includes a process for actually generating matrix data whose size has been transformed and also includes read control of the matrix data.

Note that while the foregoing description has been made in the context of a difference matrix being encoded and transmitted, this is merely illustrative and a scaling list may be encoded and transmitted. In other words, the AC coefficients and DC coefficient of a scaling list which have been described above as coefficients to be processed may be the AC coefficients and DC coefficient of a difference matrix between a scaling list and a prediction matrix.

In addition, the amount of coding for information on parameters, flags, and so forth of a scaling list, such as the size and the list ID of the scaling list, may be reduced by, for example, taking a difference between the information and the previously transmitted information and transmitting the difference.

Furthermore, while the foregoing description has been made in the context of a quantization matrix or a difference matrix of a large size being down-converted and transmitted, this is merely illustrative and a quantization matrix or a difference matrix may be transmitted without being down-converted, while the size of the quantization matrix used for quantization is kept unchanged.

The present technology can be applied to any type of image encoding and decoding that involves quantization and dequantization.

In addition, the present technology can also be applied to, for example, an image encoding device and an image decoding device used to receive image information (bit stream) compressed using an orthogonal transform such as a discrete cosine transform and motion compensation, such as MPEG or H.26x, via a network medium such as satellite broadcasting, cable television, the Internet, or a mobile phone. The present technology can also be applied to an image encoding device and an image decoding device used for processing on storage media such as an optical disk, a magnetic disk, and a flash memory. Furthermore, the present technology can also be applied to a quantization device and a dequantization device included in the image encoding device and the image decoding device described above, and the like.

<7. Seventh Embodiment>

<Application to Multi-View Image Encoding and Multi-View Image Decoding>

The series of processes described above can be applied to multi-view image encoding and multi-view image decoding. FIG. 46 illustrates an example of a multi-view image encoding scheme.

As illustrated in FIG. 46, multi-view images include images at a plurality of viewpoints (or views). The plurality of views in the multi-view images include base views, each of which is encoded and decoded using an image thereof without using an image of another view, and non-base views, each of which is encoded and decoded using an image of another view. Each of the non-base views may be encoded and decoded using an image of a base view or using an image of any other non-base view.

When the multi-view images illustrated in FIG. 46 are to be encoded and decoded, an image of each view is encoded and decoded. The method described above in the foregoing embodiments may be applied to the encoding and decoding of each view. This can suppress a reduction in the image quality of the individual views.

Furthermore, flags and parameters used in the method described above in the foregoing embodiments may be shared in the encoding and decoding of each view. This can suppress a reduction in coding efficiency.

More specifically, for example, information concerning a scaling list (for example, parameters, flags, and so forth) may be shared in the encoding and decoding of each view.

Needless to say, any other necessary information may be shared in the encoding and decoding of each view.

For example, when a scaling list or information concerning the scaling list which is included in a sequence parameter set (SPS) or a picture parameter set (PPS) is to be transmitted, if those (SPS and PPS) are shared among views, the scaling list or the information concerning the scaling list is also shared accordingly. This can suppress a reduction in coding efficiency.

Furthermore, matrix elements in a scaling list (or quantization matrix) for a base view may be changed in accordance with disparity values between views. Moreover, an offset value for adjusting a non-base view matrix element with regard to a matrix element in a scaling list (quantization matrix) for a base view may be transmitted. Accordingly, an increase in the amount of coding can be suppressed.

For example, a scaling list for each view may be separately transmitted in advance. When a scaling list is to be changed for each view, only information indicating the difference from the corresponding one of the scaling lists transmitted in advance may be transmitted. The information indicating the difference is arbitrary, and may be, for example, information in units of 4×4 or 8×8 or a difference between matrices.

Note that if a scaling list or information concerning the scaling list is shared among views although an SPS or a PPS is not shared, the SPSs or PPSs for other views may be able to be referred to (that is, scaling lists or information concerning scaling lists for other views can be used).

Moreover, if such multi-view images are represented as images having, as components, YUV images and depth images (Depth) corresponding to the amount of disparity between views, an independent scaling list or information concerning the scaling list for the image of each component (Y, U, V, and Depth) may be used.

For example, since a depth image (Depth) is an image of an edge, scaling lists are not necessary. Thus, even though an SPS or a PPS specifies the use of a scaling list, a scaling list may not be applied (or a scaling list in which all the matrix elements are the same (or flat) may be applied) to a depth image (Depth).

<Multi-View Image Encoding Device>

Figure 47:
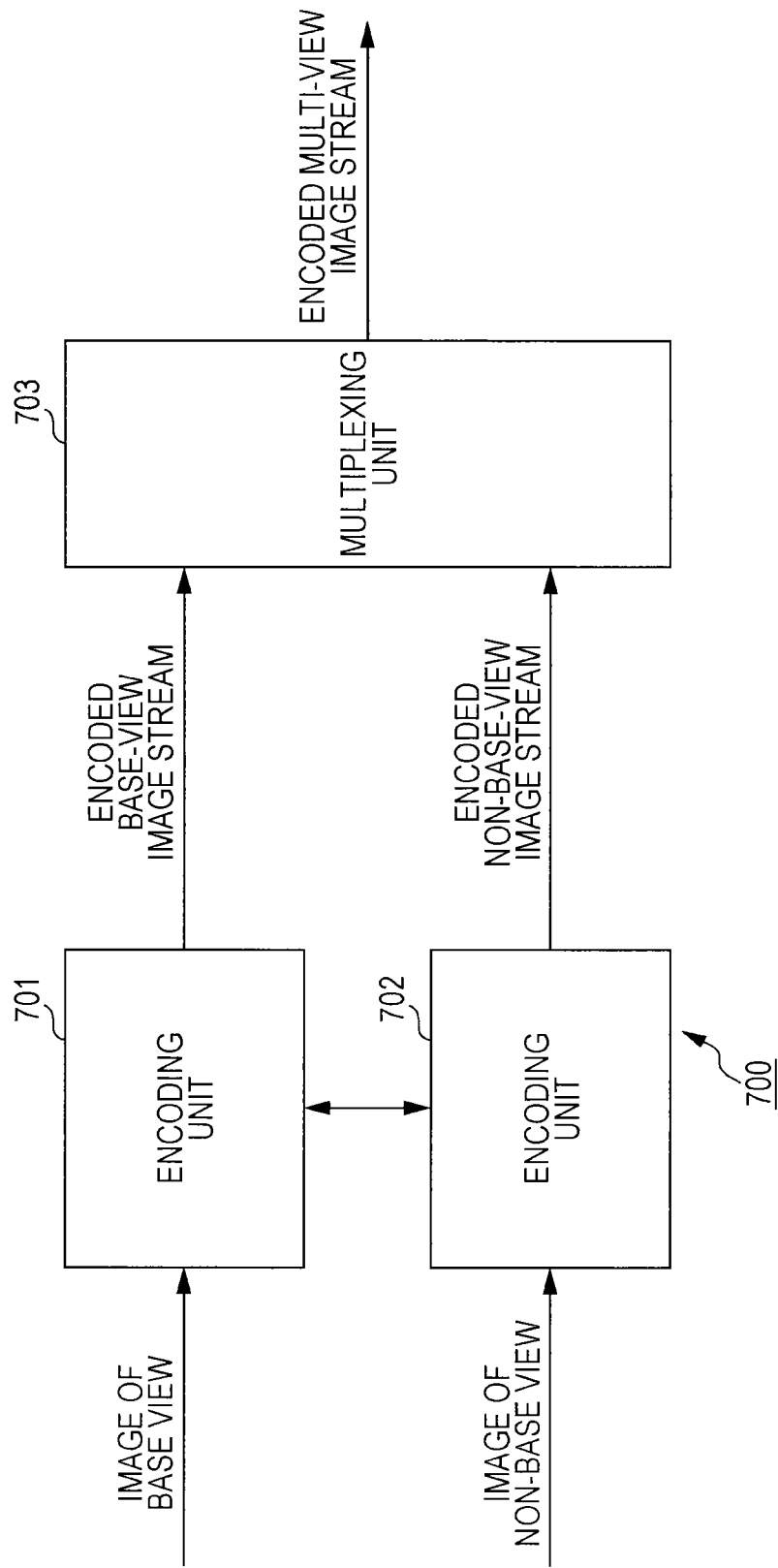
FIG. 47 is a diagram illustrating an example of a main configuration of a multi-view image encoding device to which the present technology is applied.

FIG. 47 is a diagram illustrating a multi-view image encoding device for performing the multi-view image encoding operation described above. As illustrated in FIG. 47, a multi-view image encoding device 700 includes an encoding unit 701, an encoding unit 702, and a multiplexing unit 703.

The encoding unit 701 encodes an image of a base view, and generates an encoded base-view image stream. The encoding unit 702 encodes an image of a non-base view, and generates an encoded non-base-view image stream. The multiplexing unit 703 multiplexes the encoded base-view image stream generated by the encoding unit 701 and the encoded non-base-view image stream generated by the encoding unit 702, and generates an encoded multi-view image stream.

The image encoding device 10 (FIG. 14) can be used for each of the encoding unit 701 and the encoding unit 702 of the multi-view image encoding device 700. That is, an increase in the amount of coding of a scaling list in the encoding of each view can be suppressed, and a reduction in the image quality of each view can be suppressed. In addition, the encoding unit 701 and the encoding unit 702 can perform processes such as quantization and dequantization using the same flags or parameters (that is, flags and parameters can be shared). Accordingly, a reduction in coding efficiency can be suppressed.

<Multi-View Image Decoding Device>

Figure 48:
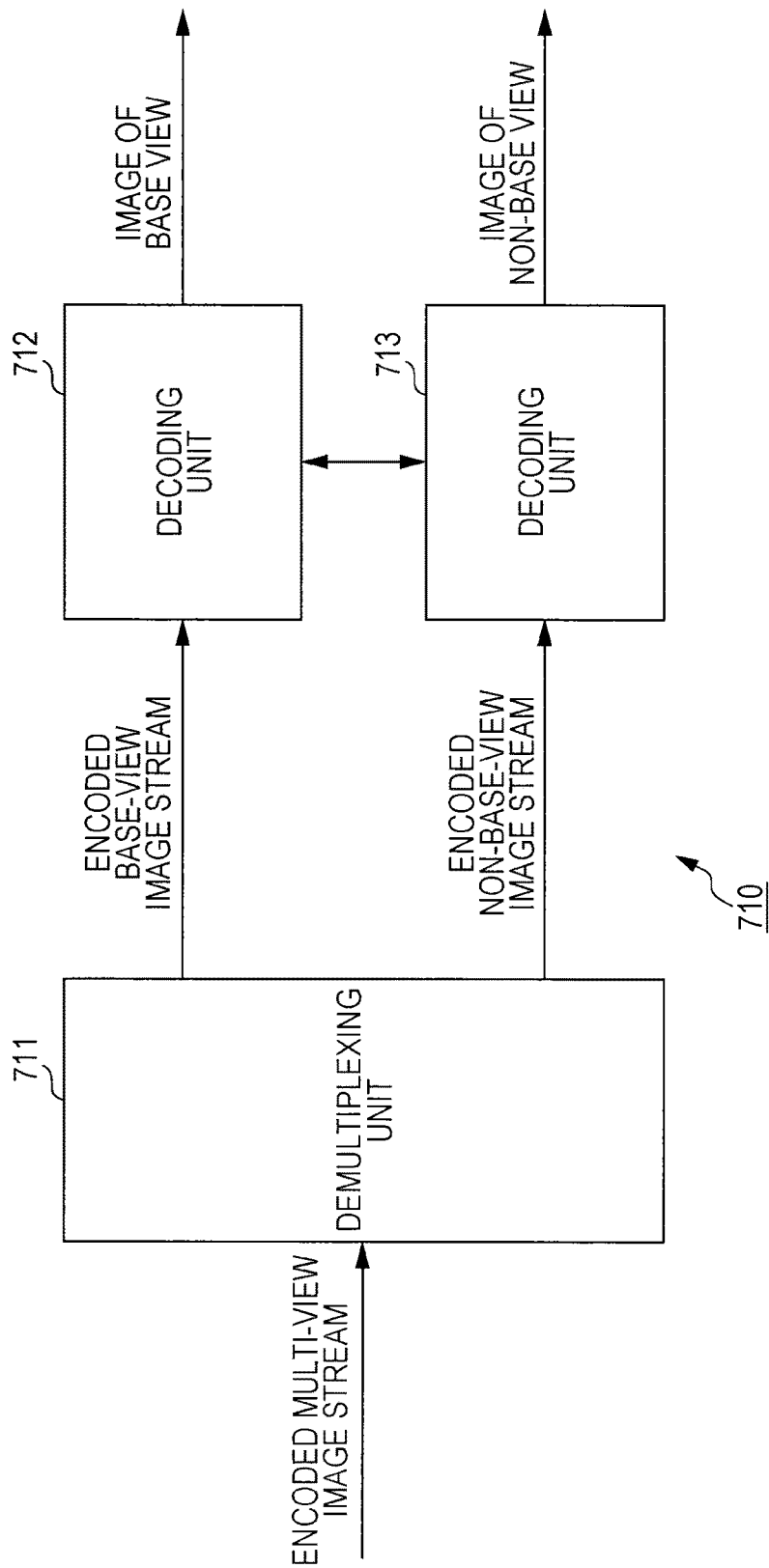
FIG. 48 is a diagram illustrating an example of a main configuration of a multi-view image decoding device to which the present technology is applied.

FIG. 48 is a diagram illustrating a multi-view image decoding device for performing the multi-view image decoding operation described above. As illustrated in FIG. 48, a multi-view image decoding device 710 includes a demultiplexing unit 711, a decoding unit 712, and a decoding unit 713.

The demultiplexing unit 711 demultiplexes an encoded multi-view image stream in which an encoded base-view image stream and an encoded non-base-view image stream have been multiplexed, and extracts the encoded base-view image stream and the encoded non-base-view image stream. The decoding unit 712 decodes the encoded base-view image stream extracted by the demultiplexing unit 711, and obtains an image of a base view. The decoding unit 713 decodes the encoded non-base-view image stream extracted by the demultiplexing unit 711, and obtains an image of a non-base view.

The image decoding device 300 (FIG. 22) can be used for each of the decoding unit 712 and the decoding unit 713 of the multi-view image decoding device 710. That is, an increase in the amount of coding of a scaling list in the decoding of each view can be suppressed, and a reduction in the image quality of each view can be suppressed. In addition, the decoding unit 712 and the decoding unit 713 can perform processes such as quantization and dequantization using the same flags and parameters (that is, flags and parameters can be shared). Accordingly, a reduction in coding efficiency can be suppressed.

<8. Eighth Embodiment>

<Application to Layered Image Encoding and Layered Image Decoding>

Figure 49:
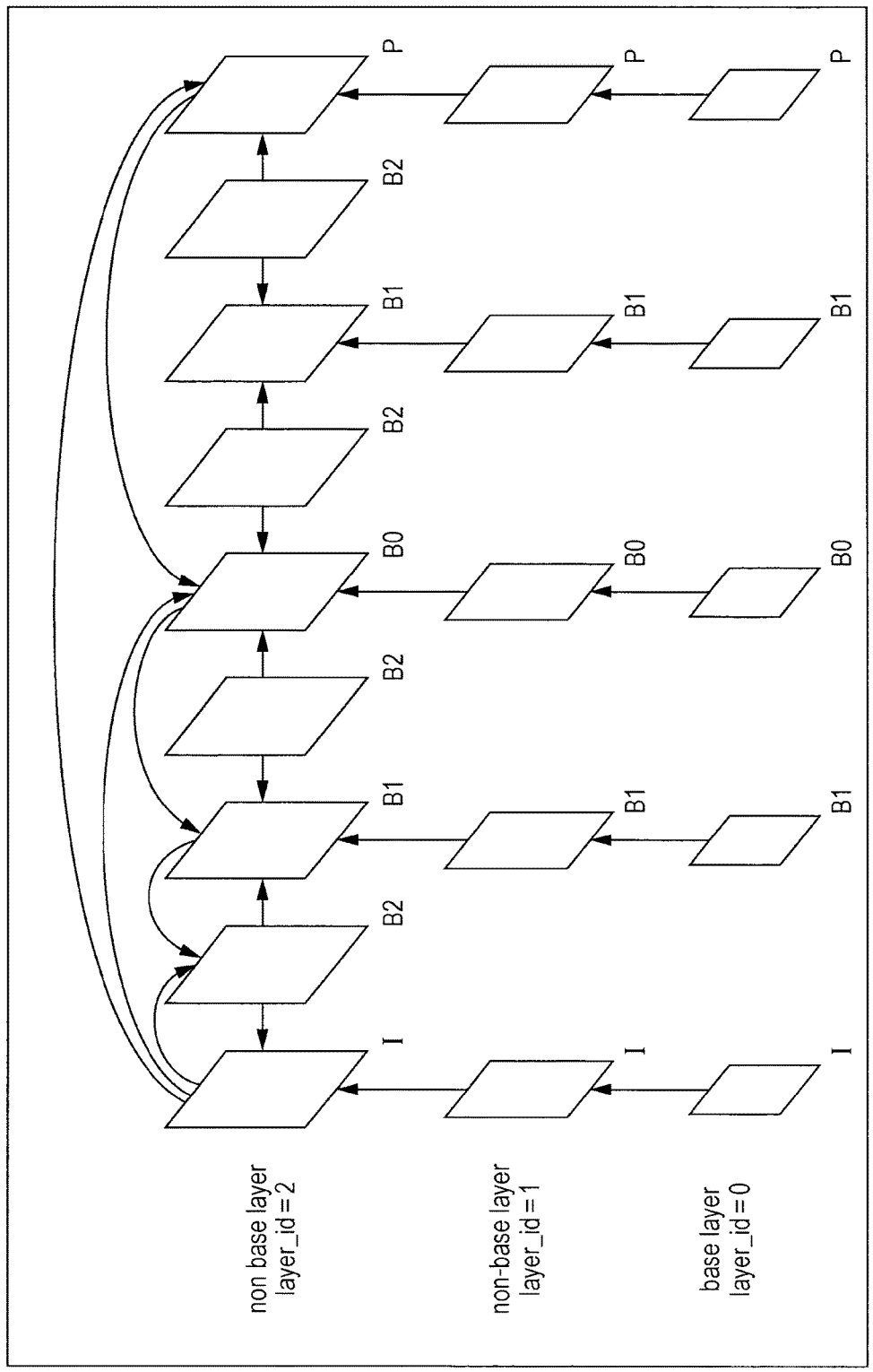
FIG. 49 is a diagram illustrating an example of a layered image encoding scheme.

The series of processes described above can be applied to layered image encoding and layered image decoding (scalable encoding and scalable decoding). FIG. 49 illustrates an example of a layered image encoding scheme.

Layered image encoding (scalable coding) is a process for dividing an image into a plurality of layers (layering) so as to provide image data with the scalability function for a predetermined parameter and for encoding the individual layers. Layered image decoding (scalable decoding) is a decoding process corresponding to layered image encoding.

As illustrated in FIG. 49, in image layering, one image is divided into a plurality of sub-images (or layers) using as a reference a predetermined parameter with a scalability function. That is, images decomposed into layers (or layered images) include multiple layered (or layer) images having different values of the predetermined parameter. The plurality of layers in the layered images include base layers, each of which is encoded and decoded using an image thereof without using an image of another layer, and non-base layers (also referred to as enhancement layers), each of which is encoded and decoded using an image of another layer. Each of the non-base layers may be encoded and decoded using an image of a base layer or using an image of any other non-base layer.

In general, each of the non-base layers is composed of data of a difference image (difference data) between an image thereof and an image of another layer in order to reduce redundancy. For example, in a case where one image is decomposed into two layers, namely, a base layer and a non-base layer (also referred to as an enhancement layer), an image with a quality lower than the original image may be obtained using only the data of the base layer, and the original image (that is, an image with a high quality) may be obtained by combining the data of the base layer and the data of the non-base layer.

The layering of an image in the manner described above can facilitate obtaining of images with a wide variety of qualities in accordance with situations. This ensures that image compression information can be transmitted from a server in accordance with the capabilities of terminals and networks without implementing transcoding such that, for example, image compression information on only base layers is transmitted to terminals having low processing capabilities, such as mobile phones, to reproduce moving images having a low spatial-temporal resolution or a low quality, and image compression information on enhancement layers in addition to base layers is transmitted to terminals having high processing capabilities, such as television sets and personal computers, to reproduce moving images having a high spatial-temporal resolution or a high quality.

When layered images as in the example illustrated in FIG. 49 are to be encoded and decoded, an image of each layer is encoded and decoded. The method described above in each of the foregoing embodiments may be applied to the encoding and decoding of each layer. This can suppress a reduction in the image quality of the individual layers.

Furthermore, flags and parameters used in the method described above in each of the foregoing embodiments may be shared in the encoding and decoding of each layer. This can suppress a reduction in coding efficiency.

More specifically, for example, information concerning a scaling list (for example, parameters, flags, and so forth) may be shared in the encoding and decoding of each layer.

Needless to say, any other necessary information may be shared in the encoding and decoding of each layer.

Examples of the layered images include images layered in spatial resolution (also referred to as spatial resolution scalability) (spatial scalability). In layered images with spatial resolution scalability, the resolutions of the images differ from layer to layer. For example, a layer of an image having the spatially lowest resolution is designated as a base layer, and a layer of an image having a higher resolution than the base layer is designated as a non-base layer (an enhancement layer).

Image data of a non-base layer (an enhancement layer) may be data independent of the other layers, and, similarly to the base layers, an image having a resolution equivalent to that of that layer may be obtained only using the image data. Generally, however, image data of a non-base layer (an enhancement layer) is data corresponding to a difference image between the image of that layer and an image of another layer (for example, a layer one layer below that layer). In this case, an image having a resolution equivalent to that of a base layer is obtained only using the image data of the base layer whereas an image having a resolution equivalent to that of a non-base layer (an enhancement layer) is obtained by the combination of the image data of that layer and the image data of another layer (for example, a layer one layer below that layer). This can suppress redundancy of image data between layers.

In layered images having the spatial resolution scalability described above, the resolutions of the images differ from layer to layer. Thus, the resolutions of the units of processing by which the individual layers are encoded and decoded also differ. Accordingly, if a scaling list (quantization matrix) is shared in the encoding and decoding of the individual layers, the scaling list (quantization matrix) may be up-converted in accordance with the resolution ratios of the individual layers.

For example, it is assumed that an image of a base layer has a resolution of 2K (for example, 1920×1080), and an image of a non-base layer (an enhancement layer) has a resolution of 4K (for example, 3840×2160). In this case, for example, the 16×16 size of the image of the base layer (2K image) corresponds to the 32×32 size of the image of the non-base layer (4K image). The scaling list (quantization matrix) is up-converted as appropriate in accordance with the resolution ratio.

For example, a 4×4 quantization matrix used for the quantization and dequantization of a base layer is up-converted to 8×8 in the quantization and dequantization of a non-base layer and is used. Similarly, an 8×8 scaling list of a base layer is up-converted to 16×16 in a non-base layer. Similarly, a quantization matrix up-converted to 16×16 in a base layer and used is up-converted to 32×32 in a non-base layer.

Note that the parameter for which scalability is provided is not limited to spatial resolution, and examples of the parameter may include temporal resolution (temporal scalability). In layered images having temporal resolution scalability, the frame rates of images differ from layer to layer. Other examples include bit-depth scalability in which the bit-depth of image data differs from layer to layer, and chroma scalability in which the format of components differs from layer to layer.

Still other examples include SNR scalability in which the signal to noise ratios (SNRs) of the images differ from layer to layer.

In view of improvement in image quality, desirably, the lower the signal-to-noise ratio an image has, the smaller the quantization error is made. To that end, in SNR scalability, desirably, different scaling lists (non-common scaling lists) are used for the quantization and dequantization of the individual layers in accordance with the signal-to-noise ratio. For this reason, as described above, if a scaling list is shared among layers, an offset value for adjusting matrix elements for an enhancement layer with regard to matrix elements in a scaling list for a base layer may be transmitted. More specifically, information indicating the difference between a common scaling list and an actually used scaling list may be transmitted on a layer-by-layer basis. For example, the information indicating the difference may be transmitted in a sequence parameter set (SPS) or picture parameter set (PPS) for each layer. The information indicating the difference is arbitrary. For example, the information may be a matrix having elements representing difference values between corresponding elements in both scaling lists, or may be a function indicating the difference.

<Layered Image Encoding Device>

Figure 50:
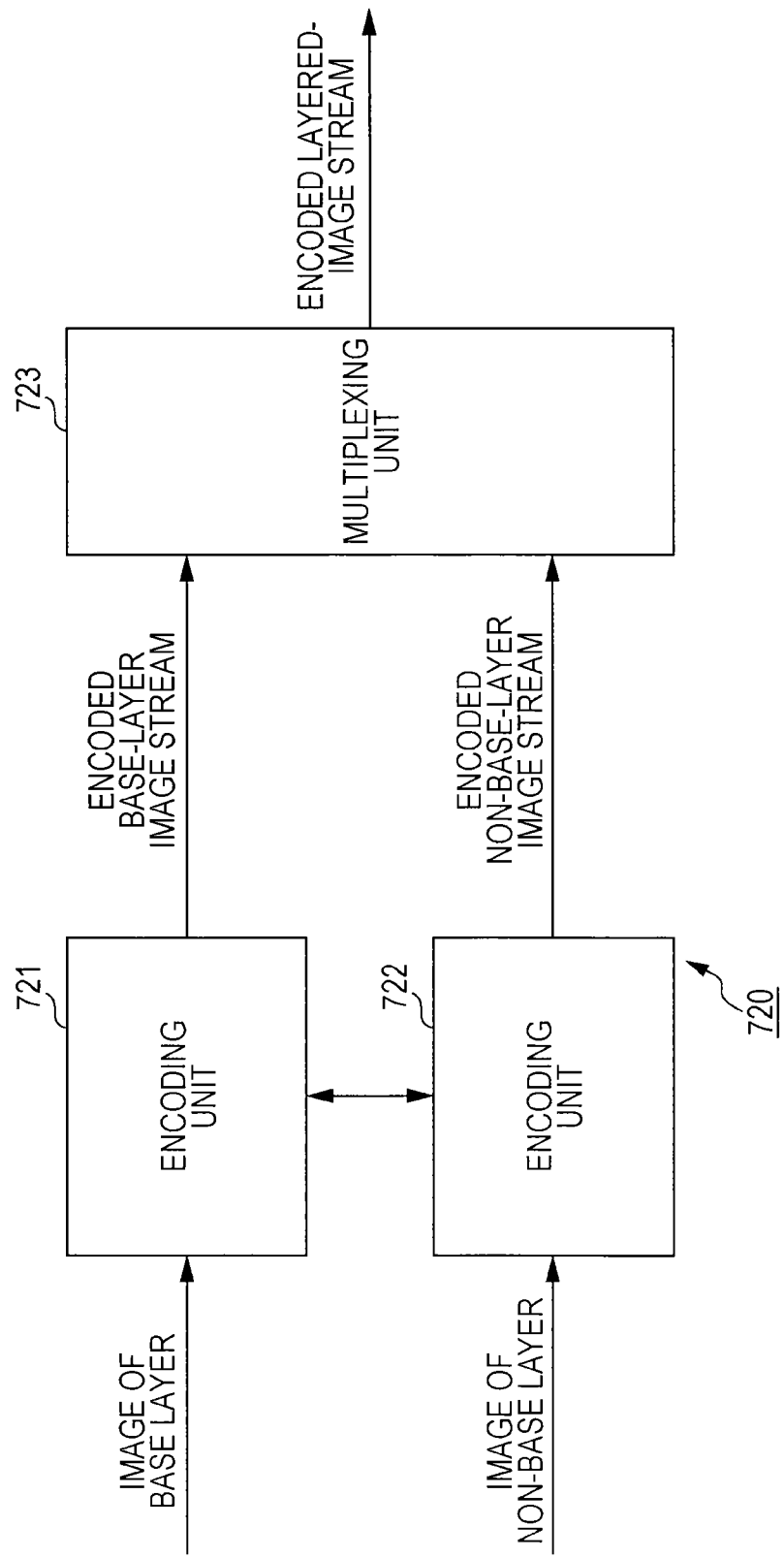
FIG. 50 is a diagram illustrating an example of a main configuration of a layered image encoding device to which the present technology is applied.

FIG. 50 is a diagram illustrating a layered image encoding device for performing the layered image encoding operation described above. As illustrated in FIG. 50, a layered image encoding device 720 includes an encoding unit 721, an encoding unit 722, and a multiplexing unit 723.

The encoding unit 721 encodes an image of a base layer, and generates an encoded base-layer image stream. The encoding unit 722 encodes an image of a non-base layer, and generates an encoded non-base-layer image stream. The multiplexing unit 723 multiplexes the encoded base-layer image stream generated by the encoding unit 721 and the encoded non-base-layer image stream generated by the encoding unit 722, and generates an encoded layered-image stream.

The image encoding device 10 (FIG. 14) can be used for each of the encoding unit 721 and the encoding unit 722 of the layered image encoding device 720. That is, an increase in the amount of coding of a scaling list in the encoding of each layer can be suppressed, and a reduction in the image quality of each layer can be suppressed. In addition, the encoding unit 721 and the encoding unit 722 can perform processes such as quantization and dequantization using the same flags or parameters (that is, flags and parameters can be shared). Accordingly, a reduction in coding efficiency can be suppressed.

<Layered Image Decoding Device>

Figure 51:
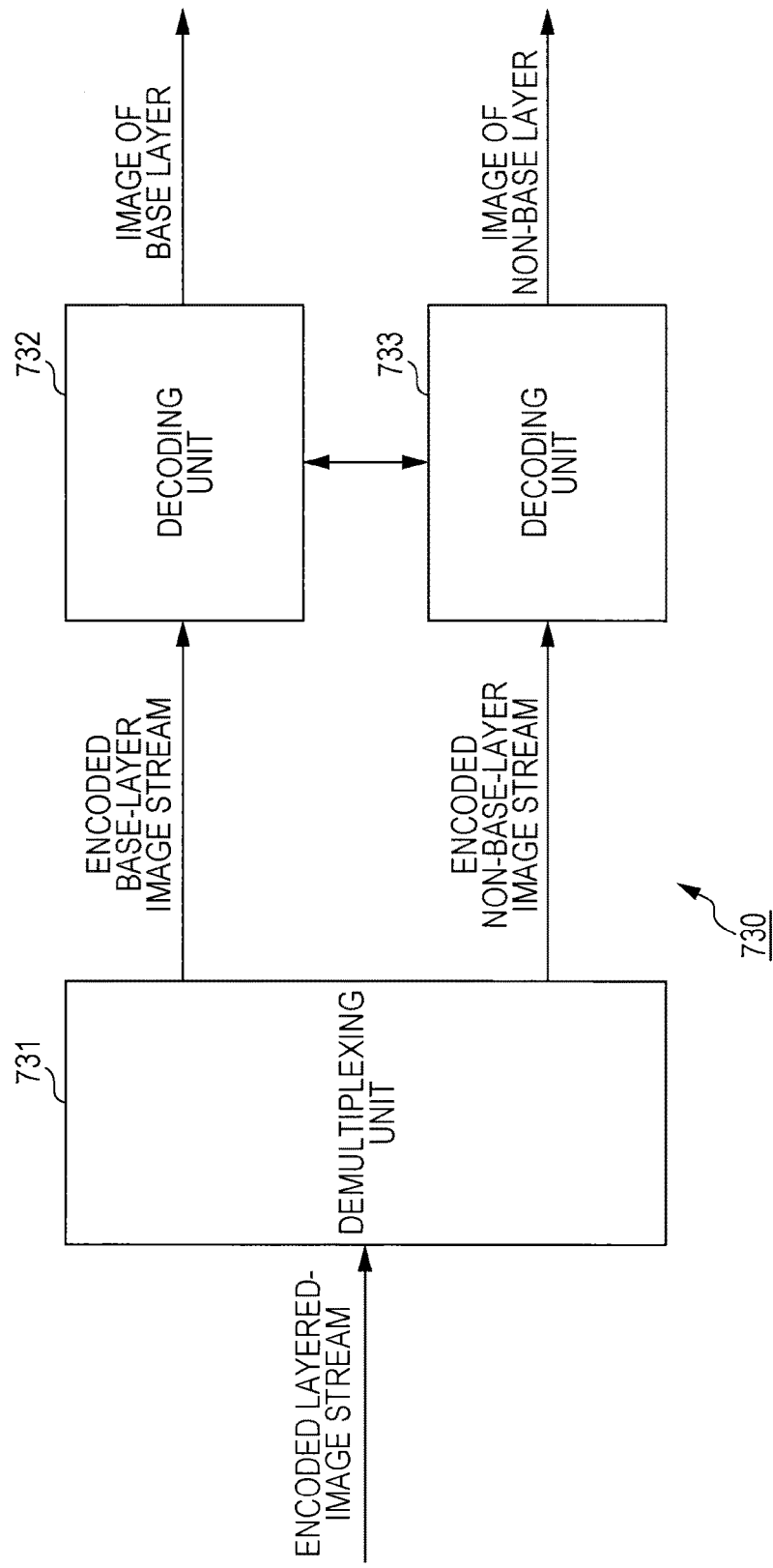
FIG. 51 is a diagram illustrating an example of a main configuration of a layered image decoding device to which the present technology is applied.

FIG. 51 is a diagram illustrating a layered image decoding device for performing the layered image decoding operation described above. As illustrated in FIG. 51, a layered image decoding device 730 includes a demultiplexing unit 731, a decoding unit 732, and a decoding unit 733.

The demultiplexing unit 731 demultiplexes an encoded layered-image stream in which an encoded base-layer image stream and an encoded non-base-layer image stream have been multiplexed, and extracts the encoded base-layer image stream and the encoded non-base-layer image stream. The decoding unit 732 decodes the encoded base-layer image stream extracted by the demultiplexing unit 731, and obtains an image of a base layer. The decoding unit 733 decodes the encoded non-base-layer image stream extracted by the demultiplexing unit 731, and obtains an image of a non-base layer.

The image decoding device 300 (FIG. 22) can be used for each of the decoding unit 732 and the decoding unit 733 of the layered image decoding device 730. That is, an increase in the amount of coding of a scaling list in the decoding of each layer can be suppressed, and a reduction in the image quality of each layer can be suppressed. In addition, the decoding unit 712 and the decoding unit 713 can perform processes such as quantization and dequantization using the same flags or parameters (that is, flags and parameters can be shared). Thus, a reduction in coding efficiency can be suppressed.

<9. Ninth Embodiment>
<Computer>

The series of processes described above can be executed by hardware or can also be executed by software. In this case, the series of processes may be implemented as, for example, a computer illustrated in FIG. 52.

Figure 52:
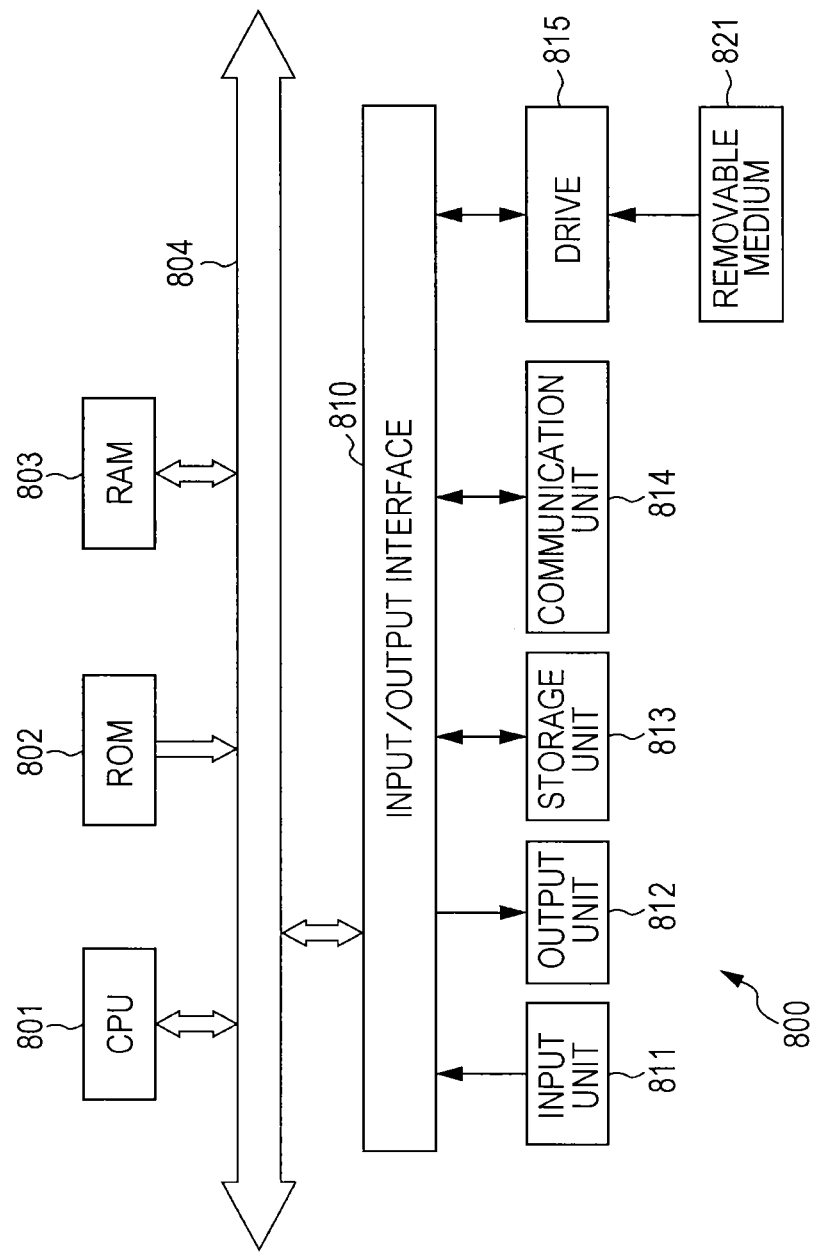
FIG. 52 is a block diagram illustrating an example of a main configuration of a computer.

In FIG. 52, a CPU (Central Processing Unit) 801 in a computer 800 executes various processing operations in accordance with a program stored in a ROM (Read Only Memory) 802 or a program loaded into a RAM (Random Access Memory) 803 from a storage unit 813. The RAM 803 also stores, as desired, data and the like necessary for the CPU 801 to execute various processing operations.

The CPU 801, the ROM 802, and the RAM 803 are connected to one another via a bus 804. An input/output interface 810 is also connected to the bus 804.

The input/output interface 810 is connected to an input unit 811, an output unit 812, the storage unit 813, and a communication unit 814. The input unit 811 includes a keyboard, a mouse, a touch panel, an input terminal, and so forth. The output unit 812 includes desired output devices, such as a speaker and a display including a CRT (Cathode Ray Tube), an LCD (Liquid Crystal Display), and an GELD (Organic ElectroLuminescence Display), an output terminal, and so forth. The storage unit 813 includes a desired storage medium such as a hard disk or a flash memory, and a control unit that controls the input and output of the storage medium. The communication unit 814 includes desired wired or wireless communication devices such as a modem, a LAN interface, a USB (Universal Serial Bus) device, and a Bluetooth (registered trademark) device. The communication unit 814 performs communication processing with other communication devices via networks including, for example, the Internet.

A drive 815 is further connected to the input/output interface 810, if necessary. A removable medium 821 such as a magnetic disk, an optical disk, a magneto-optical disk, or a semiconductor memory is placed in the drive 815, as desired. The drive 815 reads a computer program, data, and the like from the removable medium 821 placed therein in accordance with the control of, for example, the CPU 801. The read data and computer program are supplied to, for example, the RAM 803. The computer program read from the removable medium 821 is further installed into the storage unit 813, if necessary.

When the series of processes described above is executed by software, a program constituting the software is installed from a network or a recording medium.

Examples of the recording medium include, as illustrated in FIG. 52, the removable medium 821, which is distributed separately from the device body to deliver the program to a user, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory on which the program is recorded. Other examples of the recording medium include devices distributed to a user in a manner of being incorporated in advance in the device body, such as the ROM 802 and the hard disk included in the storage unit 813 on which the program is recorded.

Note that the program which the computer 800 executes may be a program in which processing operations are performed in a time-series manner in the order stated herein, or may be a program in which processing operations are performed in parallel or at necessary timings such as when called.

In addition, steps describing a program stored in a recording medium, as used herein, include, of course, processing operations performed in a time-series manner in the order stated, and processing operations executed in parallel or individually but not necessarily performed in a time-series manner.

Furthermore, the term "system", as used herein, refers to a set of constituent elements (devices, modules (components), etc.) regardless of whether all the constituent elements are accommodated in the same housing or not. Thus, a plurality of devices accommodated in separate housings and connected via a network, and a single device including a plurality of modules accommodated in a single housing are defined as a system.

In addition, a configuration described above as a single device (or processing units) may be divided into a plurality of devices (or processing units). Conversely, configurations described above as a plurality of devices (or processing units) may be combined into a single device (or processing unit). Additionally, of course, a configuration other than that described above may be added to the configuration of each device (or each processing unit). Furthermore, part of the configuration of a certain device (or processing unit) may be included in the configuration of another device (or another processing unit) if the devices (or processing units) have substantially the same configuration and/or operation in terms of an entire system. In other words, embodiments of the present technology are not limited to the foregoing embodiments, and a variety of modifications can be made without departing from the scope of the present technology.

While preferred embodiments of the present disclosure have been described in detail with reference to the accompanying drawings, the technical scope of the present disclosure is not limited to the examples disclosed herein. It is apparent that a person having ordinary knowledge in the technical field of the present disclosure could achieve various changes or modifications without departing from the scope of the technical concept as defined in the claims, and it is to be understood that such changes or modifications also fall within the technical scope of the present disclosure as a matter of course.

For example, the present technology may be implemented with a cloud computing configuration in which a plurality of devices share and cooperate to process a single function via a network.

In addition, each of the steps illustrated in the flowcharts described above may be executed by a single device or by a plurality of devices in a shared manner.

Furthermore, if a single step includes a plurality of processes, the plurality of processes included in the single step may be executed by a single device or by a plurality of devices in a shared manner.

The image encoding device 10 (FIG. 14) and the image decoding device 300 (FIG. 22) according to the foregoing embodiments may be applied to various pieces of electronic equipment such as a transmitter or a receiver used to deliver data via satellite broadcasting, wired broadcasting such as cable TV, or the Internet or used to deliver data to or from terminals via cellular communication, a recording apparatus that records images on media such as an optical disk, a magnetic disk, and a flash memory, and a reproducing apparatus that reproduces images from such storage media. Four example applications will be described hereinafter.

<10. Example Applications>

<First Example Application:Television Receiver>

Figure 53:
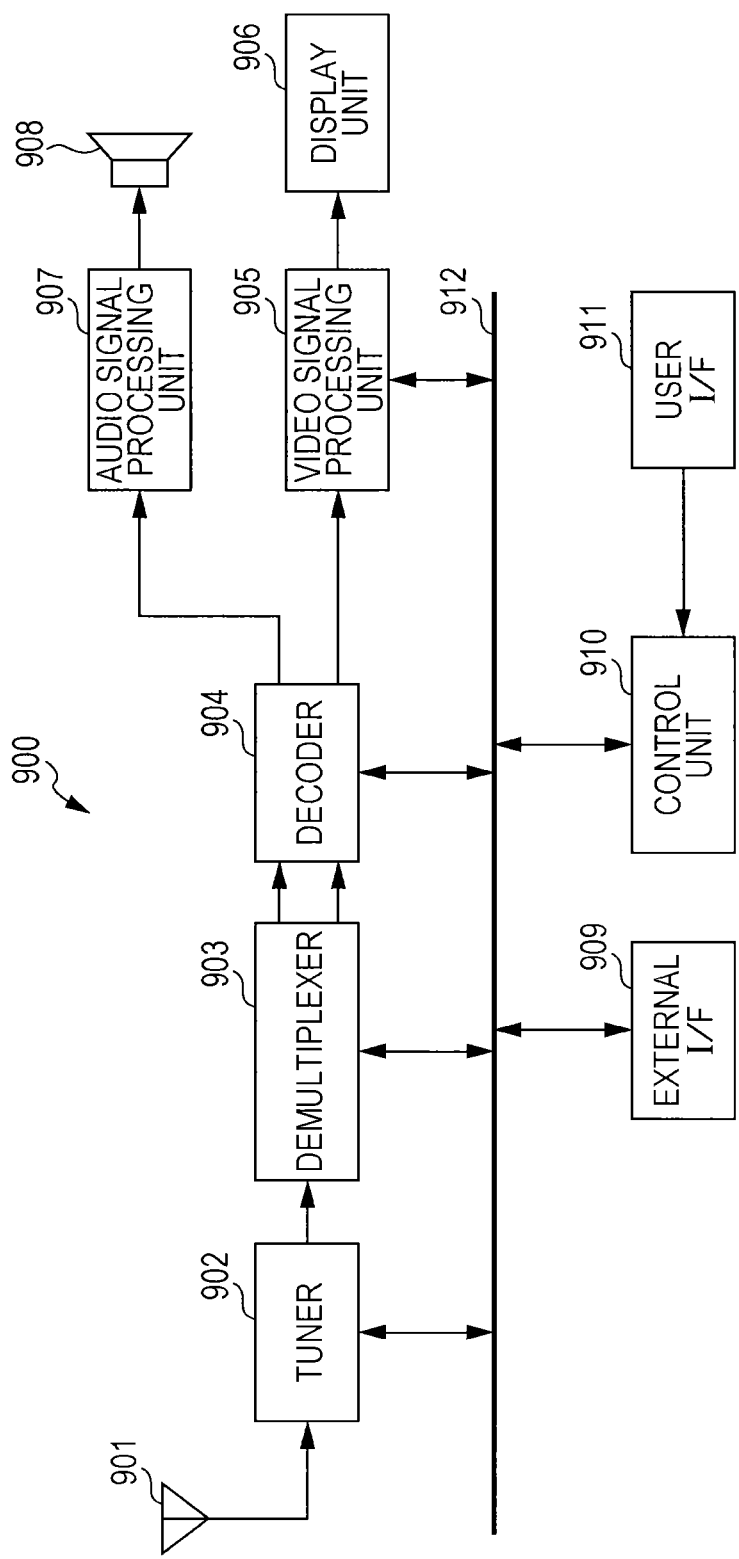
FIG. 53 is a block diagram illustrating an example of a main configuration of a television apparatus.

FIG. 53 illustrates an example of a schematic configuration of a television apparatus to which the foregoing embodiments are applied. A television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal in a desired channel from a broadcast signal received via the antenna 901, and demodulates the extracted signal. Then, the tuner 902 outputs an encoded bit stream obtained by demodulation to the demultiplexer 903. In other words, the tuner 902 functions as a transmission unit in the television apparatus 900 for receiving an encoded stream including encoded images.

The demultiplexer 903 demultiplexes the encoded bit stream into a video stream and an audio stream of a program to be viewed, and outputs the demultiplexed streams to the decoder 904. The demultiplexer 903 further extracts auxiliary data such as EPG (Electronic Program Guide) from the encoded bit stream, and supplies the extracted data to the control unit 910. Note that the demultiplexer 903 may also descramble the encoded bit stream if the encoded bit stream has been scrambled.

The decoder 904 decodes the video stream and audio stream input from the demultiplexer 903. Then, the decoder 904 outputs video data generated through the decoding process to the video signal processing unit 905. The decoder 904 further outputs audio data generated through the decoding process to the audio signal processing unit 907.

The video signal processing unit 905 reproduces the video data input from the decoder 904, and causes video to be displayed on the display unit 906. The video signal processing unit 905 may also cause an application screen supplied via a network to be displayed on the display unit 906. The video signal processing unit 905 may further perform additional processing, such as noise removal, on the video data in accordance with the settings. In addition, the video signal processing unit 905 may also generate a GUI (Graphical User Interface) image such as a menu, a button, or a cursor, and superimpose the generated image on an output image.

The display unit 906 is driven by a drive signal supplied from the video signal processing unit 905, and displays video or an image on a video surface of a display device (such as a liquid crystal display, a plasma display, or an OELD (Organic ElectroLuminescence Display) (organic EL display)).

The audio signal processing unit 907 performs reproduction processes, such as D/A conversion and amplification, on the audio data input from the decoder 904, and causes audio to be output from the speaker 908. The audio signal processing unit 907 may further perform additional processing, such as noise removal, on the audio data.

The external interface 909 is an interface for connecting the television apparatus 900 to an external device or a network. For example, a video stream or audio stream received via the external interface 909 may be decoded by the decoder 904. In other words, the external interface 909 also functions as a transmission unit in the television apparatus 900 for receiving an encoded stream including encoded images.

The control unit 910 includes a processor such as a CPU, and memories such as a RAM and a ROM. The memories store a program to be executed by the CPU, program data, EPG data, data acquired via a network, and so forth. The program stored in the memories is read and executed by the CPU when, for example, the television apparatus 900 is started. The CPU executes the program to control the operation of the television apparatus 900 in accordance with, for example, an operation signal input from the user interface 911.

The user interface 911 is connected to the control unit 910. The user interface 911 includes, for example, buttons and switches for allowing the user to operate the television apparatus 900, a receiving unit for a remote control signal, and so forth. The user interface 911 detects an operation of the user via the above-described components to generate an operation signal, and outputs the generated operation signal to the control unit 910.

The bus 912 serves to connect the tuner 902, the demultiplexer 903, the decoder 904, the video signal processing unit 905, the audio signal processing unit 907, the external interface 909, and the control unit 910 to one another.

In the television apparatus 900 having the configuration described above, the decoder 904 has the function of the image decoding device 300 (FIG. 22) according to the foregoing embodiments. Accordingly, the television apparatus 900 can suppress an increase in the amount of coding of a scaling list.

<Second Example Application: Mobile Phone>

Figure 54:
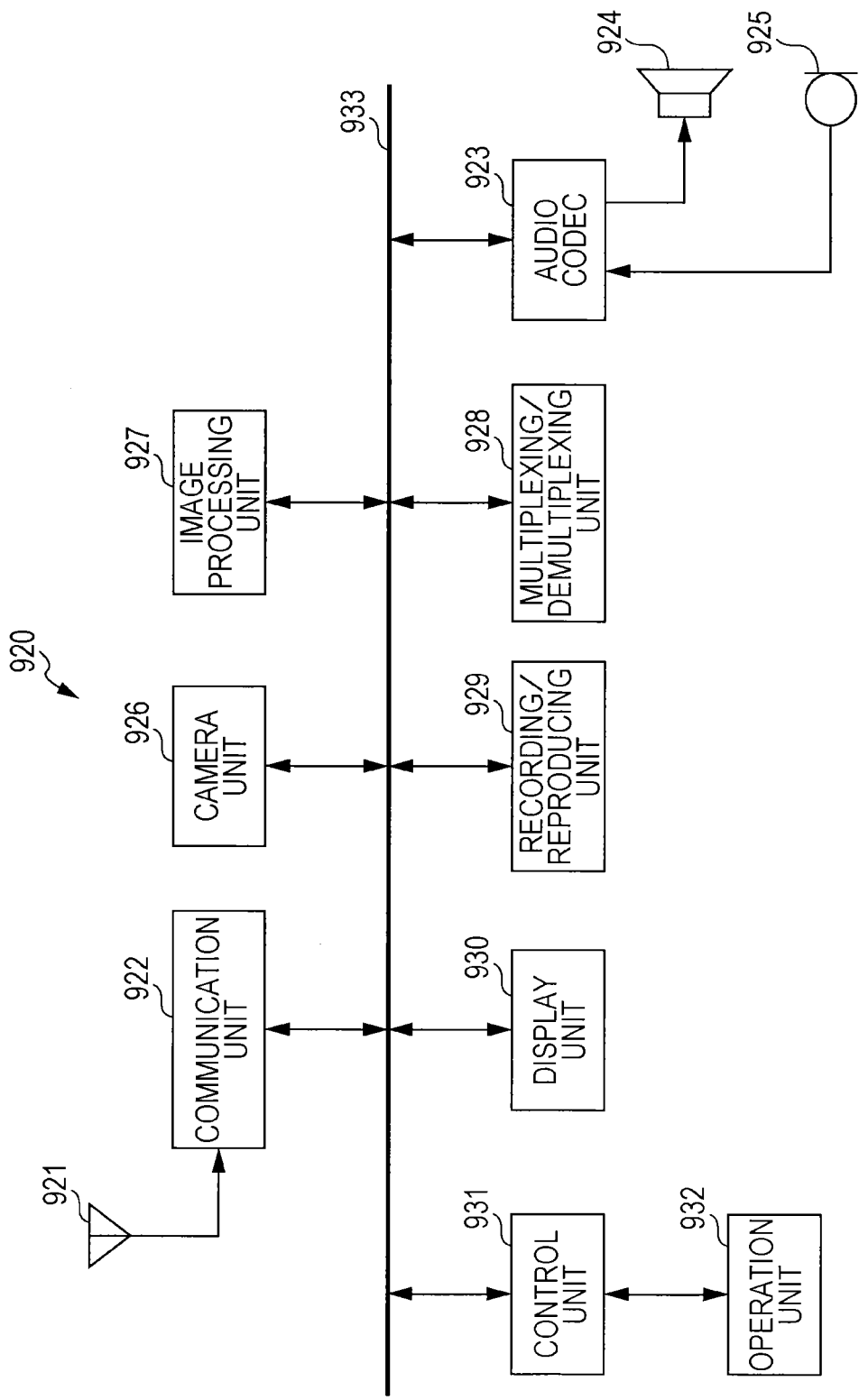
FIG. 54 is a block diagram illustrating an example of a main configuration of a mobile terminal device.

FIG. 54 illustrates an example of a schematic configuration of a mobile phone to which the foregoing embodiments are applied. A mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 serves to connect the communication unit 922, the audio codec 923, the camera unit 926, the image processing unit 927, the multiplexing/demultiplexing unit 928, the recording/reproducing unit 929, the display unit 930, and the control unit 931 to one another.

The mobile phone 920 performs operations, such as transmitting and receiving an audio signal, transmitting and receiving an electronic mail or image data, capturing an image, and recording data, in various operation modes including a voice call mode, a data communication mode, an image capture mode, and a videophone mode.

In the voice call mode, an analog audio signal generated by the microphone 925 is supplied to the audio codec 923. The audio codec 923 converts the analog audio signal into audio data, and performs A/D conversion and compression on the converted audio data. The audio codec 923 then outputs the compressed audio data to the communication unit 922. The communication unit 922 encodes and modulates the audio data, and generates a transmission signal. The communication unit 922 then transmits the generated transmission signal to a base station (not illustrated) via the antenna 921. Further, the communication unit 922 amplifies a radio signal received via the antenna 921, and performs frequency conversion on the amplified signal to acquire a reception signal. Then, the communication unit 922 demodulates and decodes the reception signal to generate audio data, and outputs the generated audio data to the audio codec 923. The audio codec 923 expands the audio data, and performs D/A conversion to generate an analog audio signal. The audio codec 923 then supplies the generated audio signal to the speaker 924 to cause audio to be output.

Furthermore, in the data communication mode, for example, the control unit 931 generates text data that forms an electronic mail in accordance with an operation of the user via the operation unit 932. Furthermore, the control unit 931 causes text to be displayed on the display unit 930. The control unit 931 further generates electronic mail data in accordance with a transmission instruction given from the user via the operation unit 932, and outputs the generated electronic mail data to the communication unit 922. The communication unit 922 encodes and modulates the electronic mail data to generate a transmission signal. Then, the communication unit 922 transmits the generated transmission signal to the base station (not illustrated) via the antenna 921. Further, the communication unit 922 amplifies a radio signal received via the antenna 921, and performs frequency conversion on the amplified signal to acquire a reception signal. Then, the communication unit 922 demodulates and decodes the reception signal to restore electronic mail data, and outputs the restored electronic mail data to the control unit 931. The control unit 931 causes the content of the electronic mail to be displayed on the display unit 930, and also causes the electronic mail data to be stored in a storage medium of the recording/reproducing unit 929.

The recording/reproducing unit 929 includes a desired readable/writable storage medium. The storage medium may be, for example, a built-in storage medium such as a RAM or a flash memory, or an external storage medium such as a hard disk, a magnetic disk, a magneto-optical disk, an optical disk, a USB memory, or a memory card.

Furthermore, in the image capture mode, for example, the camera unit 926 captures an image of an object to generate image data, and outputs the generated image data to the image processing unit 927. The image processing unit 927 encodes the image data input from the camera unit 926, and causes an encoded stream to be stored in the storage medium of the recording/reproducing unit 929.

Furthermore, in the videophone mode, for example, the multiplexing/demultiplexing unit 928 multiplexes the video stream encoded by the image processing unit 927 and the audio stream input from the audio codec 923, and outputs a multiplexed stream to the communication unit 922. The communication unit 922 encodes and modulates the stream to generate a transmission signal. Then, the communication unit 922 transmits the generated transmission signal to the base station (not illustrated) via the antenna 921. The communication unit 922 further amplifies a radio signal received via the antenna 921, and performs frequency conversion on the amplified signal to acquire a reception signal. The transmission signal and the reception signal may include an encoded bit stream. The communication unit 922 demodulates and decodes the reception signal to restore a stream, and outputs the restored stream to the multiplexing/demultiplexing unit 928. Then, the multiplexing/demultiplexing unit 928 demultiplexes the input stream into a video stream and an audio stream, and outputs the video stream and the audio stream to the image processing unit 927 and the audio codec 923, respectively. The image processing unit 927 decodes the video stream to generate video data. The video data is supplied to the display unit 930, and a series of images is displayed by the display unit 930. The audio codec 923 expands the audio stream, and performs D/A conversion to generate an analog audio signal. The audio codec 923 then supplies the generated audio signal to the speaker 924 to cause audio to be output.

In the mobile phone 920 having the configuration described above, the image processing unit 927 has the function of the image encoding device 10 (FIG. 14) and the function of the image decoding device 300 (FIG. 22) according to the foregoing embodiments. Accordingly, the mobile phone 920 can suppress an increase in the amount of coding of a scaling list.

In addition, while a description has been given of the mobile phone 920, for example, an image encoding device and an image decoding device to which the present technology is applied may be used in, similarly to the mobile phone 920, any apparatus having an imaging function and a communication function similar to those of the mobile phone 920, such as a PDA (Personal Digital Assistants), a smartphone, a UMPC (Ultra Mobile Personal Computer), a netbook, or a notebook personal computer.

<Third Example Application: Recording/Reproducing Apparatus>

Figure 55:
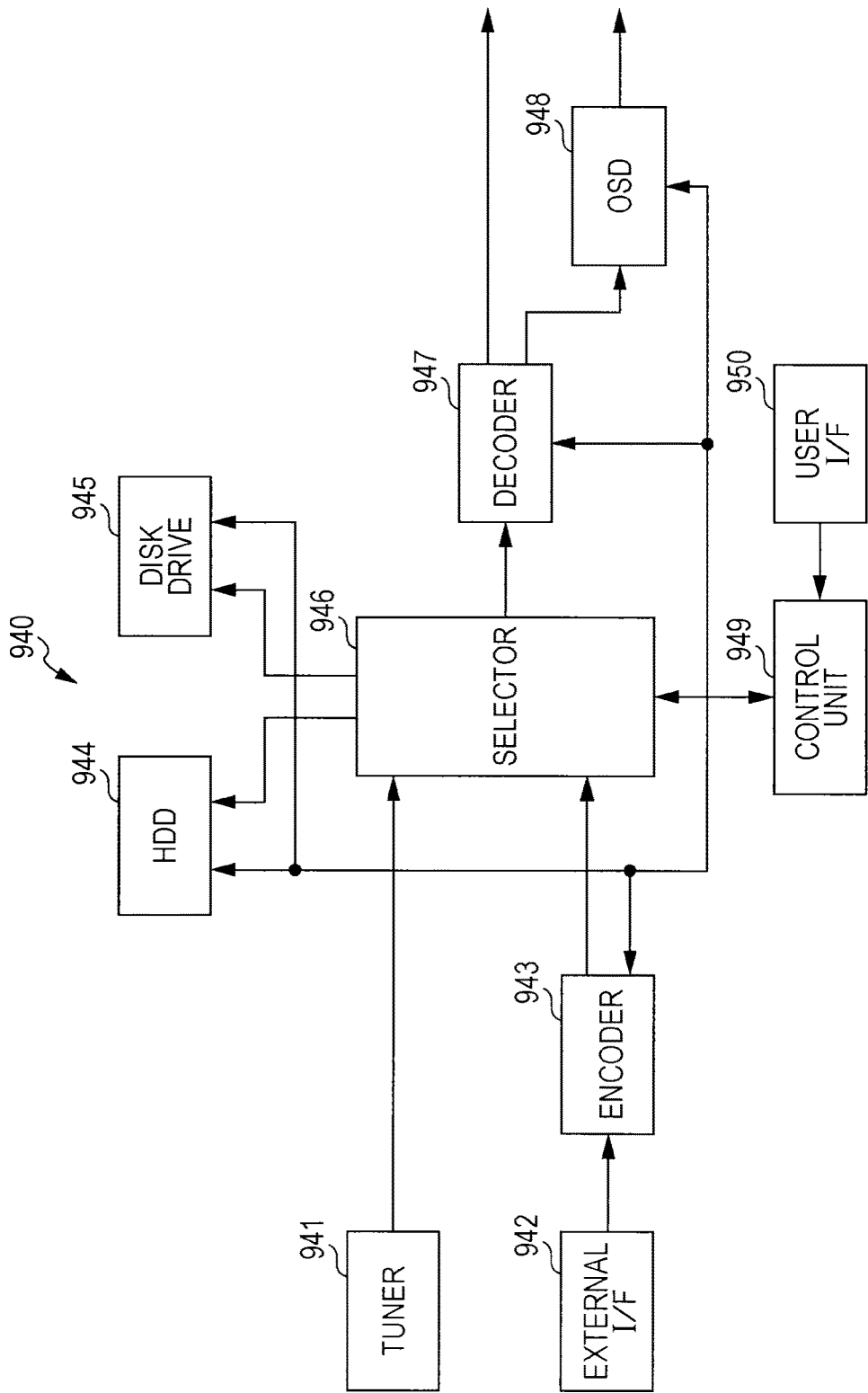
FIG. 55 is a block diagram illustrating an example of a main configuration of a recording/reproducing apparatus.

FIG. 55 illustrates an example of a schematic configuration of a recording/reproducing apparatus to which the foregoing embodiments are applied. A recording/reproducing apparatus 940 encodes, for example, audio data and video data of a received broadcast program, and records the encoded audio data and video data on a recording medium. Furthermore, the recording/reproducing apparatus 940 may also encode audio data and video data acquired from, for example, another apparatus, and record the encoded audio data and video data on a recording medium. Moreover, the recording/reproducing apparatus 940 reproduces, for example, data recorded on a recording medium using a monitor and a speaker in accordance with an instruction given from a user. In this case, the recording/reproducing apparatus 940 decodes audio data and video data.

The recording/reproducing apparatus 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal in a desired channel from a broadcast signal received via an antenna (not illustrated), and demodulates the extracted signal. The tuner 941 then outputs an encoded bit stream obtained by demodulation to the selector 946. In other words, the tuner 941 functions as a transmission unit in the recording/reproducing apparatus 940.

The external interface 942 is an interface for connecting the recording/reproducing apparatus 940 to an external device or a network. The external interface 942 may be, for example, an IEEE 1394 interface, a network interface, a USB interface, a flash memory interface, or the like. For example, video data and audio data received via the external interface 942 are input to the encoder 943. In other words, the external interface 942 functions as a transmission unit in the recording/reproducing apparatus 940.

The encoder 943 encodes video data and audio data input from the external interface 942 if the video data and audio data have not been encoded. The encoder 943 then outputs an encoded bit stream to the selector 946.

The HDD 944 records an encoded bit stream including compressed content data such as video and audio, various programs, and other data on an internal hard disk. Furthermore, the HDD 944 reads the above-described data from the hard disk when reproducing video and audio.

The disk drive 945 records and reads data on and from a recording medium placed therein. The recording medium placed in the disk drive 945 may be, for example, a DVD disk (such as DVD-Video, DVD-RAM, DVD-R, DVD-RW, DVD+R, or DVD+RW) or a Blu-ray (registered trademark) disc.

The selector 946 selects an encoded bit stream input from the tuner 941 or the encoder 943 when recording video and audio, and outputs the selected encoded bit stream to the HDD 944 or the disk drive 945. When reproducing video and audio, the selector 946 outputs an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 904 further outputs the generated audio data to an external speaker.

The OSD 948 reproduces the video data input from the decoder 947, and displays video. In addition, the OSD 948 may also superimpose a GUI image such as a menu, a button, or a cursor on the video to be displayed.

The control unit 949 includes a processor such as a CPU, and memories such as a RAM and a ROM. The memories store a program to be executed by the CPU, program data, and so forth. The program stored in the memories is read and executed by the CPU when, for example, the recording/reproducing apparatus 940 is started. The CPU executes the program to control the operation of the recording/reproducing apparatus 940 in accordance with, for example, an operation signal input from the user interface 950.

The user interface 950 is connected to the control unit 949. The user interface 950 includes, for example, buttons and switches for allowing the user to operate the recording/reproducing apparatus 940, a receiving unit for a remote control signal, and so forth. The user interface 950 detects an operation of the user via the above-described components to generate an operation signal, and outputs the generated operation signal to the control unit 949.

In the recording/reproducing apparatus 940 having the configuration described above, the encoder 943 has the function of the image encoding device 10 (FIG. 14) according to the foregoing embodiments. Furthermore, the decoder 947 has the function of the image decoding device 300 (FIG. 22) according to the foregoing embodiments. Accordingly, the recording/reproducing apparatus 940 can suppress an increase in the amount of coding of a scaling list.

<Fourth Example Application: Imaging Apparatus>

Figure 56:
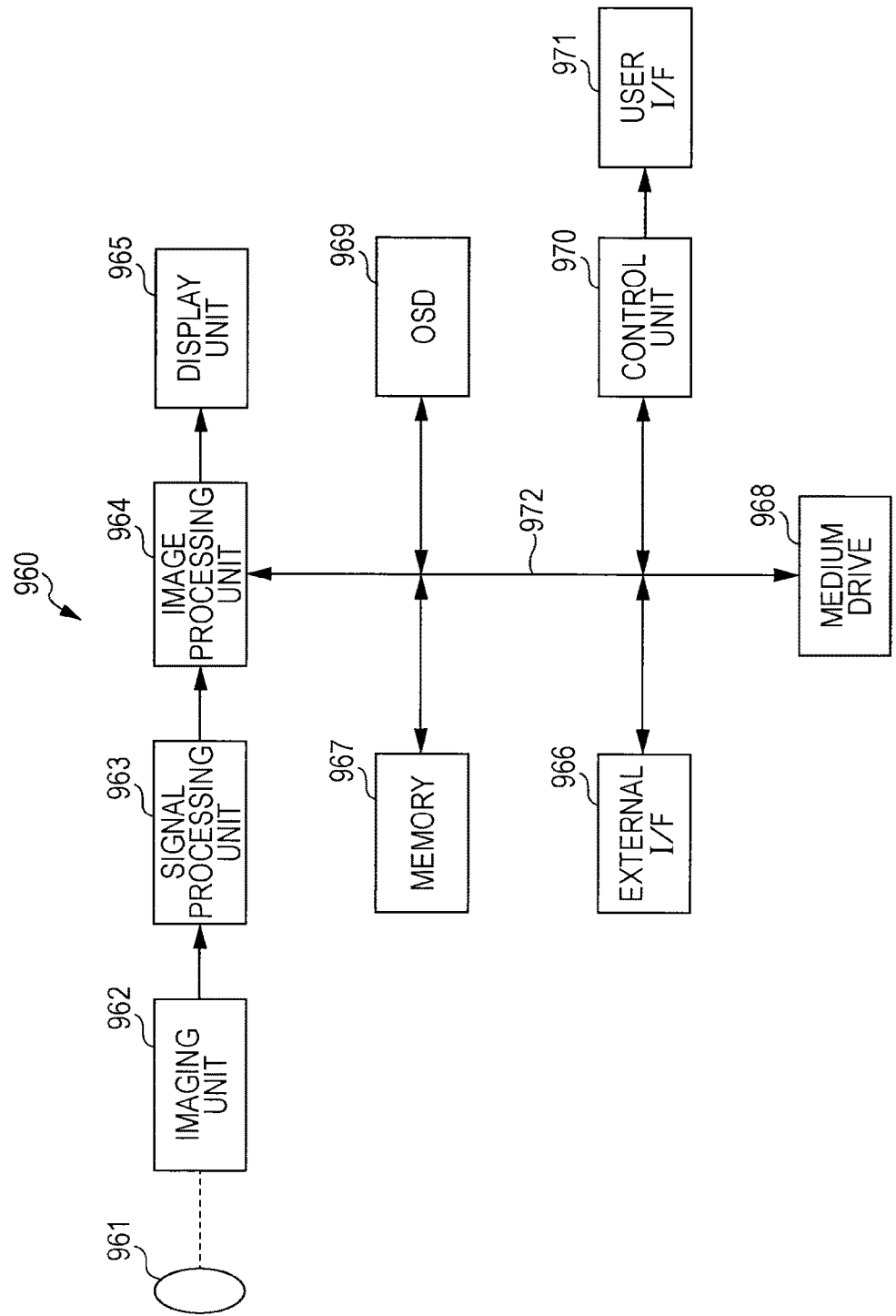
FIG. 56 is a block diagram illustrating an example of a main configuration of an imaging apparatus.

FIG. 56 illustrates an example of a schematic configuration of an imaging apparatus to which the foregoing embodiments are applied. An imaging apparatus 960 captures an image of an object to generate image data, encodes the image data, and records the encoded image data on a recording medium.

The imaging apparatus 960 includes an optical block 961, an imaging unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 serves to connect the image processing unit 964, the external interface 966, the memory 967, the medium drive 968, the OSD 969, and the control unit 970 to one another.

The optical block 961 includes a focus lens, an aperture mechanism, and so forth. The optical block 961 forms an optical image of the object on an imaging surface of the imaging unit 962. The imaging unit 962 includes an image sensor such as a CCD or CMOS image sensor, and converts the optical image formed on the imaging surface into an image signal serving as an electrical signal by performing photoelectric conversion. The imaging unit 962 then outputs the image signal to the signal processing unit 963.

The signal processing unit 963 performs various camera signal processing operations, such as knee correction, gamma correction, and color correction, on the image signal input from the imaging unit 962. The signal processing unit 963 outputs the image data subjected to camera signal processing operations to the image processing unit 964.

The image processing unit 964 encodes the image data input from the signal processing unit 963 to generate encoded data. The image processing unit 964 then outputs the generated encoded data to the external interface 966 or the medium drive 968. Further, the image processing unit 964 decodes the encoded data input from the external interface 966 or the medium drive 968 to generate image data. The image processing unit 964 then outputs the generated image data to the display unit 965. Furthermore, the image processing unit 964 may also output the image data input from the signal processing unit 963 to the display unit 965 to cause an image to be displayed. Moreover, the image processing unit 964 may also superimpose display data acquired from the OSD 969 on the image to be output to the display unit 965.

The OSD 969 generates a GUI image such as a menu, a button, or a cursor, and outputs the generated image to the image processing unit 964.

The external interface 966 is formed as, for example, a USB input/output terminal. The external interface 966 connects, for example, the imaging apparatus 960 to a printer when printing an image. A drive is further connected to the external interface 966, if necessary. A removable medium such as a magnetic disk or an optical disk is placed in the drive, and a program read from the removable medium may be installed into the imaging apparatus 960. In addition, the external interface 966 may also be formed as a network interface to be connected to a network such as a LAN or the Internet. In other words, the external interface 966 functions as a transmission unit in the imaging apparatus 960.

The recording medium to be placed in the medium drive 968 may be, for example, any readable/writable removable medium such as a magnetic disk, a magneto-optical disk, an optical disk, or a semiconductor memory. Alternatively, a recording medium may be fixedly attached to the medium drive 968, and may form a built-in hard disk drive or a non-portable storage unit such as an SSD (Solid State Drive).

The control unit 970 includes a processor such as a CPU, and memories such as a RAM and a ROM. The memories store a program to be executed by the CPU, program data, and so forth. The program stored in the memories is read and executed by the CPU when, for example, the imaging apparatus 960 is started. The CPU executes the program to control the operation of the imaging apparatus 960 in accordance with, for example, an operation signal input from the user interface 971.

The user interface 971 is connected to the control unit 970. The user interface 971 includes, for example, buttons, switches, and so forth for allowing the user to operate the imaging apparatus 960. The user interface 971 detects an operation of the user via the above-described components to generate an operation signal, and outputs the generated operation signal to the control unit 970.

In the imaging apparatus 960 having the configuration described above, the image processing unit 964 has the function of the image encoding device 10 (FIG. 14) and the function of the image decoding device 300 (FIG. 22) according to the foregoing embodiments. Thus, the imaging apparatus 960 can suppress an increase in the amount of coding of a scaling list.

<7. Example Applications of Scalable Coding>
<First System>

Next, a specific example of use of scalable coded data which has been encoded using scalable coding (layered (image) coding) will be described. Scalable coding may be used for, for example, the selection of data to be transmitted, as in an example illustrated in FIG. 57.

Figure 57:
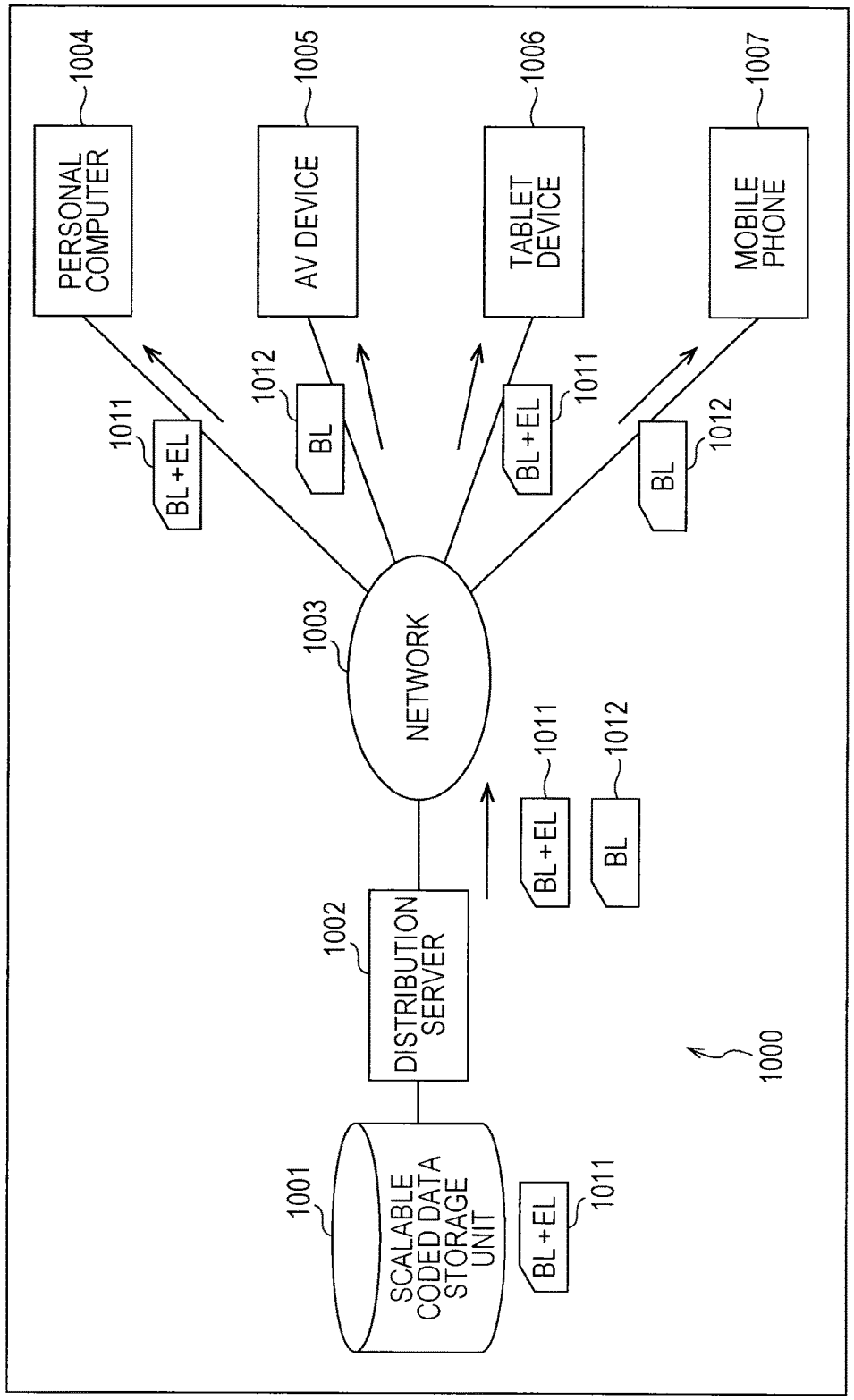
FIG. 57 is a block diagram illustrating an example of the use of scalable coding.

In a data transmission system 1000 illustrated in FIG. 57, a distribution server 1002 reads scalable coded data stored in a scalable coded data storage unit 1001, and distributes the scalable coded data to terminal devices, such as a personal computer 1004, an AV device 1005, a tablet device 1006, and a mobile phone 1007, via a network 1003.

In this case, the distribution server 1002 selects encoded data having desired quality in accordance with the performance of the terminal device, the communication environment, and the like, and transmits the selected encoded data. Even if the distribution server 1002 transmits data having quality higher than necessary, the terminal device may not always obtain a high-quality image, and delay or overflow may be caused. In addition, such data may occupy communication bandwidth more than necessary, or may increase the load on the terminal device more than necessary. Conversely, even if the distribution server 1002 transmits data having quality lower than necessary, the terminal device may not necessarily obtain an image with a sufficient quality. Thus, the distribution server 1002 reads the scalable coded data stored in the scalable coded data storage unit 1001, if necessary, as encoded data having quality appropriate for the performance of the terminal device, communication environment, and the like, and transmits the read encoded data.

For example, it is assumed that the scalable coded data storage unit 1001 stores scalable coded data (BL+EL) 1011 which has been scalably coded. The scalable coded data (BL+EL) 1011 is encoded data including a base layer and an enhancement layer, and is data which is decoded to obtain both an image of the base layer and an image of the enhancement layer.

The distribution server 1002 selects an appropriate layer in accordance with the performance of a terminal device that transmits data, the communication environment, and the like, and reads the data of the layer. For example, the distribution server 1002 reads high-quality scalable coded data (BL+EL) 1011 from the scalable coded data storage unit 1001, and transmits the read scalable coded data (BL+EL) 1011 to the personal computer 1004 or the tablet device 1006, which has high processing capabilities, as it is. In contrast, for example, the distribution server 1002 extracts the data of the base layer from the scalable coded data (BL+EL) 1011, and transmits the extracted data of the base layer to the AV device 1005 and the mobile phone 1007, which has low processing capabilities, as scalable coded data (BL) 1012 having the same content as the scalable coded data (BL+EL) 1011 but having lower quality than the scalable coded data (BL+EL) 1011.

The use of scalable coded data in this manner facilitates the adjustment of the amount of data, thereby suppressing the occurrence of delay or overflow and suppressing an unnecessary increase in the load on a terminal device or a communication medium. Furthermore, the scalable coded data (BL+EL) 1011 has reduced redundancy between layers, and therefore has a smaller amount of data than data having individually encoded data of the respective layers. Accordingly, the storage area of the scalable coded data storage unit 1001 can be more efficiently utilized.

Note that since various devices such as the personal computer 1004, the AV device 1005, the tablet device 1006, and the mobile phone 1007 can be used as terminal devices, the hardware performance of terminal devices differs from device to device. In addition, since various applications may be executed by terminal devices, the software capabilities of the applications may vary. Furthermore, the network 1003 serving as a communication medium may be implemented as any communication line network which can be wired, wireless, or both, such as the Internet and a LAN (Local Area Network), and have various data transmission capabilities. Such performance and capabilities may vary depending on other communication and the like.

Accordingly, prior to the start of transmission of data, the distribution server 1002 may communicate with a terminal device to which the data is to be transmitted, and may obtain information concerning the capabilities of the terminal device, such as the hardware performance of the terminal device or the performance of application (software) executed by the terminal device, and also information concerning the communication environment, such as the available bandwidth of the network 1003. In addition, the distribution server 1002 may select an appropriate layer on the basis of the obtained information.

Note that a layer may be extracted by a terminal device. For example, the personal computer 1004 may decode the transmitted scalable coded data (BL+EL) 1011, and display an image of a base layer or an image of an enhancement layer. Alternatively, for example, the personal computer 1004 may extract the scalable coded data (BL) 1012 of the base layer from the transmitted scalable coded data (BL+EL) 1011, store the extracted scalable coded data (BL) 1012, transfer the extracted scalable coded data (BL) 1012 to another device, or decode the extracted scalable coded data (BL) 1012 to display an image of the base layer.

Needless to say, the number of scalable coded data storage units 1001, the number of distribution servers 1002, the number of networks 1003, and the number of terminal devices are arbitrary. Furthermore, while a description has been given of an example in which the distribution server 1002 transmits data to a terminal device, examples of use are not limited to this example. The data transmission system 1000 may be used in any system that selects an appropriate layer, when transmitting encoded data which has been encoded using scalable coding to a terminal device, in accordance with the capabilities of the terminal device, the communication environment, and the like.

In addition, the present technology can also be applied to the data transmission system 1000 as illustrated in FIG. 57 described above in a manner similar to an application to the hierarchical encoding and hierarchical decoding described above with reference to FIGS. 49 to 51, thereby achieving advantages similar to the advantages described above with reference to FIGS. 49 to 51.

<Second System>

Figure 58:
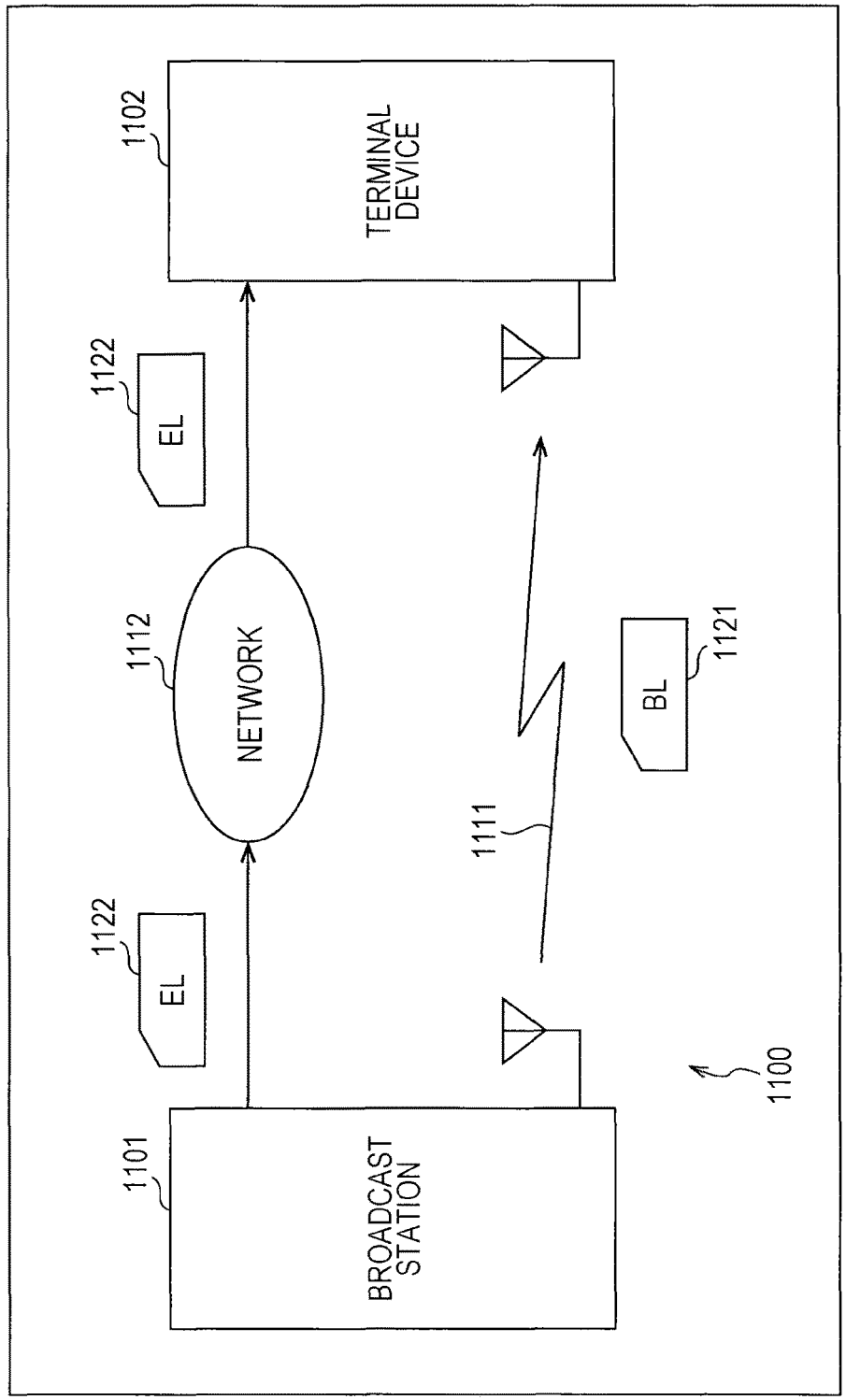
FIG. 58 is a block diagram illustrating another example of the use of scalable coding.

Scalable coding may also be used for, for example, as in an example illustrated in FIG. 58, transmission via a plurality of communication media.

In a data transmission system 1100 illustrated in FIG. 58, a broadcast station 1101 transmits scalable coded data (BL) 1121 of a base layer via terrestrial broadcasting 1111. The broadcast station 1101 further transmits (for example, packetizes and transmits) scalable coded data (EL) 1122 of an enhancement layer via a desired network 1112 formed of a communication network which can be wired, wireless, or both.

A terminal device 1102 has a function to receive the terrestrial broadcasting 1111 from the broadcast station 1101, and receives the scalable coded data (BL) 1121 of the base layer transmitted via the terrestrial broadcasting 1111. The terminal device 1102 further has a communication function to perform communication via the network 1112, and receives the scalable coded data (EL) 1122 of the enhancement layer transmitted via the network 1112.

The terminal device 1102 decodes the scalable coded data (BL) 1121 of the base layer acquired via the terrestrial broadcasting 1111 in accordance with, for example, a user instruction or the like to obtain an image of the base layer, stores the scalable coded data (BL) 1121, or transfers the scalable coded data (BL) 1121 to another device.

Furthermore, the terminal device 1102 combines the scalable coded data (BL) 1121 of the base layer acquired via the terrestrial broadcasting 1111 with the scalable coded data (EL) 1122 of the enhancement layer acquired via the network 1112 in accordance with, for example, a user instruction or the like to obtain scalable coded data (BL+EL), and decodes the scalable coded data (BL+EL) to obtain an image of the enhancement layer, stores the scalable coded data (BL+EL), or transfers the scalable coded data (BL+EL) to another device.

As described above, scalable coded data can be transmitted via, for example, communication media different from one layer to another. Thus, the load can be distributed, and delay or overflow can be suppressed from occurring.

Moreover, a communication medium to be used for transmission may be selectable for each layer in accordance with the situation. For example, the scalable coded data (BL) 1121 of the base layer having a relatively large amount of data may be transmitted via a communication medium having a large bandwidth, and the scalable coded data (EL) 1122 of the enhancement layer having a relatively small amount of data may be transmitted via a communication medium having a narrow bandwidth. Alternatively, for example, the communication medium via which the scalable coded data (EL) 1122 of the enhancement layer is to be transmitted may be switched between the network 1112 and the terrestrial broadcasting 1111 in accordance with the available bandwidth of the network 1112. As a matter of course, the above similarly applies to data of an arbitrary layer.

Control in the manner described above can further suppress an increase in the load of data transmission.

Needless to say, the number of layers is arbitrary, and the number of communication media to be used for transmission is also arbitrary. In addition, the number of terminal devices 1102 to which data is to be distributed is also arbitrary. Furthermore, while a description has been given in the context of broadcasting from the broadcast station 1101 by way of example, examples of use are not limited to this example. The data transmission system 1100 may be used in any system that divides data encoded using scalable coding into a plurality of segments in units of layers and transmits the data segments via a plurality of lines.

In addition, the present technology can also be applied to the data transmission system 1100 as illustrated in FIG. 58 described above in a manner similar to an application to the hierarchical encoding and hierarchical decoding described above with reference to FIGS. 49 to 51, thereby achieving advantages similar to the advantages described above with reference to FIGS. 49 to 51.

<Third System>

Figure 59:
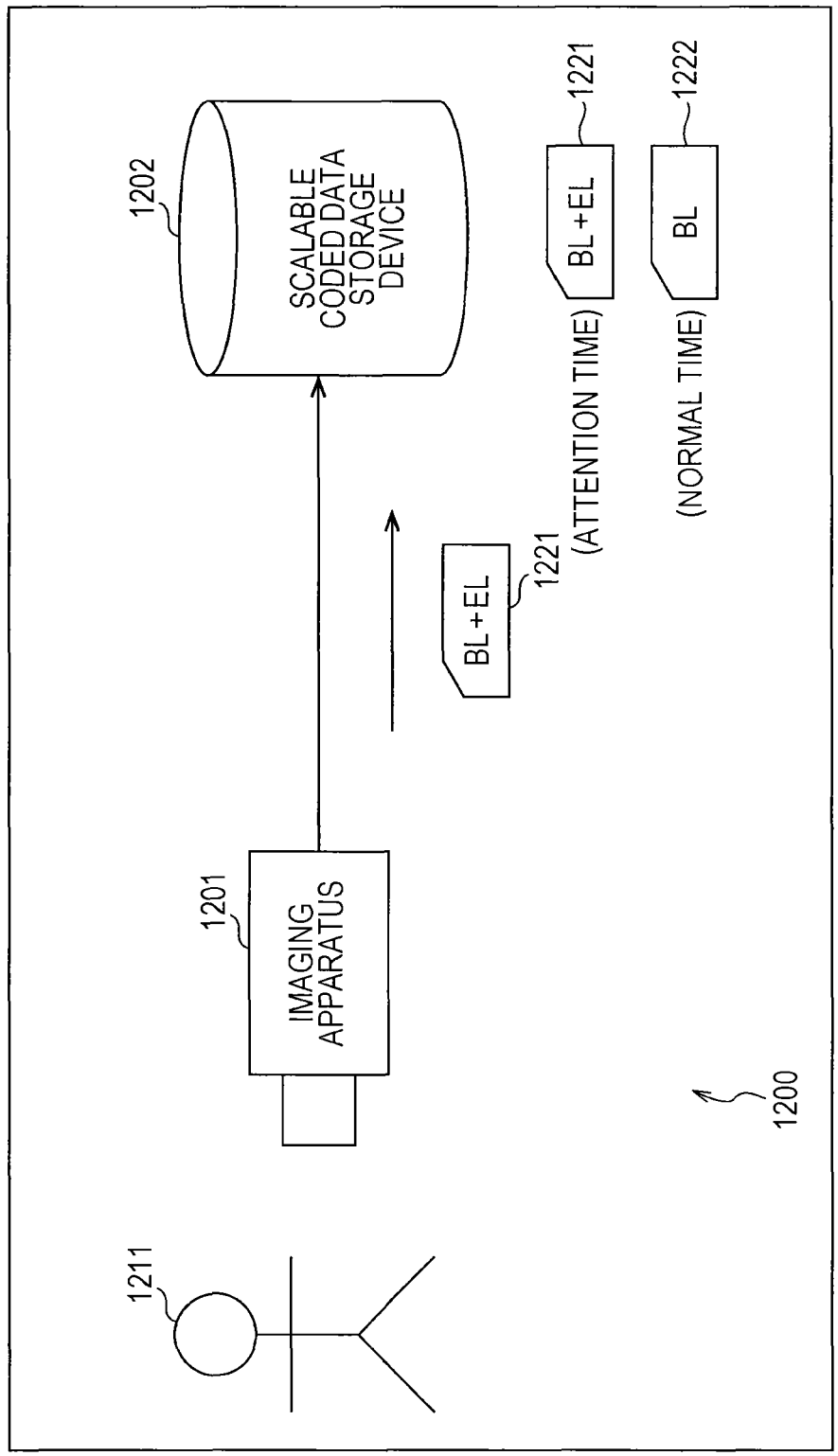
FIG. 59 is a block diagram illustrating still another example of the use of scalable coding.

Scalable coding may also be used for, for example, as in an example illustrated in FIG. 59, the storage of encoded data.

In an imaging system 1200 illustrated in FIG. 59, an imaging apparatus 1201 performs scalable coding on image data obtained by capturing an image of an object 1211, and supplies the resulting data to a scalable coded data storage device 1202 as scalable coded data (BL+EL) 1221.

The scalable coded data storage device 1202 stores the scalable coded data (BL+EL) 1221 supplied from the imaging apparatus 1201 at the quality corresponding to the situation. For example, in normal time, the scalable coded data storage device 1202 extracts data of a base layer from the scalable coded data (BL+EL) 1221, and stores the extracted data of the base layer as scalable coded data (BL) 1222 of the base layer having a low quality and a small amount of data. In contrast, for example, in attention time, the scalable coded data storage device 1202 stores the scalable coded data (BL+EL) 1221 having a high quality and a large amount of data, as it is.

Accordingly, the scalable coded data storage device 1202 can save an image at high quality only when necessary. This can suppress an increase in the amount of data while suppressing a reduction in the worth of the image due to a reduction in quality, and can improve use efficiency of the storage area.

For example, it is assumed that the imaging apparatus 1201 is a security camera. If an object to be monitored (for example, an intruder) does not appear in a captured image (normal time), it may be probable that the captured image does not have important content. Thus, a reduction in the amount of data is prioritized, and the image data (scalable coded data) of the image is stored at low quality. In contrast, if an object to be monitored appears as the object 1211 in a captured image (attention time), it may be probable that the captured image has important content. Thus, image quality is prioritized, and the image data (scalable coded data) of the image is stored at high quality.

Note that either the normal time or the attention time may be determined by, for example, the scalable coded data storage device 1202 by analyzing an image. Alternatively, the imaging apparatus 1201 may determine the normal time or the attention time, and may transmit the determination result to the scalable coded data storage device 1202.

Note that the determination of either the normal time or the attention time may be based on an arbitrary standard, and an image on which the determination is based may have any content. Needless to say, conditions other than the content of an image may be used as the determination standard. The state may be changed in accordance with, for example, the magnitude, waveform, or the like of recorded audio, or may be changed at intervals of a predetermined period of time. Alternatively, the state may be changed in accordance with an external instruction such as a user instruction.

Furthermore, while a description has been given of an example of changing between two states, namely, normal time and attention time, the number of states is arbitrary, and the state change may be made between more than two states, such as normal time, attention time, more attention time, and much more attention time. Note that the upper limit number of states to be changed depends on the number of layers of scalable coded data.

Moreover, the imaging apparatus 1201 may be configured to determine the number of layers of scalable coding in accordance with the state. For example, in normal time, the imaging apparatus 1201 may generate scalable coded data (BL) 1222 of the base layer having a low quality and a small amount of data, and supply the generated scalable coded data (BL) 1222 to the scalable coded data storage device 1202. Furthermore, for example, in attention time, the imaging apparatus 1201 may generate scalable coded data (BL+EL) 1221 of the base layer having a high quality and a large amount of data, and supply the generated scalable coded data (BL+EL) 1221 to the scalable coded data storage device 1202.

While a security camera has been described as an example, the imaging system 1200 may be used in any application, and may be used in applications other than a security camera.

In addition, the present technology can also be applied to the imaging system 1200 illustrated in FIG. 59 described above in a manner similar to an application to the hierarchical encoding and hierarchical decoding described above with reference to FIGS. 49 to 51, thereby achieving advantages similar to the advantages described above with reference to FIGS. 49 to 51.

Note that the present technology can also be applied to HTTP streaming, such as MPEG DASH, in which an appropriate piece of encoded data is selected and is used in units of a segment from among a plurality of pieces of encoded data prepared in advance and having different resolutions. In other words, information concerning encoding and decoding can also be shared among a plurality of pieces of encoded data.

It goes without saying that an image encoding device and an image decoding device to which the present technology is applied can also be applied to apparatuses other than the apparatuses described above or to systems.

Note that an example has been described herein in which a quantization matrix (or a coefficient used to form a quantization matrix) is transmitted from the encoding side to the decoding side. A technique for transmitting a quantization matrix may be to transmit or record the quantization matrix as separate data associated with an encoded bit stream without multiplexing the quantization parameter into the encoded bit stream. The term "associate", as used herein, means allowing an image (which may be part of an image, such as a slice or block) included in a bit stream to be linked to information corresponding to the image when the image is decoded. That is, the information may be transmitted on a transmission path different from that for the image (or bit stream). Furthermore, the information may be recorded on a recording medium different from that for the image (or bit stream) (or recorded in a different recording area of the same recording medium). Moreover, the information and the image (or bit stream) may be associated with each other in arbitrary units such as a plurality of frames, one frame, or a portion in a frame.

Image Processing Method.

REFERENCE SIGNS LIST

10 image encoding device, 14 orthogonal transform/quantization unit, 16 lossless encoding unit, 150 matrix processing unit, 192 DPCM unit, 211 DC coefficient encoding unit, 212 AC coefficient DPCM unit, 300 image decoding device, 312 lossless decoding unit, 313 dequantization/inverse orthogonal transform unit, 410 matrix generation unit, 552 inverse DPCM unit, 571 initial setting unit, 572 DPCM decoding unit, 573 DC coefficient extraction unit, 611 AC coefficient buffer, 612 AC coefficient encoding unit, 613 AC coefficient DPCM unit, 614 DC coefficient DPCM unit, 621 initial setting unit, 622 AC coefficient DPCM decoding unit, 623 AC coefficient buffer, 624 DC coefficient DPCM decoding unit, 631 AC coefficient DPCM unit, 632 DC coefficient buffer, 633 DC coefficient DPCM unit, 641 initial setting unit, 642 AC coefficient DPCM decoding unit, 643 DC coefficient DPCM decoding unit

The invention claimed is:

1. An image processing device comprising:
circuitry configured to
set, in a case a current quantization matrix is copied, as syntax whose semantics is set so that default quantization matrix is referred to as a condition that a value is 0, a difference value between a value of identification information identifying a reference quantization matrix and a value of identification information identifying the current quantization matrix;
set, in a case the current quantization matrix is not copied, a replacement difference coefficient, which is a difference between a replacement coefficient used to replace a (0, 0) coefficient of a 16×16 quantization matrix and a (0, 0) coefficient of an 8×8 quantization matrix, the 16×16 quantization matrix being obtained by using a nearest neighboring process against the 8×8 quantization matrix for up-converting;

quantize transform coefficient data obtained by orthogonal transforming an image, and generate quantized data; and encode the generated quantized data and the replacement difference coefficient to generate encoded data, the encoded data including the replacement difference coefficient and the difference value.

2. The image processing device according to claim 1, wherein the circuitry is configured to:
set, in the case the current quantization matrix is not copied, a difference coefficient, which is a difference between each coefficient of the 8×8 quantization matrix; and
generate the encoded data including the difference coefficient.

3. The image processing device according to claim 2, wherein the circuitry is configured to generate the encoded data whose syntax is a group of difference coefficients grouping the replacement difference coefficient and the difference coefficient.

4. The image processing device according to claim 3, wherein the circuitry is configured to:
encode the replacement difference coefficient, and then encode the difference coefficient; and
generate the encoded data whose syntax is the group of difference coefficients.

5. The image processing device according to claim 4, wherein
the circuitry is configured to:
set, in the case the current quantization matrix is not copied, an initial difference coefficient, which is a difference between the replacement coefficient and an initial value of a coefficient set to a quantization matrix; and
generate the encoded data including the initial difference coefficient.

6. The image processing device according to claim 5, wherein the circuitry is configured to:
encode the initial difference coefficient, and then encode the group of difference coefficients; and
generate the encoded data whose syntax is the initial difference coefficient and the group of difference coefficients.

7. The image processing device according to claim 6, wherein the circuitry is configured to:
encode the initial difference coefficient using signed exponential Golomb coding, and then encode the group of difference coefficients using the signed exponential Golomb coding; and
generate the encoded data whose syntax is the encoded initial difference coefficient and the encoded group of difference coefficients using the signed exponential Golomb coding.

8. The image processing device according to claim 7, wherein the circuitry is configured to:
orthogonal transform the image to generate the transform coefficient data; and
quantize the generated transform coefficient data.

9. The image processing device according to claim 8, wherein the circuitry is configured to:
orthogonal transform the image to generate the transform coefficient data using a transformation unit of 16×16; and
quantize the generated transform coefficient data using the 16×16 quantization matrix.

10. An image processing method comprising:
setting, in a case a current quantization matrix is copied, as syntax whose semantics is set so that default quantization matrix is referred to as a condition that a value is 0, a difference value between a value of identification information identifying a reference quantization matrix and a value of identification information identifying the current quantization matrix;
setting, in a case the current quantization matrix is not copied, a replacement difference coefficient, which is a difference between a replacement coefficient used to replace a (0, 0) coefficient of a 16×16 quantization matrix and a (0, 0) coefficient of an 8×8 quantization matrix, the 16×16 quantization matrix being obtained by using a nearest neighboring process against the 8×8 quantization matrix for up-converting;
quantizing transform coefficient data obtained by orthogonal transforming an image, and generate quantized data; and
encoding, using circuitry, the generated quantized data and the replacement difference coefficient to generate encoded data, the encoded data including the replacement difference coefficient and the difference value.

11. The image processing method according to claim 10, wherein
the setting, in the case the current quantization matrix is not copied, sets a difference coefficient, which is a difference between each coefficient of the 8×8 quantization matrix, and
the encoding generates the encoded data including the difference coefficient.

12. The image processing method according to claim 11, wherein the encoding generates the encoded data whose syntax is a group of difference coefficients grouping the replacement difference coefficient and the difference coefficient.

13. The image processing method according to claim 12, wherein
the encoding encodes the replacement difference coefficient, and then encodes the difference coefficient, and
the encoding generates the encoded data whose syntax is the group of difference coefficients.

14. The image processing method according to claim 13, wherein
the setting, in the case the current quantization matrix is not copied, sets an initial difference coefficient, which is a difference between the replacement coefficient and an initial value of a coefficient set to a quantization matrix, and
the encoding generates the encoded data including the initial difference coefficient.

15. The image processing method according to claim 14, wherein
the encoding encodes the initial difference coefficient, and then encodes the group of difference coefficients, and
the encoding generates the encoded data whose syntax is the initial difference coefficient and the group of difference coefficients.

16. The image processing method according to claim 15, wherein
the encoding encodes the initial difference coefficient using signed exponential Golomb coding, and then encodes the group of difference coefficients using the signed exponential Golomb coding; and
the encoding generates the encoded data whose syntax is the encoded initial difference coefficient and the encoded group of difference coefficients using the signed exponential Golomb coding.

17. The image processing method according to claim 16, wherein
the method further comprising orthogonal transforming the image to generate the transform coefficient data, and
the quantizing quantizes the generated transform coefficient data.

18. The image processing method according to claim 17, wherein
the orthogonal transforming orthogonal transforms the image to generate the transform coefficient data using a transformation unit of 16×16, and
the quantizing quantizes the generated transform coefficient data using the 16×16 quantization matrix.

* * * * *